United States Patent
Ishiguro et al.

(10) Patent No.: US 7,237,112 B1
(45) Date of Patent: Jun. 26, 2007

(54) INFORMATION PROCESSING SYSTEM

(75) Inventors: Ryuji Ishiguro, Tokyo (JP); Itaru Kawakami, Kanagawa (JP); Mitsuru Tanabe, Kanagawa (JP); Yuichi Ezura, Kanagawa (JP); Hirokazu Kawahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/701,084

(22) PCT Filed: Mar. 30, 2000

(86) PCT No.: PCT/JP00/02041

§ 371 (c)(1),
(2), (4) Date: Jun. 6, 2001

(87) PCT Pub. No.: WO00/58827

PCT Pub. Date: Oct. 5, 2000

(30) Foreign Application Priority Data

Mar. 30, 1999 (JP) .............................. P11-088346

(51) Int. Cl.
H04L 9/00 (2006.01)

(52) U.S. Cl. ...................... 713/169; 713/150; 713/168; 713/171; 380/46; 380/258; 380/262; 380/277; 380/278; 726/26; 726/28; 726/29

(58) Field of Classification Search ............... 713/168, 713/169, 150, 171; 705/52, 59; 380/277, 380/278, 46, 258, 262; 726/26.28, 29
See application file for complete search history.

(56) References Cited

U.S. PATENT DOCUMENTS

| 4,612,413 | A | * | 9/1986 | Robert et al. ............... 713/169 |
| 5,225,664 | A | * | 7/1993 | Iijima .......................... 235/380 |
| 5,636,276 | A | | 6/1997 | Brugger |
| 5,661,806 | A | * | 8/1997 | Nevoux et al. ............. 380/247 |
| 5,991,407 | A | * | 11/1999 | Murto ......................... 380/248 |
| 6,028,937 | A | * | 2/2000 | Tatebayashi et al. ........ 713/169 |
| 6,034,618 | A | * | 3/2000 | Tatebayashi et al. ......... 340/5.8 |
| 6,058,477 | A | * | 5/2000 | Kusakabe et al. .......... 713/169 |

(Continued)

FOREIGN PATENT DOCUMENTS

| EP | 0 862 293 A2 | 2/1997 |
| EP | 0 874 299 A2 | 10/1998 |
| EP | 0 874 300 A2 | 10/1998 |
| EP | 0 875 814 A2 | 11/1998 |
| EP | 0 875 815 A2 | 11/1998 |
| JP | 10-301772 | 11/1998 |

(Continued)

OTHER PUBLICATIONS

Yoshio, Taro, "Digital Chosakuken: Kogata Memory Card De Chosakuken Wo Mamoru," Nikkei Electronics, No. 739, Mar. 22, 1999, pp. 49-53.

(Continued)

*Primary Examiner*—Kim Vu
*Assistant Examiner*—Beemnet W Dada
(74) *Attorney, Agent, or Firm*—Oblon, Spivak, McClelland, Maier & Neustadt, P.C.

(57) ABSTRACT

A system for preventing recorded data from being illicitly read out and analyzed. An Internet connection interface 11 transmits a program executed by an adapter 7 to an authentication station, whilst receiving the program in an encrypted form from the authentication station. A hard disc 15 records the encrypted program, received from the authentication station. An interface 17 transmits the program recorded on the horizontal direction 15 on the adapter 7.

3 Claims, 48 Drawing Sheets

U.S. PATENT DOCUMENTS

| | | | |
|---|---|---|---|
| 6,105,133 A * | 8/2000 | Fielder et al. | 713/169 |
| 6,119,108 A * | 9/2000 | Holmes et al. | 705/40 |
| 6,182,215 B1 * | 1/2001 | Tatebayashi et al. | 713/168 |
| 6,286,008 B1 * | 9/2001 | Matsumoto et al. | 707/102 |
| 6,292,896 B1 * | 9/2001 | Guski et al. | 713/169 |
| 6,421,779 B1 * | 7/2002 | Kuroda et al. | 713/169 |
| 6,496,898 B1 * | 12/2002 | Tsutsui | 711/112 |
| 6,591,364 B1 * | 7/2003 | Patel | 713/170 |
| 6,859,535 B1 * | 2/2005 | Tatebayashi et al. | 380/201 |
| 6,918,035 B1 * | 7/2005 | Patel | 713/169 |

FOREIGN PATENT DOCUMENTS

| | | |
|---|---|---|
| JP | 10-301773 | 11/1998 |
| JP | 10-304333 | 11/1998 |
| JP | 10-512074 | 11/1998 |
| JP | 11-53264 | 2/1999 |
| WO | WO 96/27155 | 9/1996 |

OTHER PUBLICATIONS

Yoshio, Taro, Ongaku Haishin Matta Nashi: Seibi Isogu Chosakuken Hoga Gijutsu, Nikkei Electronics, No. 738, Mar. 8, 1999, pp. 94-98.

"DVD, Personal Computer Ni Noru Software Fukugou No Kagi Wo Nigiru Fusei Copy Boushi Gijutsu No Medo," Nikkei Electronics, No. 696, Aug. 18, 1997.

Auscsmith, David, "Gyaku Kaiseki Ya Kaihen Kara Soft Wo Mamoru Tamper Resistant Software Gijutsu No Shousai," Nikkei Electronics, No. 706, Jan. 5, 1998, pp. 209-220.

Dr. Richard E. Smith, Network Security with Cryptography, technical presentation, Aug. 13, 1998.

* cited by examiner

TERMINAL DATABASE

|  | ITEM 1 | ITEM 2 | ITEM 3 |  |
|---|---|---|---|---|
| ISRC | JP-Z90-98-12345 | US-Z90-99-12346 | JP-Z90-98-12347 |  |
| COPYING DATE AND TIME | 1998.11.23.08:04 | 2004.03.06.16:09 | 2004.03.06.16:15 |  |

| HASH VALUES | 0xf3352e125934 |
|---|---|

AIR DATABASE

| | ITEM 1 | ITEM 2 | ITEM 3 |
|---|---|---|---|
| FILENAME | Xd000110. at2 | px92341234. at2 | aa02342287034. at2 |
| ENCRYPTED ENCRYPTION KEY | 0xababababababab | 0x9898989898989989 | 0x1234567890712 |
| AIR TITLE | BROOK IN SPRINGTIME | SCHICKSAL | MOON OF FORLORN CASTLE |
| DURATION | 180 | 190 | 200 |
| PLAYBACK CONDITION : START DATE AND TIME | - | 2001.01.01.00:00 | - |
| PLAYBACK CONDITION : END DATE AND TIME | 1999.07.31.23:59 | - | - |
| PLAYBACK CONDITION : LIMITATION ON NUMBER OF TIMES | - | 20 | - |
| NUMBER OF TIMES OF PLAYBACK COUNTER | - | 12 | - |
| ON PLAYBACK CHARGING CONDITION | - | - | ¥5 |
| COPYING CONDITIONS NUMBER OF TIMES | 2 | 0 | 0 |
| COPYING NUMBER OF TIMES COUNTER | 1 | 0 | 0 |
| COPYING CONDITIONS : SCMS | 0b01 | 0b10 | 0b00 |

| HASH VALUES | 0xf9951e566321 |
|---|---|

FIG.11

PLAYBACK CONDITIONS MANAGED BY PORTABLE DEVICE

|  | ITEM 1 | ITEM 2 | ITEM 3 |
|---|---|---|---|
| CONTENTS ID | 00001 | 00002 | 00003 |
| PLAYBACK START DATE & TIME | 1999.07.31.23:59 | 1999.07.31.23:59 | 1999.07.31.23:59 |
| PLAYBACK END DATE & TIME | 2001.01.01.00:00 | 2001.01.01.00:00 | 2001.01.01.00:00 |
| NUMBER OF TIMES OF PLAYBACK | - | 15 | - |

FIG.16

CHARGING LOG

|  | ITEM 1 | ITEM 2 | ITEM 3 |  |
|---|---|---|---|---|
| FEE | 50 | 50 | 60 |  |

| HASH VALUE | 0xf8783e263517 |
|---|---|

FIG.25

INFORMATION PROCESSING SYSTEM

TECHNICAL FIELD

This invention relates to an information processing method and apparatus, an authentication method, a semiconductor IC, an information processing system, and a program furnishing medium. More particularly, it relates to an information processing method and apparatus, an authentication method, a semiconductor IC, an information processing system, and a program furnishing medium for storing pre-set data for performing pre-set processing.

BACKGROUND ART

Recently, a device for digital recording and/or reproduction of music data, such as CD (Compact Disc) or a MD (Mini Disc), is in widespread use. As a result, it has become possible with relative ease to make illicit duplication of digital music data, by employing the device for digital recording and/or reproduction of music data in combination with e.g., a personal computer. Thus, a variety of methods have been proposed to prevent such illicit duplication of music data as a copyright protected work.

For example, it has been proposed that reciprocal authentication be made between the copying source and a device of the copying destination, under control by the software controlling the copying source, and that, if proper results of authentication are acquired, music data is encrypted to the device of the copying destination, which then decodes and uses the encrypted data.

It has also been proposed that reciprocal authentication be made between the copying source and a device of the copying destination with the aid of the identification information stored in a pre-set hardware.

It has likewise been proposed to execute the authentication, encryption and decoding by the hardware of the hardwired logic.

However, if the authentication, encryption and decoding are executed solely with the software, there is a risk that the software be analyzed and modified to make illicit duplication of music data.

Also, if the pre-set ID is stored on the hardware so as to be read by the software on the personal computer and used, there is a risk that the ID thus read out be read out, analyzed and modified in the course of its transmission to the software.

Moreover, if the authentication, encryption and decoding are executed by the hardware of the wired logic, it is possible to prevent analysis and modification, however, if authentication, encryption and decoding are to be made anew, it is necessary to exchange the existing hardware with a new hardware or to add a new hardware.

DISCLOSURE OF THE INVENTION

It is therefore an object of the present invention to provide an information processing method and apparatus, an authentication method, a semiconductor IC, an information processing system, and a program furnishing medium in which it is possible to prevent stored data from being illicitly read out or analyzed.

In one aspect, the present invention provides an information furnishing medium connected over a network to a pre-set information processing apparatus, including communication means for receiving a pre-set program from the information processing apparatus and for transmitting the program in an encrypted form to the information processing apparatus, and encrypting means for encrypting the program received by the communication means.

In another aspect, the present invention provides a method for furnishing the information by an information furnishing medium connected over a network to sa pre-set information processing apparatus, including a communication step of receiving a pre-set program from the information processing apparatus and for transmitting the program in an encrypted form to the information processing apparatus, and an encrypting step of encrypting the program received by the communication step.

In still another aspect, the present invention provides a furnishing medium for furnishing a computer-readable program for executing the processing including a communication step of receiving a pre-set program from the information processing apparatus and for transmitting the program in an encrypted form to the information processing apparatus, and an encrypting step of encrypting the program received by the communication step.

In still another aspect, the present invention provides a information processing apparatus for reciprocal authentication with another information processing apparatus to execute pre-set processing, including selection means for selecting the processing for reciprocal authentication being executed from one or more reciprocal authentication procedures in keeping with the pre-set processing, and reciprocal authentication means for executing the selected reciprocal authentication procedures by the selection means.

In still another aspect, the present invention provides a method for processing the information by an information processing apparatus for reciprocal authentication with another information processing apparatus to execute pre-set processing, in which the method includes a selection step of selecting the processing for reciprocal authentication being executed from one or more reciprocal authentication procedures in keeping with the pre-set processing, and a reciprocal authentication step of executing the selected reciprocal In another aspect, the present invention provides a authentication procedures by the selection means.

In still another aspect, the present invention provides a furnishing medium for furnishing a computer-readable program for executing the processing including a selection step of selecting the processing for reciprocal authentication being executed from one or more reciprocal authentication procedures in keeping with the pre-set processing, and a reciprocal authentication step of executing the selected reciprocal authentication procedures by the selection means.

In still another aspect, the present invention provides a method for authentication including generating a first random number in a first apparatus, transmitting an ID, the key attribute information and the first random number of the first apparatus from the first apparatus to a second apparatus, generating a second random number in the second apparatus, receiving the ID, key attribute information and the first random number of the first apparatus, transmitted from the first apparatus, by the second apparatus, computing the key in the second apparatus from the key attribute information, generating a third random number from the key and the first and second random numbers in the second apparatus, transmitting the information on the second and third random numbers and the key from the second apparatus to the first apparatus, receiving the information on the second and third random numbers and the key transmitted from the second apparatus in the first apparatus, generating the key from the information on the key in the first apparatus, generating a fourth random number from the key and the first and second random numbers in the first apparatus, transmitting the fourth random number from the first apparatus to the second apparatus, and finding a transient key from the third and fourth random number and the key in each of the first and second apparatus.

In still another aspect, the present invention provides a method for authentication including generating a first random number in a first apparatus, transmitting an ID of the first apparatus, the key attribute information of the first apparatus, the key attribute information of a second apparatus and the first random number from the first apparatus to the second apparatus, generating a second random number in the second apparatus, receiving the ID of the first apparatus, key attribute information of the first apparatus, key attribute information of the second apparatus and the first random number, transmitted from the first apparatus, in the second apparatus, computing a first key in the second apparatus from the key attribute information of the second apparatus, computing a second key in the second apparatus from the key attribute information of the first apparatus, generating a third random number from the key and the first and second random numbers in the second apparatus, transmitting the information on the second and third random numbers and the key from the second apparatus to the first apparatus, receiving the information on the second and third random numbers and the key transmitted from the second apparatus in the first apparatus, generating a second key from the information on the key in the first apparatus, generating a fourth random number from the key and the first and second random numbers in the first apparatus, transmitting the fourth random number from the first apparatus to the second apparatus and finding a transient key from the third and fourth random number and the second key in each of the first and second apparatus.

In still another aspect, the present invention provides an information furnishing apparatus for furnishing pre-set encrypted data and a key encrypting the pre-set data, including communication means for receiving data concerning the use of the data downloaded by the information processing apparatus and data required for settlement, from the information processing apparatus, and settlement means for making settlement based on the data concerning the use of the data downloaded by the information processing apparatus and on the data required for settlement.

In still another aspect, the present invention provides an information method for furnishing to an information furnishing apparatus pre-set encrypted data and a key encrypting the pre-set data, including a communication step of receiving data concerning the use of the data downloaded by the information processing apparatus and data required for settlement, from the information processing apparatus, and a settlement step of making settlement based on the data concerning the use of the data downloaded by the information processing apparatus and on the data required for settlement.

In still another aspect, the present invention provides a furnishing medium for furnishing a computer-readable program adapted to cause an information furnishing apparatus for furnishing pre-set encrypted data and a key encrypting the pre-set data to execute processing including a communication step of receiving data concerning the use of the data downloaded by the information processing apparatus and data required for settlement, from the information processing apparatus, and a settlement step of making settlement based on the data concerning the use of the data downloaded by the information processing apparatus and on the data required for settlement.

In still another aspect, the present invention provides an information processing apparatus including first execution means for decoding and executing an encrypted program, and second execution means for furnishing the program to the first execution means, decoding the encrypted program and for executing the program based on the results of execution of the first execution means.

In still another aspect, the present invention provides a method for processing the information of an information processing apparatus including a first execution step of decoding and executing an encrypted program, and a second execution step of furnishing the program to the first execution step, decoding the encrypted program and for executing the program based on the results of execution of the first execution step.

In still another aspect, the present invention provides a furnishing medium for furnishing a computer-readable program executing the processing including a first execution step of decoding and executing an encrypted program, and a second execution step of furnishing the program to the first execution step, decoding the encrypted program and for executing the program based on the results of execution of the first execution step.

In still another aspect, the present invention provides an information processing apparatus having a semiconductor IC loaded thereon and adapted for furnishing a program to be executed by the semiconductor IC, in which the apparatus includes communication means for transmitting the program for execution by the semiconductor IC to an authentication station and for receiving the encrypted program from the authentication station, recording means for recording the encrypted program received from the authentication station, and transmitting means for transmitting the program recorded on the recording means to the semiconductor IC.

In still another aspect, the present invention provides an information processing method for an information processing apparatus having a semiconductor IC loaded thereon and adapted for furnishing a program to be executed by the semiconductor IC, in which the apparatus includes a communication step of transmitting the program for execution by the semiconductor IC to an authentication station and for receiving the encrypted program from the authentication station, a recording step of recording the encrypted program received from the authentication station, and a transmitting step of transmitting the program recorded on the recording means to the semiconductor IC.

In still another aspect, the present invention provides a furnishing medium for furnishing a computer-readable program adapted for causing execution of a processing by an information processing apparatus having a semiconductor IC loaded thereon and adapted for furnishing a program to be executed by the semiconductor IC, in which the processing includes a communication step of transmitting the program for execution by the semiconductor IC to an authentication station and for receiving the encrypted program from the authentication station, a recording step of recording the encrypted program received from the authentication station, and a transmitting step of transmitting the program recorded on the recording means to the semiconductor IC.

In still another aspect, the present invention provides an information processing system including an information processing apparatus having a semiconductor IC loaded thereon and adapted for furnishing a program to be executed by the semiconductor IC, and an authentication station, in which the information processing apparatus includes communication means for transmitting the program for execution by the semiconductor IC to the authentication station and for receiving the encrypted program from the authentication station, recording means for recording the encrypted program received from the authentication station and transmitting means for transmitting the program recorded on the recording means to the semiconductor IC, and in which the authentication station includes communication means for receiving the program executed by the semiconductor IC and for transmitting the encrypted program to the information processing apparatus, and encryption means for encrypting the program, received by the communication means, in a pre-set system.

In still another aspect, the present invention provides an information processing apparatus having a semiconductor IC loaded thereon and adapted for furnishing a program to be executed by the semiconductor IC, in which the apparatus includes re-arraying means for re-arraying commands of a command queue contained in the program executed by the semiconductor IC, recording means for recording the program in which the command queue has been re-arrayed, and transmission means for transmitting the program recorded on the recording means to the semiconductor IC.

In still another aspect, the present invention provides an information processing method for an information processing apparatus having a semiconductor IC loaded thereon and adapted for furnishing a program to be executed by the semiconductor IC, in which the method includes a re-arraying step of re-arraying commands of a command queue contained in the program executed by the semiconductor IC, a recording step of recording the program in which the command queue has been re-arrayed, and a transmission step of transmitting the program recorded on the recording means to the semiconductor IC.

In still another aspect, the present invention provides a furnishing medium for furnishing a computer-readable program adapted for causing execution of a processing by an information processing apparatus having a semiconductor IC loaded thereon and adapted for furnishing a program to be executed by the semiconductor IC, in which the processing includes a re-arraying step of re-arraying commands of a command queue contained in the program executed by the semiconductor IC, a recording step of recording the program in which the command queue has been re-arrayed, and a transmission step of transmitting the program recorded on the recording means to the semiconductor IC.

In still another aspect, the present invention provides an information processing apparatus having a semiconductor IC loaded thereon and adapted for furnishing a program to be executed by the semiconductor IC, in which the apparatus includes re-arraying means for re-arraying commands of a command queue contained in the program executed by the semiconductor IC, encrypting means for encrypting the program, recording means for recording the program which has been encrypted and in which the command queue has been re-arrayed, and transmission means for transmitting the program recorded on the recording means to the semiconductor IC.

In still another aspect, the present invention provides an information processing method for an information processing apparatus having a semiconductor IC loaded thereon and adapted for furnishing a program to be executed by the semiconductor IC, in which the method includes a re-arraying step of re-arraying commands of a command queue contained in the program executed by the semiconductor IC, an encrypting step of encrypting the program, a recording step of recording the program which has been encrypted and in which the command queue has been re-arrayed and a transmission step of transmitting the program recorded on the recording means to the semiconductor IC.

In still another aspect, the present invention provides a furnishing medium for furnishing a computer-readable program adapted for causing execution of a processing by an information processing apparatus having a semiconductor IC loaded thereon and adapted for furnishing a program to be executed by the semiconductor IC, in which the processing includes a re-arraying step of re-arraying commands of a command queue contained in the program executed by the semiconductor IC, an encrypting step of encrypting the program, a recording step of recording the program which has been encrypted and in which the command queue has been re-arrayed and a transmission step of transmitting the program recorded on the recording means to the semiconductor IC.

In still another aspect, the present invention provides a semiconductor IC loaded on an information processing apparatus and adapted for executing variable processing based on commands from the information processing apparatus, in which the semiconductor IC includes reception means for receiving an encrypted first program transmitted from the information processing apparatus, decoding means for decoding the first program received by the reception means, holding means for holding a second program adapted for processing the first program decoded by the decoding means, executing means for executing the first program processed based on the second program held by the holding means, transmitting means for transmitting the results of execution by the execution means to the information processing apparatus, and time-keeping means for performing the time-keeping operation and for correcting the current time based on the time information from the information processing apparatus.

In still another aspect, the present invention provides a method for processing the information of a semiconductor IC loaded on an information processing apparatus and adapted for executing variable processing operations based on commands from the information processing apparatus, in which the method includes a reception step of receiving an encrypted first program transmitted from the information processing apparatus, a decoding step of decoding the first program received by the reception step, a holding step of holding a second program adapted for processing the first program decoded by the decoding step, an executing step of executing the first program processed based on the second program held by the holding step, a transmitting step of transmitting the results of execution by the execution step to the information processing apparatus and a time-keeping step of performing the time-keeping operation and for correcting the current time based on the time information from the information processing apparatus.

In still another aspect, the present invention provides a furnishing medium for furnishing a computer-readable program for causing execution of a processing by a semiconductor IC loaded on an information processing apparatus and adapted for executing variable processing based on commands from the information processing apparatus, in which the processing includes a reception step of receiving an encrypted first program transmitted from the information processing apparatus, a decoding step of decoding the first program received by the reception step, a holding step of holding a second program adapted for processing the first program decoded by the decoding step, an executing step of executing the first program processed based on the second program held by the holding step, a transmitting step of transmitting the results of execution by the execution step to the information processing apparatus and a time-keeping step of performing the time-keeping operation and for correcting the current time based on the time information from the information processing apparatus.

In still another aspect, the present invention provides an information processing apparatus for outputting variable commands to a loaded semiconductor IC for execution thereby, in which the apparatus includes transmission means for transmitting an encrypted program to the semiconductor IC, first reception means for receiving output data which is the result of processing of the program by the semiconductor IC, second reception means for receiving data and the time information from another apparatus, storage means for storing data received by the second reception means, and correction means for correcting the time information of the semiconductor IC based on the time information received by the second reception means.

In still another aspect, the present invention provides an information processing method for an information processing apparatus adapted for outputting variable commands to a loaded semiconductor IC for execution thereby, in which the method includes a transmission step of transmitting an encrypted program to the semiconductor IC, a first reception step of receiving output data which is the result of processing of the program by the semiconductor IC, a second reception step of receiving data and the time information from another apparatus, a storage step of storing data received by the second reception step and a correction step of correcting the time information of the semiconductor IC based on the time information received by the second reception step.

In still another aspect, the present invention provides a furnishing medium for furnishing a computer-readable program for causing an information processing apparatus to execute a processing, the information processing apparatus being adapted to output variable commands to a semiconductor IC loaded thereon for execution thereby, in which the processing includes a transmission step of transmitting an encrypted program to the semiconductor IC, a first reception step of receiving output data which is the result of processing of the program by the semiconductor IC, a second reception step of receiving data and the time information from another apparatus, a storage step of storing data received by the second reception step and a correction step of correcting the time information of the semiconductor IC based on the time information received by the second reception step.

In still another aspect, the present invention provides an information processing apparatus for outputting variable commands to a loaded semiconductor IC for execution thereby, in which the apparatus includes storage means for storing the program and data required for executing the program, control means for controlling storage or readout of the program and the data for the storage means, first encryption means for encrypting the program with a first key supplied from the semiconductor IC and second encryption means for encrypting the data with a second key supplied from the semiconductor IC.

In still another aspect, the present invention provides an information processing method for an information processing apparatus adapted for outputting variable commands to a semiconductor IC loaded thereon for execution thereby, in which the method includes a storage step of storing the program and data required for executing the program, a control step of controlling storage or readout of the program and the data for the storage step, a first encryption step of encrypting the program with a first key supplied from the semiconductor IC and a second encryption step of encrypting the data with a second key supplied from the semiconductor IC.

In still another aspect, the present invention provides a furnishing medium for furnishing a computer-readable program adapted for causing execution of a processing by an information processing apparatus for outputting variable commands to a loaded semiconductor IC for execution thereby, in which the processing includes a storage step of storing the program and data required for executing the program, a control step of controlling storage or readout of the program and the data for the storage step, a first encryption step of encrypting the program with a first key supplied from the semiconductor IC and a second encryption step of encrypting the data with a second key supplied from the semiconductor IC.

In still another aspect, the present invention provides a semiconductor IC adapted for being loaded on a pre-set information processing apparatus, for receiving a program supplied from the information processing apparatus and data necessary for executing the program, and for executing the program, in which the semiconductor IC includes storage means for storing a first key proper to the semiconductor IC, key generating means for generating a second key from the first key stored by the storage means and from the attributes of the program supplied from the information processing apparatus, first decoding means for decoding the program with a third key and second decoding means for decoding the data with the second key.

In still another aspect, the present invention provides an information processing method for processing the information of a semiconductor IC adapted for being loaded on a pre-set information processing apparatus, for receiving a program supplied from the information processing apparatus and data necessary for executing the program, and for executing the program, in which the method includes a storage step of storing a first key proper to the semiconductor IC, a key generating step for generating a second key from the first key stored by the storage step and from the attributes of the program supplied from the information processing apparatus, a first decoding step of decoding the program with a third key, and a second decoding step of decoding the data with the second key.

In still another aspect, the present invention provides a furnishing medium for furnishing a computer-readable program adapted for causing execution of a processing by a semiconductor IC adapted for being loaded on a pre-set information processing apparatus, for receiving a program supplied from the information processing apparatus and data necessary for executing the program, and for executing the program, in which the processing includes a storage step of storing a first key proper to the semiconductor IC, a key generating step for generating a second key from the first key stored by the storage step and from the attributes of the program supplied from the information processing apparatus, a first decoding step of decoding the program with a third key and a second decoding step of decoding the data with the second key.

In yet another aspect, the present invention provides an information processing system including an information processing apparatus for supplying a program executed by the semiconductor IC and a semiconductor IC adapted for being loaded on a pre-set information processing apparatus, for receiving a program supplied from the information processing apparatus and data necessary for executing the program, and for executing the program, in which the information processing apparatus includes storage means for storing the program and data required for executing the program, control means for controlling storage or readout of the program and the data for the storage means, first encryption means for encrypting the program with a first key supplied from the semiconductor IC, second encryption means for encrypting the data with a second key supplied from the semiconductor IC and first communication means for transmitting the encrypted program and data necessary for execution of the program to the semiconductor IC and for receiving the first and second keys from the semiconductor IC, in which the semiconductor IC includes second communication means for receiving the encrypted program and data necessary for executing the program form the information processing apparatus and for transmitting the first and second keys to the information processing apparatus, storage means pre-storing a third key proper to the semiconductor IC, key generating means for generating a second key from the third key stored in the storage means and from the attribute of the program supplied from the information processing apparatus, first decoding means for decoding the program received by the second communication means with a first key and second decoding means for decoding the data received by the second communication means with the second key.

The present invention gives rise to the following meritorious effects:

(1) The encrypted data is recorded on the HDD 21, and the encryption key is also encrypted and recorded on the HDD 21, so that, if the contents recorded on the HDD 21 are copied, these cannot be decoded, and hence it becomes possible to prevent duplications from being distributed in large quantities.

(2) If a pre-set air is copied once, the air and the recording date and time are registered on the air database, in order to prevent the air from being copied for a pre-set time, such as 48 hours in the above instance, so that it becomes possible to limit the number of times of copying and hence to prevent duplications from being distributed in large quantities.

Moreover, since the hash values of the data are computed and saved each time the database is updated, it is easier to prevent database modification.

(3) If the contents are delivered to an external equipment, the contents on the HDD 21 is erased. Thus, the contents, as original digital data, is not left in the HDD 21, so that the duplications thereof can be prohibited from being distributed in large quantities.

(4) Since the air database is provided in the HDD 21, and the entire hash values are checked each time, the source data can be reliably erased even if the contents of the HDD 21 are backed up directly before the movement and the backed-up data is listed on the HDD 21 directly after the movement.

(5) since reciprocal authentication processing is performed when delivering data from the personal computer 1 to the external equipment, it is possible to prevent data from being delivered to an unauthorized equipment.

(6) Since it is checked by reciprocal authentication processing prior to data delivery from the external equipment to the personal computer 1 whether or not the software of the personal computer 1 is authentic, it is possible to prevent the contents from being delivered to the unauthorized software.

(7) Since the ISRC is used for verifying the identity of the music airs and, if the ISRC is not acquired, the TOC is used, the music air can be verified as to identity even if the ISRC cannot be acquired.

(8) Since a pre-set portion of the software function in the personal computer 1 is executed by the adapter, provided externally of the personal computer 1, it cannot be known which processing is being executed, if only the software of the personal computer is analyzed. As a result, it becomes difficult to modify the software to achieve the intended function.

Moreover, since the software is encrypted or shuffled by a safe authentication station r by the EMD servers 4-1 to 4-3, it is more difficult to modify the software.

(9) Since the program is encrypted with a key associated with the program, and data necessary for executing the program is encrypted by the inherent key generated by the adapter 26, execution of the program by another adapter 26 as only the program is rendered distributable by a medium such as CD-ROM may be prohibited from occurring.

(10) Since settlement is made at the time of downloading the key used for encrypting the contents such as music data, the contents of voluminous data volume, such as music data, can be downloaded promptly.

In the context of the present specification, the system means an entire apparatus made up of plural devices.

As a medium for furnishing the computer program, performing the above-described processing, communication mediums, such as network or satellite, may be used in addition to recording mediums, such as a magnetic disc, a CD-ROM or a solid-state memory.

In the information furnishing method and apparatus and a program furnishing medium of the present invention, described above, since a pre-set program is received form the information processing apparatus, whilst the encrypted program is transmitted to the information processing apparatus, and the received program is encrypted, it is possible to prevent the stored data from being illicitly read out for analysis.

Also, in the information furnishing method and apparatus and a program furnishing medium of the present invention, the reciprocal authentication processing to be executed is selected from one or more reciprocal authentication processing procedures, and the reciprocal authentication processing procedure thus selected is executed, it is possible to prevent the stored data from being illicitly read out for analysis.

In the information furnishing method and apparatus and a program furnishing medium of the present invention, data concerning the use of data downloaded by the information processing apparatus and data required for settlement are received from the information processing apparatus, whilst a key is transmitted to the information processing apparatus, and the settlement is made based on the data concerning the use of the data received from the information processing apparatus and on the data required for settlement, it becomes possible to prevent stored data from being illicitly read out for analysis.

In the information furnishing method and apparatus and a program furnishing medium of the present invention, the encrypted program is decoded and executed, the program is furnished, the encrypted program is decoded, and the program is executed based on the results of the execution, it becomes possible to prevent the stored data from being read out illicitly for analysis.

In the information furnishing method and apparatus and a program furnishing medium of the present invention, the program executed by the semiconductor IC is transmitted to the authentication station, the encrypted program is received from the authentication station, and the encrypted program received from the authentication station is recorded and transmitted to the semiconductor IC, it becomes possible to prevent the stored data from being illicitly read out for analysis.

In the information processing system according to the present invention, since the program executed by the semiconductor IC is transmitted to the authentication station, the encrypted program is received from the authentication station, and the received program is encrypted in accordance with a pre-set system, it is possible to prevent the stored data from being illicitly read out for analysis.

In the information furnishing method and apparatus and a program furnishing medium of the present invention, the command queue contained in the program executed by the semiconductor IC is re-arrayed, the program having its command queue re-arrayed is recorded and the recorded program is transmitted to the semiconductor IC, thus prohibiting illicit readout and analysis of the stored data.

In the information furnishing method and apparatus and a program furnishing medium of the present invention, the command queue contained in the program executed by the semiconductor IC is re-arrayed, the program is encrypted, the command queue is re-arrayed, and the encrypted program is recorded and the recorded program is transmitted to the semiconductor IC, thus prohibiting illicit readout and analysis of the stored data.

In the information furnishing method and apparatus and a program furnishing medium of the present invention, the program and data necessary for executing the program are stored, the program and the data are controlled as to storage and readout, the program is encrypted with the first key supplied from the semiconductor IC, and the data is encrypted with the second key supplied form the semiconductor IC, thus prohibiting illicit readout and analysis of the stored data.

Also, in the information furnishing method and apparatus and a program furnishing medium of the present invention, the encrypted first program, transmitted from the information processing apparatus, is received, the received first program is decoded, the second program for processing the decoded first program is kept, the first program processed by the second program thus kept is executed, the executed results are transmitted to the information processing apparatus, a time-keeping operation is performed and the current time is corrected based on the time information from the information processing apparatus, thus prohibiting illicit readout and analysis of the stored data.

Moreover, in the information furnishing method and apparatus and a program furnishing medium of the present invention, the encrypted program is transmitted to the semiconductor IC, which then processes the program to generate and output the results of processing, the output data is received, data and the time information are received from another apparatus, the received data is stored, and the time information of the semiconductor IC is corrected, thus prohibiting illicit readout and analysis of the stored data.

Furthermore, in the information furnishing method and apparatus and a program furnishing medium of the present invention, the first key proper to the semiconductor IC is pre-stored, a second key is generated from the stored first key and the attributes of the program supplied from the information processing apparatus, the program is decoded by the third key, and data is decoded by the second key, thus prohibiting illicit readout and analysis of the stored data.

In addition, in the information furnishing method and apparatus and a program furnishing medium of the present invention, the program and data necessary for executing the program are stored, the program and the data are controlled as to storage and readout, the program is encrypted with the first key supplied from the semiconductor IC, the data is encrypted with the second key supplied form the semiconductor IC, the encrypted program and data necessary for executing the program are transmitted to the semiconductor IC, the first and second keys are received from the semiconductor IC, the encrypted program and the data necessary for executing the program are received, the first and second keys are transmitted to the information processing apparatus, a third key proper to the semiconductor IC is pre-stored, the second key is generated from the stored third key and the attributes of the program supplied from the information processing apparatus, the received program is decoded by the first key and the received data is decoded by the second key, thus again prohibiting illicit readout and analysis of the stored data.

BRIEF DESCRIPTION OF THE DRAWINGS

FIG. 11 shows an instance of an air database.

FIG. 16 illustrates replay conditions managed by the portable device 6.

FIG. 25 illustrates a charging log.

BEST MODE FOR CARRYING OUT THE INVENTION

Figure 1:
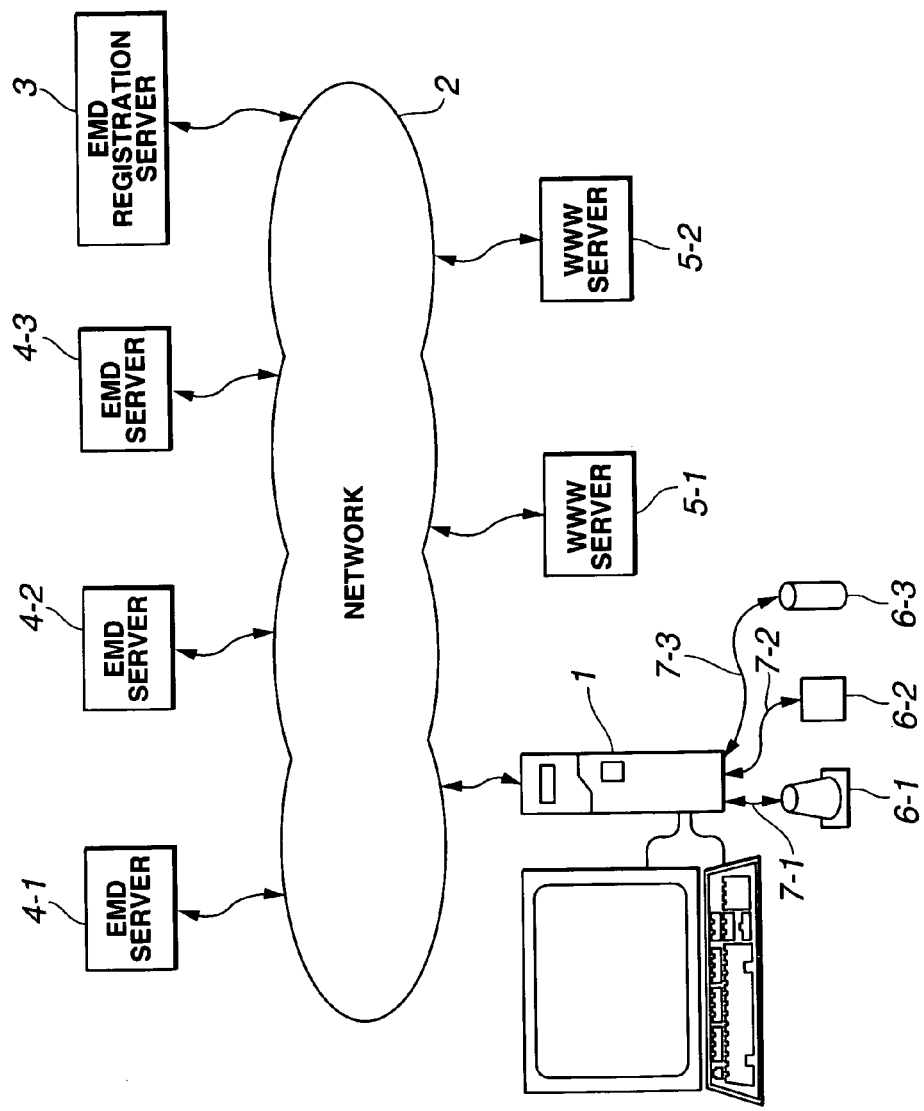
FIG. 1 shows an embodiment of a contents management system according to the present invention.

Referring to the drawings, the present invention will be explained in detail.

FIG. 1 shows an embodiment of a contents data management system. A personal computer 1 is connected to a network 2 constituted by e.g., a local area network or Internet. The personal computer 1 converts data of music sound received from an EMD (Electrical Music Distribution) servers 4-1 to 4-3, or read out from a compact disc (CD) as later explained, into a pre-set compression system, such as ATRAC3 (registered trade name). The data of music sound is referred to below as contents. The personal computer 1 also encrypts the contents in accordance with an appropriate encryption system, such as DES (data encryption standard), to record the encrypted data.

The personal computer 1 records use conditions data indicating the contents using condition in association with the contents recorded in the encrypted form.

The data of the use conditions indicates the number of portable devices, sometimes abbreviated to PDs, that are able to utilize the contents associated with the data of the use conditions simultaneously, that is the number of the PDs, that can be checked out, as later explained. Even if the contents in a number indicated by the data of the use conditions have been checked, the personal computer 1 is able to reproduce the contents.

Alternatively, the data of the use conditions indicate that data can be copied. If the contents have been copied to the portable devices 6-1 to 6-3, the personal computer 1 is able to reproduce the recorded contents. There are occasions wherein limitations are imposed on the number of times of copying of the contents on the portable devices 6-1 to 6-3. In such case, the number of times of possible copying is not increased.

Alternatively, the data of the use conditions indicate that the data can be moved to another personal computer. After moving the contents to the portable devices 6-1 to 6-3, the contents recorded on the personal computer 1 cease to be usable. Specifically, the contents are deleted, or the use conditions are modified to render the contents unusable.

The data of the use conditions will be discussed later in detail.

The personal computer 1 causes the contents recorded in an encrypted form to be stored in the portable device 6-1, connected in circuit, over a USB (universal serial bus) cable 7-1, along with data relevant to the contents, such as title of the air or the reproducing conditions. The personal computer 1 also updates the data of the use conditions associated with the stored contents in keeping with the storage of the contents in the portable device 6-1. This operation is termed check-out. More specifically, on checkout, the number of times of possible checkout of the data of the use conditions, recorded in the personal computer 1 in association with the contents, is decremented by 1. If the number of times of possible checkout is 0, the contents in question cannot be checked out.

The personal computer 1 causes the contents recorded in an encrypted form to be stored in the portable device 6-2, connected in circuit, over a USB (universal serial bus) cable 7-2, along with data relevant to the contents. The personal computer 1 also updates the data of the use conditions associated with the stored contents in keeping with the storage of the contents in the portable device 6-2. The personal computer 1 also causes the contents recorded in an encrypted form to be stored in the portable device 6-3, connected in circuit, over a USB (universal serial bus) cable 7-3, along with data relevant to the contents. The personal computer 1 also updates the data of the use conditions associated with the stored contents in keeping with the storage of the contents in the portable device 6-3.

On the other hand, the personal computer 1 causes the portable device 6-1, connected in circuit, to erase or make unusable the contents checked out by the personal computer 1, over the USB cable 7-1, to update the data of the use conditions associated with the erased contents. This operation is termed check-in. More specifically, on check-in, the number of times of possible checkout of the data of the use conditions, recorded in the personal computer 1 in association with the contents, is incremented by 1.

The personal computer 1 causes the portable device 6-2, connected in circuit, to erase or make unusable the contents checked out by the personal computer 1, over the USB cable 7-2, to update the data of the use conditions associated with the erased contents. The personal computer 1 also causes the portable device 6-3, connected in circuit, to erase or make unusable the contents checked out by the personal computer 1, over the USB cable 7-3, to update the data of the use conditions associated with the erased contents.

The personal computer 1 is unable to check-in the contents checked out by the portable device 6-1 of another personal computer, not shown. The personal computer 1 is unable to check-in the contents checked out by the portable device 6-2 of another personal computer, not shown. The personal computer 1 is unable to check-in the contents checked out by the portable device 6-3 of another personal computer, not shown.

When the personal computer 1 starts acquiring the contents from EMD servers 4-1 to 4-3, the EMD server 3 is responsive to the request by the personal computer 1 to transmit to the personal computer 1 an authentication key necessary for reciprocal authentication with the personal computer 1 and the EMD servers 4-1 to 4-3, while transmitting a program for connection to the EMD servers 4-1 to 4-3 to the personal computer 1.

The EMD server 4-1 is responsive to the request by the personal computer 1 to send contents to the personal computer 1, over the network 2, along with data relevant to the contents, such as the title of the air or limitations on reproduction. The EMD server 4-2 is also responsive to the request by the personal computer 1 to send contents to the personal computer 1, over the network 2, along with data relevant to the contents, such as the title of the air or limitations on reproduction. Similarly, the EMD server 4-2 is responsive to the request by the personal computer 1 to send contents to the personal computer 1, over the network 2, along with data relevant to the contents, such as the title of the air or limitations on reproduction.

The contents supplied from the EMD servers 4-1 to 4-3 have been compressed in accordance with the same or different compression systems. The contents supplied by each of the EMD servers 4-1 to 4-3 have been encrypted in accordance with the same or different encryption systems.

A WWW (world wide web) server 5-1 is responsive to the request by the personal computer 1 to send data associated with the CD, the contents of which have been read out, such as the name of the CD albums or the CD producer, and data corresponding to the contents read out from the CD, such as the title of the air or the name of the composer, over the network 2 to the personal computer 1. The WWW server 5-2 is responsive to the request of the personal computer 1 to send data of the CD, the contents of which have been read out, and data associated with the contents read out from the CD over the network 2 to the personal computer 1.

The portable device 6-1 stores the contents supplied from the personal computer 1, that is checked-out contents, along with the data relevant to the contents, such as, for example, title of the air or the limitations on reproduction. The portable device 6-1 reproduces the stored contents, based on the contents-related data, to output the reproduced contents.

If, for example, attempts are made to reproduce the contents beyond the number of times of reproduction as the limitations on reproduction, stored as the contents-related data, the portable device 6-1 halts the reproduction of the corresponding contents. Also, if attempts are made to reproduce the contents beyond the limit term of reproduction as the limitations on reproduction, stored as the contents-related data, the portable device 6-1 halts the reproduction of the corresponding contents.

The user is able to dismount the portable device 6-1, having the contents stored therein, from the personal computer 1, and to carry it to reproduce the stored contents to listen to the music corresponding to the contents over a headphone.

The portable device 6-2 stores the contents supplied from the personal computer 1 along with the data relevant to the contents. The portable device 6-2 reproduces the stored contents, based on the contents-related data, to output the reproduced contents. The user is able to dismount the portable device 6-2, having the contents stored therein, from the personal computer 1, and to carry it to reproduce the stored contents to listen to the music corresponding to the contents over a headphone.

The portable device 6-3 stores the contents supplied from the personal computer 1 along with the data relevant to the contents. The portable device 6-3 reproduces the stored contents, based on the contents-related data, to output the reproduced contents. The user is able to dismount the portable device 6-3, having the contents stored therein, from the personal computer 1, and to carry it to reproduce the stored contents to listen to the music corresponding to the contents over a headphone.

It there is no necessity for distinguishing the portable devices 6-1 to 6-3, these device are collectively termed a portable device 6.

Figure 2:
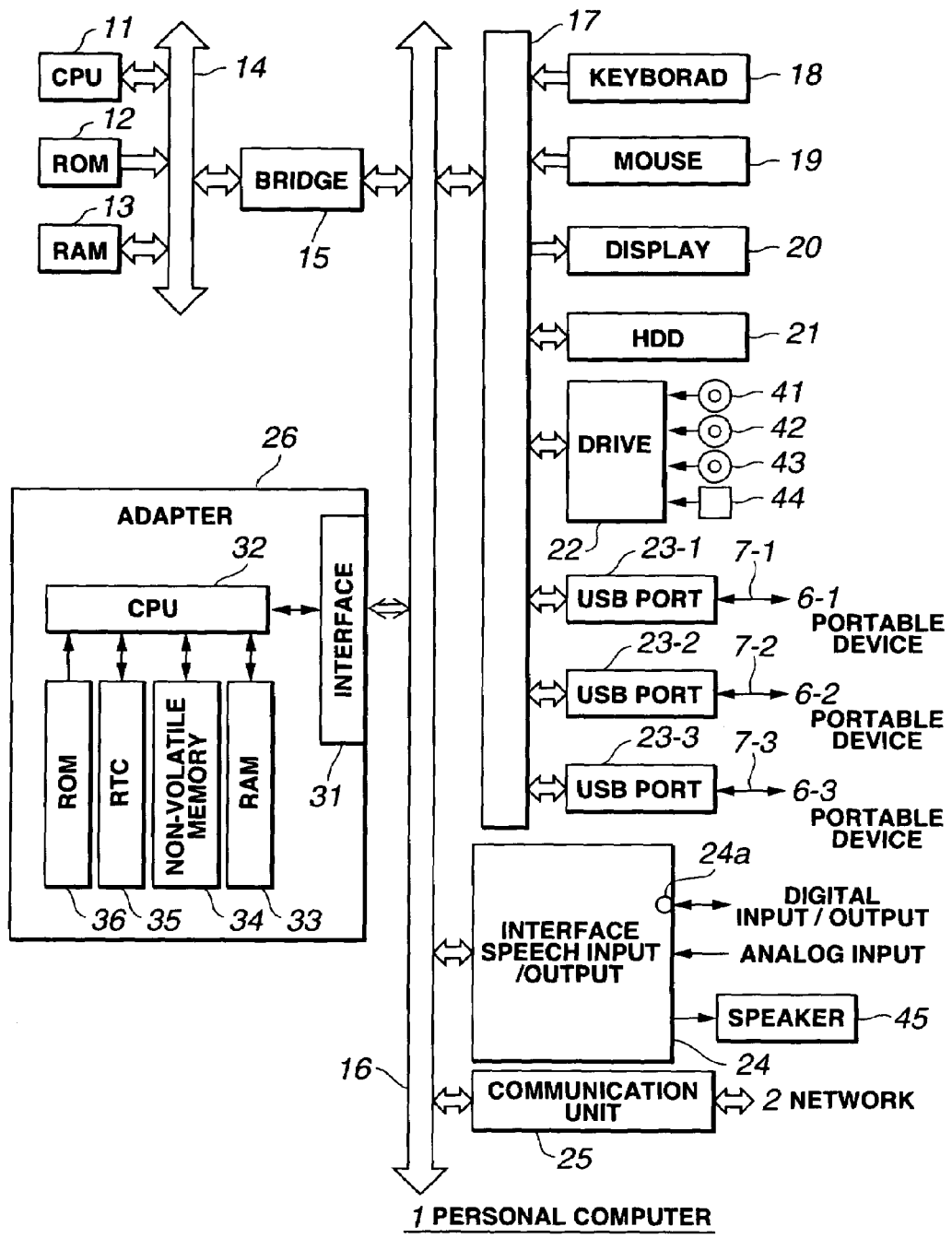
FIG. 2 illustrates a structure of a personal computer 1.

FIG. 2 shows the structure of the personal computer 1. A CPU (central processing unit) 11 executes variable application programs, which will be explained subsequently, or an OS (operating system). A ROM (read-only memory) 12 has basically fixed data, among the programs or computing parameters used by the CPU 11, stored therein. A RAM (random access memory) 13 stores programs used in the execution by the CPU 11 or parameters which will be changed in the execution. These units are interconnected over a host bus 14 constituted by a CPU bus.

The host bus 14 is connected over a bridge 15 to an external bus 16, such as a PCT (peripheral component interconnect/interface) bus.

A keyboard 18 is actuated by a user inputting variable commands to the CPU 11. A mouse 19 is actuated by a user commanding or selecting a point on the screen of a display 20. The display is made up of a liquid crystal display device or a CRT (cathode ray tube) to demonstrate variable information as text or image. A HDD (hard disc drive) 21 drives the hard disc to cause it to record and/or reproduce the program executed by the CPU 11 or the information.

A driver 22 reads out data or programs stored in a magnetic disc 41, an optical disc 42, inclusive of a CD, a magneto-optical disc 43 or a semiconductor memory 44, to send the data or the programs to the RAM 13 connected in circuit over an interface 17, an external bus 16, a bridge 16 and a host bus 14.

To a USB port 23-1 is connected the portable device 6-1 over the USB cable 7-1. The USB port 23-1 outputs data supplied from the HDD 21, CPU 11 or the RAM 13, such as contents or commands of the portable device 6-1, to the portable device 6-1 over the interface 17, external bus 16, bridge 16 and the host bus 14.

To a USB port 23-2 is connected the portable device 6-2 over the USB cable 7-2. The USB port 23-2 outputs data supplied from the HDD 21, CPU 11 or the RAM 13, such as contents or commands of the portable device 6-2, to the portable device 6-2 over the interface 17, external bus 16, bridge 16 and the host bus 14.

To a USB port 23-3 is connected the portable device 6-3 over the USB cable 7-3. The USB port 23-3 outputs data supplied from the HDD 21, CPU 11 or the RAM 13, such as contents or commands of the portable device 6-3, to the portable device 6-3 over the interface 17, external bus 16, bridge 16 and the host bus 14.

An audio input/output interface 24, having an IEC (International Electrotechnical Commission) 60958 terminal 24*a*, executes digital speech input/output or analog speech input/output interfacing operations. A speaker 45 outputs pre-set speech, corresponding to the contents, based on speech signals supplied over the audio input/output interface 24.

The aforementioned components, from the keyboard 18 to the audio input/output interface 24, are connected to the interface 17, which in turn is connected to the CPU 11 over the interface 17, external bus 16, bridge 16 and the host bus 14.

A communication unit 25 is connected to the network 2, so that data supplied from the CPU 11 or the HDD 21, such as registration requests or contents transmitting requests, are stored in a packet of a pre-set system, and transmitted over the network 2, so that data stored in the received packets, such as authentication key or contents, are outputted over the network 2 to the CPU 11, RAM 13 or to the HDD 21.

A CPU 32 for an adapter 26, formed monolithically as a semiconductor IC and which is loaded on the personal computer 1, cooperates with the CPU 11 of the personal computer 1 over the external bus 16, bridge 15 and the host bus 14 to execute variable processing operations. The RAM 33 stores data or programs necessary for the CPU 32 to execute variable processing operations. A non-volatile memory 34 stores data that need to be held even after power down of the personal computer 1. In the ROM 36, there is stored a program for decoding the encrypted program transferred from the personal computer 1. A RTC (real time clock) 35 executes timing operations to supply the time information.

The communication device 25 and the adapter 26 are connected to the CPU 11 over the external bus 16, bridge 16 and the host bus 14.

If there is no necessity for distinguishing the USB ports 23-1 to 23-3, these will be simply termed a USB port 23. Similarly, if there is no necessity for distinguishing the USB cable 7-1 to 7-3, these will be simply termed a USB cable 7.

The structure of the portable device 6 is now explained with reference to FIG. 3. A power source circuit 52 converts the power source voltage supplied from a dry cell 51 to an internal power of a pre-set voltage to supply the power to a CPU 53 to a display 67 to drive the portable device 6 in its entirety.

If a USB controller 57 is connected over a USB connector 56 to the personal computer 1 via the USB cable 7, data inclusive of the contents transmitted from the personal computer 1 is supplied over an internal bus 58 to the CPU 53.

The data transferred from the personal computer 1 is made up of 64 byte data per packet, and is transferred from the personal computer 1 at a transfer rate of 12 Mbits/sec.

The data transferred to the portable device 6 is made up of a header and contents. The header includes contents ID, filename, header size, contents key, file size, codec ID and the file information. In addition, the header includes reproduction limitation data, necessary for reproduction limitation, start date and time, end date and time, limitation on the number of times, and a counter for the number of times of reproduction. The contents are encoded and encrypted by the encoding system, such as ATRAC3.

The header size denotes the data length of a header, such as 33 bytes, whilst the file size denotes the data length of the contents, such as 33,636,138 bytes.

The contents key is used for decoding the encrypted contents and is transmitted from the personal computer 1 to the portable device 6 in the state in which it is encrypted based on a session key (transient key) generated in the reciprocal authentication processing between the personal computer 1 and the portable device 6.

When the portable device 6 is connected over the USB cable 7 to a USB port 23 of the personal computer 1, the portable device 6 and the personal computer 1 execute the processing of reciprocal authentication. This reciprocal authentication processing is the authentication processing of the challenge response system. It is noted that the DSP 59 of the portable device 6 executes decrypting (decoding) when performing the authentication processing of the challenge response system.

The challenge response system is such a system in which a response to a certain value generated by the personal computer 1 (challenge) is made with a value (response) generated using a secret key co-owned by the portable device 6 and the personal computer 1. In the reciprocal authentication processing of the challenge response system, the value generated by the personal computer 1 is changed from one authentication processing to another, so that, if the output value of the portable device 6 generated using the secret key is read out and used in a so-called "disguised" aggression, a different value is used for reciprocal authentication in the next reciprocal authentication processing, so that the personal computer 1 is able to detect the illicitness.

The contents ID is a contents-associated ID used for specifying the contents.

The codec ID is an ID associated with the contents encoding system. For example, the codec ID of "1" is associated with ATRAC3, whilst the codec ID of "0" is associated with MP3 (MPEG audio layer-3).

The filename is data corresponding to the contents file recorded by the personal computer 1 in association with the contents and which has been converted into the ASCII (American National Standard Code for Information Interchange) code. The file information is the title of the air corresponding to the contents, name of an artist or the name of a composer, as converted to the ASCII code.

The reproduction limitation data is data indicating whether or not the allowable contents playback time period, that is, start date and time or the end date and time, or the limitation on the number of times of reproduction, is set. As for the reproduction limitation data, "1", "2" and "0" are set if the number of times limitation is set, if the allowable reproduction time period is set, and if neither the number of times limitation nor the allowable reproduction time period is set, respectively.

If the reproduction limitation data is "2", the start date and time and the end date and time denote the extent of the allowable reproduction time period. For example, if the start date and time is "00040F" and the end date and time is "00070F", the associated contents can be reproduced as from April 15 until Jul. 15, 2000.

Likewise, if the reproduction limitation data is "1" or "2", the number of times limitation denotes the pre-set number of times for the contents, whilst the number of times counter denotes the number of times which is updated by the CPU 53 on reproducing the contents and which denotes the number of times the contents have been reproduced. For example, if the number of times limitation is "02", the number of times the contents are reproducible is two, whereas, if the number of times limitation is "01", the number of times the contents are reproducible is one.

For example, if the reproduction limitation data is "2", the start date and time is "00040F", the end date and time is "00070F" and the number of times limitation is "02", the portable device 6 is able to reproduce the relevant contents twice a day as from April 15 until Jul. 15, 2000.

Also, if the reproduction limitation data is "1", the start date and time is "000000", the end date and time is "000000", the number of times limitation is "0a" and the number of times counter is "05", there is no limitation on the allowable reproduction time period for the relevant contents, with the number of times of allowable reproduction being 10 and with the number of times of previous reproduction being 5.

If the portable device 6 has received a write command of the contents, along with the contents, from the personal computer 1, the CPU 53, adapted to execute the main program read out from the ROM 55 to the RAM 54, receives the write command and controls a flash memory controller 60 to cause the contents received from the personal computer 1 to be written in a flash memory 61.

The flash memory 61 has a recording capacity of approximately 64 Mbytes to store the contents. In the flash memory 61 is pre-stored a code for playback for expanding the contents compressed in a pre-set compression system.

Meanwhile, the flash memory 61 can be mounted/dismounted as a memory card in the portable device 6.

If a playback command associated with a thrusting operation by a user of a playback/stop button, not shown, is sent via an actuating key controller 62 to the CPU 53, the latter causes the flash memory controller 60 to read out the playback code and contents from the flash memory 61 to transfer the read-out code and contents to the DSP 59.

Figure 3:
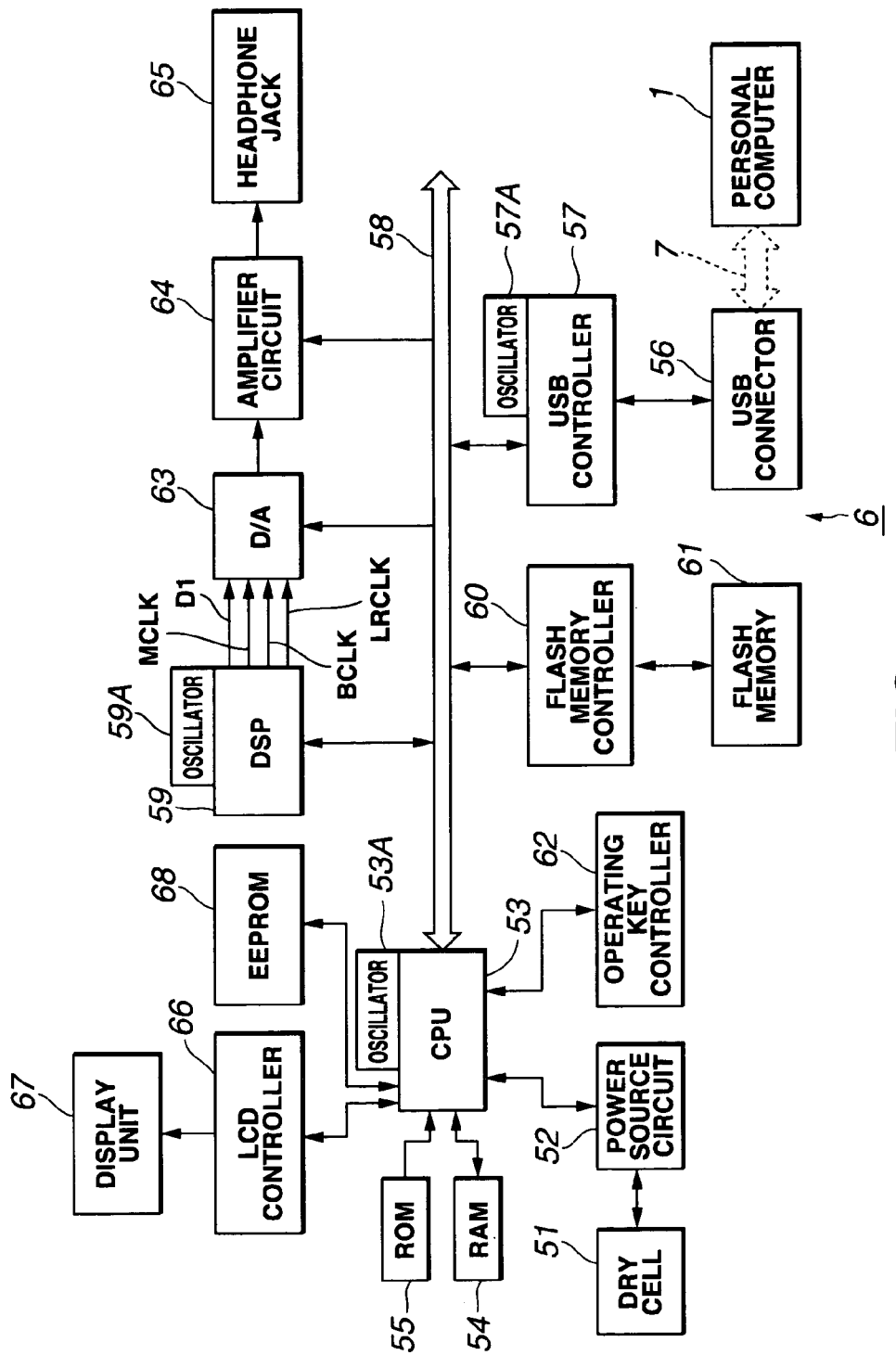
FIG. 3 illustrates a structure of a portable device 6.

The DSP 59 detects errors in the contents in accordance with the CRC (cyclic redundancy check) system, based on the code for playback, transferred from the flash memory 61, and reproduces the contents, to supply the reproduced data, indicated at D1 in FIG. 3, to a digital/analog converter circuit 63.

The DSP 59 is constructed monolithically with a transmission circuit, not shown, provided in its inside, and reproduces the contents based on master clocks MCLK from an external quartz transmitter 59A, while transmitting master clocks MCLK, bit clocks BCLK of a pre-set frequency, generated by an inner oscillator circuit and operating clocks LRCLK, made up of frame-based L-channel and R-channel clocks LCLK and RCLK, to a digital-to-analog converting circuit 63.

When reproducing the contents, the DSP 59 sends the above-mentioned operating clocks to the digital-to-analog converting circuit 63 in accordance with the code for reproduction. When not reproducing the contents, the DSP 59 halts the supply of the operating clocks in accordance with the code for reproduction to halt the digital-to-analog converting circuit 63 to decrease the power consumption of the entire portable device 6.

Similarly, quartz oscillators 53A and 57A are externally mounted on the CPU 53 and on the USB controller 57, respectively, to execute pre-set processing based on the master clocks MCLK supplied from the quartz oscillators 53A and 57A, respectively.

In this manner, the portable device 6 is not in need of a clock generating module for furnishing clocks to circuit blocks of the CPU 53, DSP 59 or the USB controller 57, thus simplifying and miniaturizing the circuit structure.

The digital-to-analog converting circuit 63 converts the reproduced contents into analog speech signals to transmit the converted speech signals to an amplifier circuit 64. The amplifier circuit 64 amplifies the speech signals to send the amplified speech signals via a headphone jack 65 to a head phone, not shown.

When a playback/stop button, not shown, is thrust, the portable device 6 reproduces the contents stored in the flash memory 61, under control by the CPU 53. When the playback/stop button is thrust, the portable device 6 halts the reproduction of the contents.

When the playback/stop button is again thrust after halt of contents reproduction, the portable device 6 re-starts the reproduction of the contents, as from the stop position, under control by the CPU 53. If a few seconds have elapsed without operation by the user after the playback is halted by thrusting the playback/stop button, the portable device 6 automatically turns off the power source to save the power consumption.

Meanwhile, if, after power down, the playback/stop button is thrust, the portable device 6 reproduces the contents as from the first air, without reproducing the contents as from the previous stop position.

The CPU 53 of the portable device 6 controls an LCD controller 68 to cause a display unit 67 to demonstrate the information such as the state of the playback mode, including repeat playback or intro-reproduction, equalizer adjustment, including gain adjustment associated with the frequency range of speech signals, air number, play time, state of reproduction, such as playback, stop, fast feed or fast rewind, sound volume or residual capacity of the dry cell 51.

In addition, the portable device 6 causes a so-called FAT (file allocation table) to be stored in an EEPROM 68. The FAT comprises variable memory storage information, such as the number of contents written in a flash memory 80, the position of blocks of the flash memory 61 in which the respective contents are written, and other variable memory storage information.

Meanwhile, in the present embodiment, 64 bytes of the contents are handled as a block, and the block position associated with the contents of a music air is stored in the FAT.

If, in storing the FAT in the flash memory 61, the contents of the first air are written in the flash memory 61 under control by the CPU 53, the block position associated with the contents of the first air are written as FAT in the flash memory 61 and, if the contents of the second air are written in the flash memory 61, the block positions associated with the contents of the second air are written as FAT in the same area of the flash memory 61 as that in which was written the first air.

In this manner, the FAT is rewritten each time the contents are written in the flash memory 61 and, for data protection, the same data is written in redundancy twice as spare data.

If the FAT is written in the flash memory 61, the same area of the flash memory 61 is re-written twice each time the contents are written once, so that the number of times of writing prescribed in the flash memory 61 is reached with the smaller number of times of contents writing to render rewriting of the flash memory 61 impossible.

Thus, the portable device 6 causes the FAT to be stored in the EEPROM 68 to diminish the frequency of rewriting of the flash memory 61 associated with each writing of the contents.

By causing the FAT with an increased number of times of rewriting to be stored in the EEPROM 68, the portable device 6 is able to increase the number of times of possible contents writing by a factor of tens or more as compared to the case in which the FAT is stored in the flash memory 61. Moreover, since the CPU 53 causes the FAT to be written in the EEPROM 68 in an overwrite fashion, the frequency of writing in the same area in the EEPROM 68 can be reduced to render it possible to prevent the EEPROM 68 from becoming unable to be overwritten in a short time.

When connected over the USB cable 7 to the personal computer 1, by way of the USB connection, the portable device 6 recognizes that the USB connection has been made based on an interrupt signal supplied from the USB controller 57 to the CPU 53.

On recognizing that the USB connection has now been established, the portable device 6 is fed from the personal computer 1 with the external power of a preset current magnitude over the USB cable 7. The portable device 6 also controls a power source circuit 52 to halt the supply of the power from the dry cell 51.

On USB connection, the CPU 53 halts the processing of reproducing the contents of the DSP 59. Thus, the CPU 53 performs control to prevent the external power supplied from the personal computer 1 from exceeding the prescribed current magnitude to enable the external power of the prescribed current magnitude to be received at all times.

Thus, on USB connection, the CPU 53 switches from the power supplied from the dry cell 51 to the power supplied from the personal computer 1, so that it is possible to use the external power from the personal computer 1 with low unit cost to reduce the power consumption of the dry cell 51 with high unit power cost to elongate the life of the dry cell 51.

Meanwhile, if the external power is supplied over the USB cable 7 from the personal computer 1, the CPU 53 halts the playback processing of the DSP 59 to diminish the radiation from the DSP 59 to reduce the radiation from the entire system including the personal computer 1 correspondingly.

Figure 4:
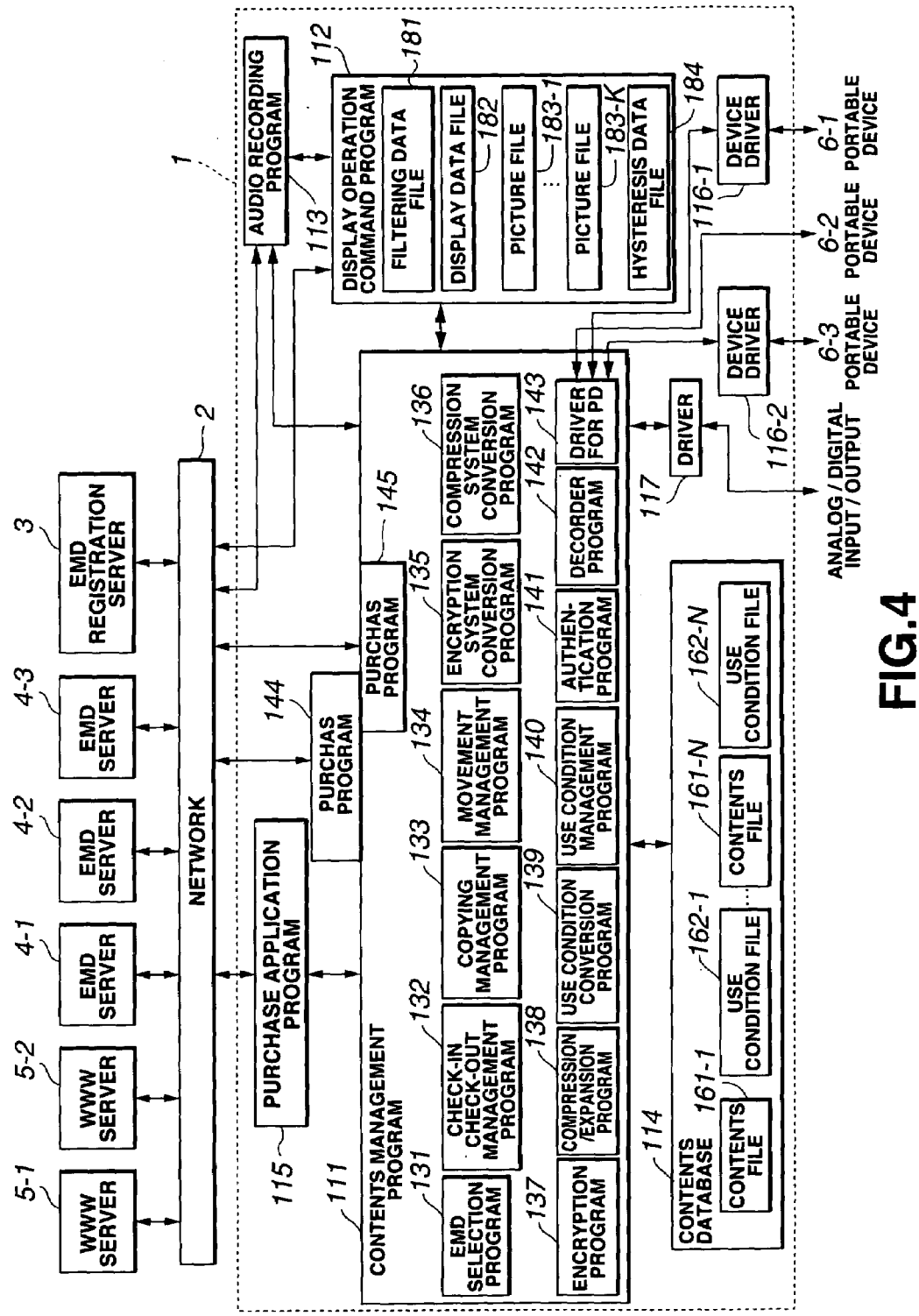
FIG. 4 is a block diagram for illustrating the structure of the functions of the personal computer 1.

FIG. 4 shows a block diagram for illustrating the configuration of the function of the personal computer 1. A contents management program 111 is made up of an EMD selection program 131, a check-in/check-out management program 132, an encryption system conversion program 135, a compression system conversion program 136, an encryption program 137, a use condition conversion program 139, a use condition management program 140, an authentication program 141, a decoding program 142, a driver for PD 143, and programs for purchase 144, 145.

The contents management program 111 is stated with shuffled or encrypted instructions and is constructed to hide the processing contents from outside to render decoding of the processing contents difficult. For example, the contents management program 111 is formulated so that a user directly reading out the contents management program 111 cannot identify the instructions.

The EMD selection program 131 is not contained in the contents management program 111 when the contents management program 111 is installed in the personal computer 1, but is received from an EMD registration server 3 over the network 2 in the course of the EMD registration processing which will be explained subsequently. The EMD selection program 131 selects connection to one of the EMD servers 4-1 to 4-3 to cause a purchase application 115 or the purchase program 144 or 142 to execute communication with one of the EMD servers 4-1 to 4-3.

The check-in/check-out management program 132 sets the check-in or check-out and, based on use condition files 162-1 to 162-N, recorded on a contents database 114, checks out the contents stored in the condition files 162-1 to 162-N to one of the portable devices 6-1 to 6-3 or checks-in the contents stored in the condition files 162-1 to 162-N.

The check-in/check-out management program 132 updates use condition data stored in the use condition files 162-1 to 162-N recorded on the contents database 114 in association with the check-in or check-out processing.

A copying management program 133 copies the contents stored in the use condition files 162-1 to 162-N in one of the portable devices 6-1 to 6-3 or copies the contents from the portable devices 6-1 to 6-3 to the contents database 114, based on the portable devices 6-1 to 6-3 recorded in the contents database 114.

A movement management program 134 moves the contents stored in the condition files 162-1 to 162-N recorded on the contents database 114 to one of the portable devices 6-1 to 6-3 or moves the contents from the portable devices 6-1 to 6-3 to the contents database 114, based on the use condition files 162-1 to 162-N recorded on the contents database 114.

The encryption system conversion program 135 converts the encryption system for the contents received by the purchase application 115 from the EMD 4-1, encryption system for the contents received by the purchase program 144 from the EMD 4-2, or the encryption system for the contents received by the purchase program 145 from the EMD 4-3, over the network 2, into the same encryption system as the contents stored in the condition files 162-1 to 162-N recorded on the contents database 114.

When checking out the contents to the portable devices 6-1 to 6-3, the encryption system conversion program 135 converts the check-out contents into the encryption system that can be used by the portable devices 6-1 to 6-3.

The compression system conversion program 136 converts the compression system for the contents received by the purchase application 115 from the EMD 4-1, compression system for the contents received by the purchase program 144 from the EMD 4-2, or the compression system for the contents received by the purchase program 145 from the EMD 4-3, over the network 2, into the same compression system as that of the contents stored in the condition files 162-1 to 162-N recorded on the contents database 114.

The encryption program 137 encodes the non-encrypted contents, read out from the CD and supplied from an audio recording program 113, in accordance with the same encoding system as that of the contents stored in the condition files 162-1 to 162-N recorded by the contents database 114.

A compression/expanding program 138 encodes the non-compressed contents read out from the CD and supplied from an audio recording program 113 in accordance with the same encoding system as that of the contents stored in the condition files 162-1 to 162-N recorded by the contents database 114. The compression/expanding program 138 expands (decodes) the encoded contents.

The use condition conversion program 139 converts data indicating the use conditions of the contents received from the EMD server 4-1 by the purchase application 115, or the so-called usage rule, data showing the use conditions of contents received from the EMD server 4-2 by the purchase application 115 or data showing use conditions of contents received from the EMD server 4-3 by the purchase program 145 over the network 2, in accordance with the same format as that of the use condition data stored in the condition files 162-1 to 162-N recorded by the contents database 114.

When checking out contents to the portable devices 6-1 to 6-3, the use condition conversion program 139 converts the use condition data into use condition data that can be utilized by the portable devices 6-1 to 6-3.

Before executing the processing for copying, movement, check-in or check-out of the contents, the use condition management program 140 detects modification of the use condition data based on a hash value associated with the use condition data stored in the condition files 162-1 to 162-N recorded by the contents database 114. The use condition management program 140 updates the hash value associated with the use condition data in association with the updating stored in the in the condition files 162-1 to 162-N recorded by the contents database 114 in conformity to the copying, movement, check-in or check-out of the contents.

The authentication program 141 executes the processing of reciprocal authentication between the contents management program 111 and the purchase application 115 and executes the processing of reciprocal authentication between the contents management program 111 and the purchase program 144. The authentication program 141 memorizes an authentication key used in the processing of reciprocal authentication between the EMD server 4-1 and the purchase application 115, that between the EMD server 4-2 and the purchase program 144 and that between the EMD server 4-3 and the purchase program 145.

The authentication key used in the processing of reciprocal authentication by the authentication program 141 is not stored in the authentication program 141, when the contents management program 111 is installed on the personal computer 1, and is supplied from the EMD registration server 3 and stored in the authentication program 141 when the registration processing is executed regularly by a display operation command program 112.

When the contents stored in the use condition files 162-1 to 162-N recorded by the contents database 114 are reproduced by the personal computer 1, the decoding program 142 decodes the data.

When the pre-set contents are checked out to the portable device 6-2, or pre-set contents are checked in from the portable device 6-2, the driver for PD 143 sends a contents or a command for executing the pre-set processing to the portable device 6-2.

When the pre-set contents are checked out to the portable device 6-1, or pre-set contents are checked in from the portable device 6-1, the driver for PD 143 sends a contents or a command for executing the pre-set processing to a device driver 116-1.

When the pre-set contents are checked out to the portable device 6-3, or pre-set contents are checked in from the portable device 6-3, the driver for PD 143 sends a contents or a command for executing the pre-set processing to the device driver 116-2.

The purchase program 144 is a so-called plug-in program installed along with the contents management program 111 and is supplied from the EMD registration server 3 over the network 2 or supplied as it is recorded on a pre-set CD. When installed on the personal computer 1, the purchase program 144 transmits or receives data and the contents management program 111 over an interface of a pre-set form owned by the contents management program 111.

The purchase program 144 is stated with shuffled or encrypted instructions and is designed to hide the processing contents from outside to render decoding of the processing contents different. For example, the purchase program 144 is formulated so that a user directly reading out the purchase program 144 cannot identify the instructions.

The purchase program 144 requests the EMD server 4-2 to send pre-set contents over the network 2, while receiving the contents from the EMD server 4-2. When receiving the contents from the EMD server 4-2, the purchase program 144 charges the fee.

The purchase program 145 is a program installed along with the contents management program 111 and requests transmission of pre-set contents to the EMD server 4-3 whilst receiving the contents from the EMD server 4-3. When receiving the contents from the EMD server 4-3, the purchase program 145 charges the fee.

The display operation command program 112 causes an image of a pre-set window on the display 20, based on a filtering data file 181, a display data file 182, picture files 183-1 to 183-K or a hysteresis data file 184, while instructing the contents management program 111 to execute the processing such as check-in or check-out based on actuation of the keyboard or the mouse 19.

The filtering data file 181, which memorizes data for weighting the contents stored in contents files 161-1 to 161-N recorded on the contents database 114, is stored in the HDD 21.

The display data file 182, which memorizes data corresponding to the contents stored in the contents files 161-1 to 161-N recorded on the contents database 114, is stored in the HDD 21.

The picture files 183-1 to 183-K, which memorize pictures corresponding to the contents stored in the contents files 161-1 to 161-N recorded on the contents database 114, or pictures corresponding to a package as later explained, are stored in the HDD 21.

If there is no necessity of distinguishing the picture files 183-1 to 183-K from each other, they are simply termed picture files 183.

The hysteresis data file 184, which memorizes hysteresis data such as the number of times and the date of check-out and check-in of contents stored in the contents files 161-1 to 161-N recorded on the contents database 114, is stored in the HDD 21.

The display operation command program 112 sends a pre-stored ID of the contents management program 111 at the time of registration processing, while receiving the authentication key and the EMD selection program 131 from the EMD registration server 3, to send the authentication key and the EMD selection program 131 to the contents management program 111.

The audio recording program 113 demonstrates the picture of a pre-set window to read out data such as audio recording time of the contents from the CD, which is an optical disc 42 loaded on the drive 22, based on the actuation of the keyboard 18 or the mouse 19.

The audio recording program 113 requests a www server 5-1 or 5-2 to transmit data corresponding to the CD, such as name of an album or an artist, or data corresponding to the contents recorded on the CD, such as a title of a music air, over the network 2, based on the audio recording time of the contents recorded on the CD. Also, the audio recording program 113 receives data corresponding to the contents recorded on the CD from the www server 5-1 or 5-2.

The audio recording program 113 sends data corresponding to the received contents recorded on the CD to the display operation command program 112.

If fed with a command for audio recording, the audio recording program 113 reads out contents from the CD which is the optical disc 42 loaded on the drive 22 to output the read-out contents to the contents management program 111.

The contents database 114 stores the contents supplied from the contents management program 111 in a form compressed and encrypted in accordance with a pre-set system in one of the contents files 161-1 to 161-N for recording on the HDD 21. The contents database 114 stores use condition data, corresponding to the contents stored in the contents files 161-1 to 161-N, in one of the use condition files 162-1 to 162-N associated with the contents files 161-1 to 161-N memorizing the contents for recording on the HDD 21.

It is possible for the contents database 114 to write the contents files 161-1 to 161-N or the use condition files 162-1 to 162-N as records.

For example, the use condition data corresponding to the contents stored in the contents file 161-1 is stored in the use condition file 162-1. The use condition data corresponding to the contents stored in the contents file 161-N is stored in the use condition file 162-N.

Meanwhile, the data recorded on the use condition files 162-1 to 162-N correspond to data recorded on a terminal database or data recorded on the air database, as later explained. That is, the contents database 114 is constructed to encompass the terminal database and the air database, as later explained.

If there is no necessity of demarcating the contents files 161-1 to 161-N, these are simply termed contents files 161. Likewise, if there is no necessity of demarcating the use condition files 162-1 to 162-N, these are simply termed use condition files 162.

The purchase application 115 is supplied from the EMD registration server 3 over the network 2 or supplied as it is recorded on a pre-set CD-ROM. The purchase application 115 requests the EMD server 4-1 to send pre-set contents over the network 2, while receiving the contents from the EMD server 4-1 to send the received contents to the contents management program 111. The purchase application 115 charges the fee when receiving contents from the EMD server 4-1.

The manner of associating the data stored in a display data file 82 with the contents files 161-1 to 161-N stored in the contents database is hereinafter explained.

The contents stored in one of the contents files 161-1 to 161-N belong to a pre-set package. In more detail, the package is one of the original package, a my-select package or a filtering package.

The original package encompasses one or more contents and is associated with the classification of the contents in the EMD servers 4-1 to 4-3, such as a so-called album, or a CD. The contents belong to an original package while it cannot belong to plural original packages. The original package encompassing the contents cannot be modified. The user is able to edit part of the information corresponding to the original package, that is to add the information or to change the added information.

The my-select package encompasses one or more contents optionally selected by a user. Which of the contents belongs to the my-select package can be optionally edited by the user. The contents can belong to one or more my-select packages simultaneously. It is also possible for the contents to belong to none of the my-select packages.

The filtering package encompasses contents selected based on the filtering data stored in the filtering file 181. The filtering data is furnished over the network 2 from the EMD servers 4-1 to 4-3 or from the www server 5-1 or 5-2, or is recorded on a pre-set CD and furnished in this form. The user can edit the filing data stored in the filtering data file 181.

The filtering data serves as a reference in selecting pre-set contents or in computing the weight allotted to the contents. For example, if filtering data for the J-pops (Japan pops) best-ten for this week is used, the personal computer 1 is able to specify the No. 1 or No. 10 contents of J-pops.

The filtering data file 181 includes filtering data for selecting the contents in the order of the diminishing number of times of check-out during the past one month, filtering data for selecting the contents with the larger number of times of check-out during the past half year or the filtering data selecting the contents containing the letter "love" in the title of the air.

In this manner, the contents of the filtering package is selected as the filtering data is associated with contents display data 221 associated with the contents, inclusive of the data set by the user in the contents display data 221, or with the hysteresis data file 184.

The driver 117 drives the audio input/output interface 24, under control by the contents management program 111, to input contents as digital data supplied from outside, to furnish the contents to the contents management program 111. Alternatively, the driver 117 outputs analog signals associated with the contents supplied from the contents database 114 via the contents management program 111.

Figure 5:
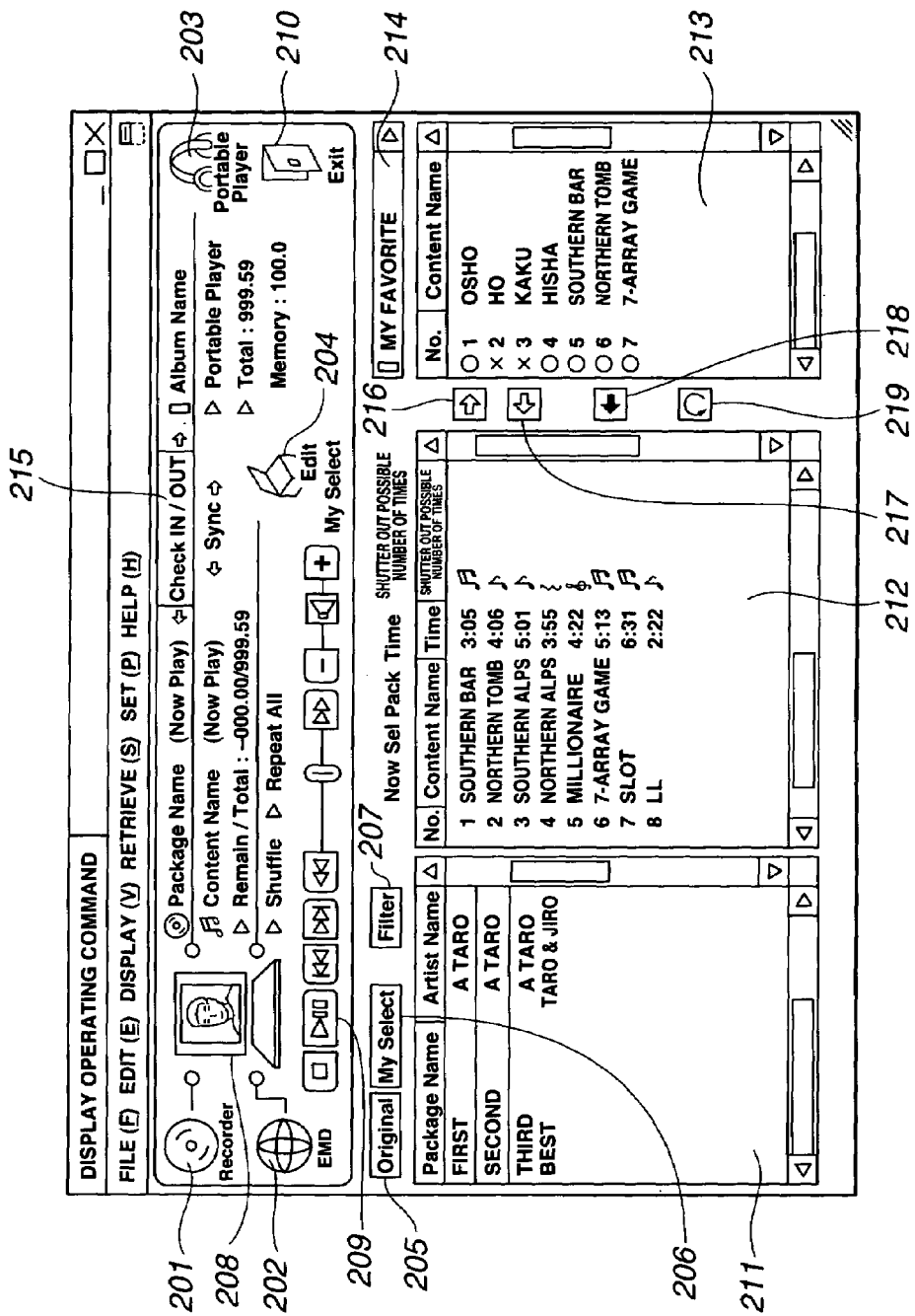
FIG. 5 illustrates an instance of a display operation command window.

FIG. 5 shows an embodiment of a display operating command window in which the display operation command program 112 is demonstrated on a display 20 on startup of the display operation command program 112.

In the display operating command window, there are arranged a button 201, for starting the audio recording program 113, a button 202, for starting the EMD selection program 131, a button 203 for demonstrating the field for setting the check-in or check-out and a button 204 for demonstrating a field for editing the my-select package.

If the button 205 is selected, data corresponding to the original package is displayed on the field 211. If the button 206 is selected, data associated with the my-select package is displayed in the field 211. If the button 207 is selected, data corresponding to the filtering package is displayed on the field 211.

The data displayed in the field 211 is package-related data exemplified by name of the package or the artist.

For example, in FIG. 5, the package name "first" and the artist name "A-taro" and the package name "second" and the artist name "A-taro" are displayed on the field 211.

In the field 212, there are displayed data associated with the contents belonging to the package selected in the field 211. Among data displayed in the field, there are, for example, title of the air, play time or number of times of possible check-out.

For example, since the package corresponding to the package name of "second" is selected in FIG. 5, the title of the air "bar of the south" and the number of times of possible check-out, corresponding to the contents belonging to the package name of "second" and the title of the air "tomb of the north" and the number of times of possible check-out are displayed in the field 212. It is noted that, for example, each quaver corresponds to one check-out, such that two quavers denote two check-outs.

Thus, a quaver as the number of possible check-out, displayed on the field 212, denotes that the associated contents can be checked out once.

A rest note, as the number of times of possible check-out displayed in the filed 212, denotes that the associated contents cannot be checked out, that is that the number of possible checkout is 0. However, the personal computer 1 is able to reproduce the contents. On the other hand, the G-clef, as the number of times of possible check-out, displayed on the field 212, indicates that there is no limitation on the number of times of check-out of the corresponding contents, that is that check-out can be performed any desired number of times.

Meanwhile, the number of times of possible check-out may also be displayed with e.g., numerals, instead of with pre-set figures, such as those of circles, stars or months).

In the display operation command window, there is arranged a field 208 for displaying pictures associated with selected packages or contents, such as with the picture files 183-1 to 183-K. A button 209 is clicked when reproducing the selected contents, that is when outputting the speech associated with the contents on a speaker 45.

If the button 205 is selected, such that data associated with the original package is displayed in the field 211, and the title of the air of pre-set contents displayed in the field 212 is selected to effect erasure, the display operation command program 112 causes the contents management program 111 to erase pre-set contents stored in the contents database 114 in association with the selected title.

If the button of the window demonstrated by the audio recording program 113 (button 255 as later explained) is selected, and the contents read out from the CD are recorded in the contents database 114, the display operation command program 112 demonstrates a field 213 displaying the title of the air of the contents memorized in a pre-specified one of the portable devices 6-1 to 6-3.

If the button of the window demonstrated by the audio recording program 113 is selected, that is activated, and the contents read out from the CD have been recorded in the contents database 114, the display operation command program 112 causes the field 213 to be displayed. The field 213 demonstrates the title of the air of the contents stored in the pre-specified one of the portable devices 6-1 to 6-3.

If the button of the window displayed by the audio recording program 113 is selected, and the contents read out from the CD are recorded in the contents database 114, the display operation command program 112 demonstrates the field 213 displaying the name of the contents memorized in a pre-specified one of the portable devices 6-1 to 6-3.

If the button of the window demonstrated by the audio recording program 113 is selected, and the contents read out from the CD are recorded on the contents database 114, the display operation command program 112 causes the contents management program 111 to check out the contents, recorded in the contents database 114 and read out from the CD, in the pre-specified one of the portable devices 6-1 to 6-3.

In the field 213 is displayed a symbol indicating whether or not the contents can be checked-in in the personal computer 1 on its leftmost side. For example, "○" lying on the leftmost side of the field 213 indicates that the contents corresponding to the title of the air of the contents can be checked-in in the personal computer 1, that is that the contents have been checked out from the personal computer 1. On the other hand, "x" lying on the leftmost side of the field 213 indicates that the contents corresponding to the number of the air of the contents cannot be checked-in in the personal computer 1, that is that the contents have not been checked out from the personal computer 1 and have been checked out from another personal computer 1.

When the display operation command program 112 has displayed the field 213 in the display operating command window, the display operation command program 112 demonstrates, in the display operating command window, a field 214 displaying the title of the portable package to which belong the contents stored in the pre-specified one of the portable devices 6-1 to 6-3, that is the package to which belong the contents stored in one of the portable devices 6-1 to 6-3, a button 210 for closing the field 213, and a button 215 for executing the check-in or check-out.

Also, when the display operation command program 112 has displayed the field 213 in the display operating command window, the display operation command program 112 causes buttons 216, 217, 218 and 219 to be arrayed in the display operating command window. These buttons 216, 217, 218 and 219 are adapted to set the check-in of contents associated with the title of the air selected in the field 212, to set the check-in of the contents associated with the title of the air selected in the field 213, to set the check-in of all contents associated with the title of the contents displayed in the field 213 and to cancel the setting of the check-in or check-out.

If simply the check-in or check-out by the actuation of the buttons 216 to 219 is set, the personal computer 1 cannot execute the processing of the check-in or check-out.

If, after setting the check-in or check-out by the actuation of the buttons 216 to 219, the button 215 is clicked, the display operation command program 112 causes the contents management program 111 to execute the processing of check-in or check-out. That is, if the button 215 is clicked, the display operation command program 112 operates, based on the setting of the check-in or check-out, to cause the management program 111 to transmit the contents to one of the portable devices 6-1 to 6-3 or to transmit a pre-set command associated with the check-in, such as a command for erasing the pre-set contents stored in one of the portable devices 6-1 to 6-3, while allowing to update use condition data stored in the use condition file 162 associated with the transmitted command or contents.

If check-in or check-out is executed, the display operation command program 112 updates the hysteresis data stored in the hysteresis data file 184 in association with the transmitted contents or commands. The hysteresis data is made up of the information specifying the contents as checked-in or checked-out, the date of check-in or check-out of the contents, and the titles of the portable devices 6-1 to 6-3 on which the contents have been checked out.

Since the processing for setting the check-in or check-out can be executed in a shorter time, the user can be promptly apprised of the state after execution of the processing of the check-in or check-out to decrease the number of times of time-consuming processing operations of check-in or check-out to shorten the time necessary for the check-in or check-out, inclusive of the setting and execution.

Figure 6:
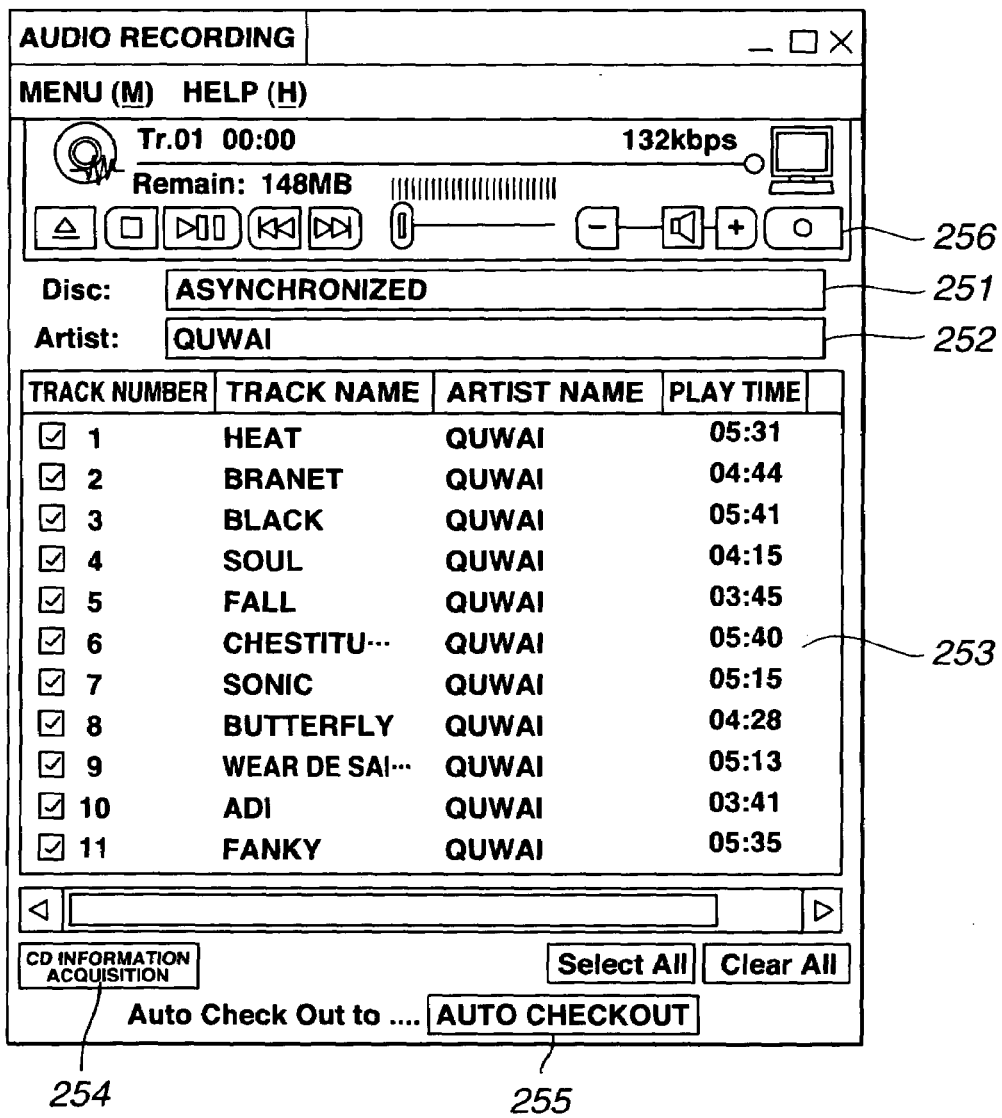
FIG. 6 illustrates an example of a window demonstrated on the display by the audio recording program 113.

FIG. 6 illustrates an example of a window in which the audio recording program 113 is to demonstrate on the display 20. For example, the audio recording program 113 displays the CD title, such as "asynchronized" in the field 251, based on the CD information received from the www server 5-2. The audio recording program 113 demonstrates the name of an artist, such as "Quai", in the field 252.

Based on the CD information received from the www server 5-2, the audio recording program 113 displays the titles of airs, such as "heat", "planet", "black" or "soul", in the title indication portion of the field 253. Similarly, the audio recording program 113 displays the name of an artist, such as "Quai", in the artist indicating portion of the field 253.

After receiving the pre-set CD information, the audio recording program 113 stores the CD information in a pre-set directory of the HDD 21.

If, by the clicking of the button 254, the audio recording program 113 is instructed to acquire the CD information, the audio recording program 113 first retrieves the pre-set directory of the HDD 21. If the CD information is stored in the directory of the audio recording program 113, the audio recording program 113 displays a dialog box, not shown, to permit the user to use the CD information stored in the directory.

If the button 256 commanding the start of the recording of the contents arrayed in the window displayed by the audio recording program 113 is clicked, the audio recording program 113 reads out the contents from the CD stored in the drive 22 to furnish the read-out contents to be routed to the contents management program 111 along with the CD information. The compression/expanding program 138 of the contents management program 111 compresses the contents supplied from the audio recording program 113 in a pre-set compression system. The encryption program 137 encrypts the compressed contents. The use condition conversion program 139 generates use condition data associated with the compressed and encrypted contents.

The contents management program 111 sends the compressed and encrypted contents along with the use condition data to the contents database 114.

The contents database 114 generates the contents file 161 and the use condition file 162, associated with the contents received from the contents management program 111, to store the contents in the contents file 161, while storing the use condition data in the use condition file 162.

When the contents and the use condition data associated with the contents have been stored in the contents database 114, the contents management program 111 sends to the display operation command program 112 the CD information received from the audio recording program 113 and the use condition data.

Based on the CD information and the use condition data associated with the contents stored in the contents database 114, the display operation command program 112 generates display data to be stored in the display data file 182.

In the window displayed by the audio recording program 113, there is arranged a button 255 for setting whether or not, on recording the contents read out from the CD on the contents database 114, the contents read out from the CD should be checked out automatically in one of the portable devices 6-1 to 6-3.

If, for example, the button 255 is clicked, the audio recording program 113 displays a pull-down menu indicating the list of the portable devices 6-1 to 6-3. If the user selects one of the portable devices 6-1 to 6-3 from the pull-down menu, the personal computer 1 automatically checks out the contents recorded from the CD in the selected one of the portable devices 6-1 to 6-3. If the user has selected "not checked out" from the pull-down menu, the personal computer 1 does not check out when recording the contents from the CD.

Thus, if only the button 255 of the window demonstrated by the audio recording program 113 is rendered active, the personal computer 1 is able to cause a pre-specified one of the portable devices 6-1 to 6-3 to check out the contents read out from the CD.

Figure 7:
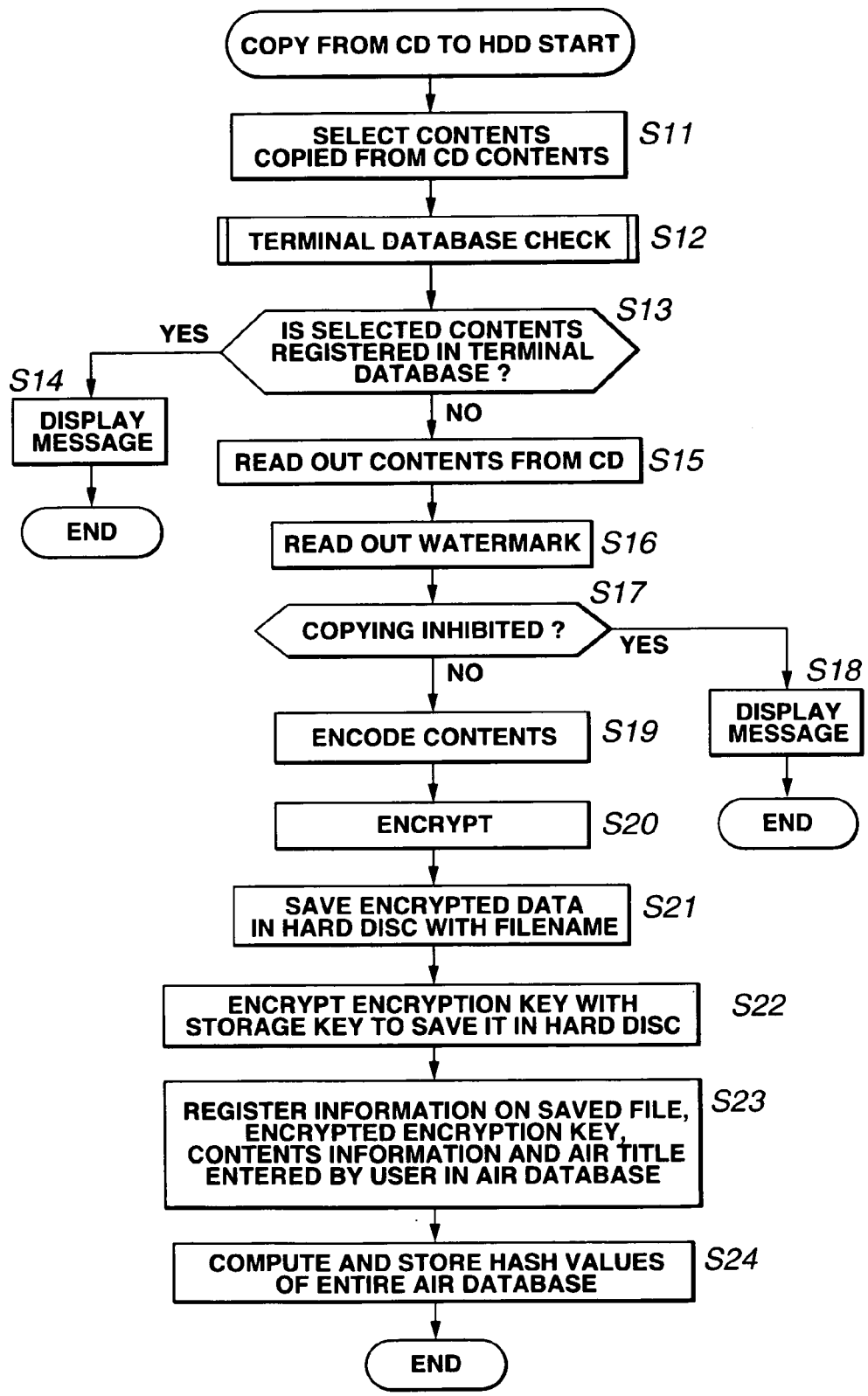
FIG. 7 is a flowchart for illustrating the processing of copying contents from the CD to the HDD 21.

Referring to the flowchart of FIG. 7, the processing of transferring the contents reproduced from the CD loaded on the drive 22 to the HDD 21 for copying by the CPU 11 executing the contents management program 111, display operation command program 112, audio recording program 113 and the contents database 114 is now explained. If the user actuates the keyboard 18 or the mouse 19 to input a command of transferring the contents reproduced from the CD, not shown, loaded on the drive 22, to the CPU 11 via the interface 17 for copying, the audio recording program 113 at step S11 demonstrates a GUI (graphical user interface) shown for example in FIG. 6 for selecting the contents to be copied on the display 20 via the interface 17.

Specifically, the audio recording program 113 reads-in the TOC (table of contents) of the CD loaded on the drive 22 to acquire the information on the contents contained in the CD for demonstration on the display 20. Alternatively, the audio recording program 113 reads out the contents-based ISRC (International Standard Recording Code) contained in the CD to acquire the information on the contents which then is demonstrated on the display 20. Alternatively, when the button 254 is clicked, the audio recording program 113 accesses the www server 5-1 or 5-2, through the network 2, to acquire the information of the contents of the CD to demonstrate the number of the air corresponding to the contents on the field 253.

The user actuates the keyboard 18 or the mouse 19, using the GUI of the display 20, to select the contents to be copied, such as by clicking a check box corresponding to the title of the air displayed on the field 253.

Then, at step S12, the audio recording program 113 causes the use condition management program 140 to check a terminal database stored in the HDD 21, corresponding to the use condition files 162-1 to 162-N of the contents database 114 shown in FIG. 4. This terminal database check processing is shown in detail in the flowchart of FIG. 8.

At step S31, the use condition management program 140 calculates the hash value of the entire terminal database to compare at step S32 the calculated value to the hash value stored previously.

Meanwhile, if no data is recorded in the terminal database, the use condition management program 140 does not compute hash values.

Figures 9, 10:
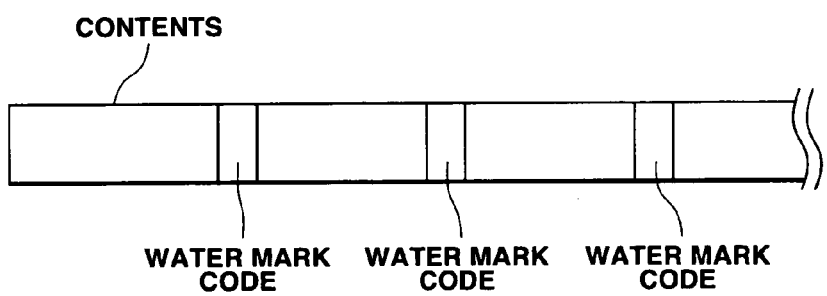
FIG. 9 shows an instance of a terminal database.
FIG. 10 illustrates watermarks.

That is, there is provided in the HDD 21 the terminal database in which the ISRC of the contents recorded in the past and the date and time of copying are stored as the management information managing the contents recorded on the HDD 21, as shown in FIG. 9. In this embodiment, the respective ISRC and the date and time of the copying are stored as to three items of from item 1 to item 3. The hash values of the entire terminal database, which are derived from the date and time of copying and the ISRC of the entire contents stored in this terminal database are computed by the CPU 32 of the adapter 26 and stored in the non-volatile memory 34, at step S38, as will be explained subsequently. The hash values are obtained on applying the hash function to the data.

The hash function is a unidirectional function which maps a message of an optional length to a compressed value of a short fixed length, and is characterized in that back conversion of compressed data by it is rendered difficult. The hash function is also characterized in that collision of the hash values with each other is not likely to occur, that is that it is difficult to allocate the same value to two different messages. The hash function is occasionally used as a check sum for verifying that the message has not been modified in the course of its transmission, or used in a digital signature. The hash function may be exemplified by SHA (secure hash algorithm) and MD (message digest) 5.

The use condition management program 140 at step S31 computes the hash values, in the same way as was executed by the CPU 32. At step S32, the use condition management program 140 requests the CPU 32 to read out the hash values stored in the non-volatile memory 34 to compare at step S31 the transferred hash value to the hash value which the CPU 32 has computed.

At step S33, the use condition management program 140 at step S31 checks whether or not the hash value it has computed coincides with the previous hash value of the terminal database stored in the non-volatile memory 34. If the result is NO, the use condition management program 140 verifies that the terminal database has been modified and generates at step S34 a message reading: "the terminal database has been modified and hence cannot be copied" for the use condition management program 140 to output the generated message over the interface 17 to the display 20 for display. The use condition management program 140 then terminates the processing. That is, in this case, the processing of reproducing the contents recorded on the CD and copying the reproduced contents on the HDD 21 is inhibited.

If the hash value computed at step S31 coincides with the previous hash value, the program moves to step S35. The use condition management program 140 causes the audio recording program 113 to acquire from the CD the ISRC of the contents selected as contents for copying, specified at step S11. If the ISRC has not been recorded on the CD, the use condition management program 140 causes the audio recording program 113 to read out the TOC data of the CD to apply the hash function to the data to acquire data of a suitable length, such as 58 bits, to use this data in place of the ISRC.

At step S36, the use condition management program 140 checks whether or not the ISRC acquired at step S35, that is the selected contents, have been registered in the terminal database of FIG. 9. If the ISRC has not been registered in the terminal database, the contents have not been recorded in the HDD 21. Thus, the program moves to step S37 where the use condition management program 140 registers the ISRC of the contents and the current date and time in the terminal database. Meanwhile, the use condition management program 140 utilizes, as the current date and time, the value outputted by the RTC 35 of the adapter 26 transferred from the CPU 32. At step S38, the use condition management program 140 reads out data of the terminal database at the time point to transfer the read-out data to the CPU 32 to the adapter 26. The CPU 32 computes the hash value of the transferred data to store the computed hash value in the non-volatile memory 34. As explained above, the hash value, saved in this manner, is utilized at step S32 as the hash value stored previously.

At step S39, the use condition management program 140 sets an unregistered flag representing that the selected contents have not been registered in the terminal database. This flag is used at step S13 of FIG. 7, as later explained, when verifying whether or not the selected contents have been registered in this terminal database.

If it has been verified at step S36 that the ISRC of the selected contents has been registered in the terminal database, these selected contents are the contents previously registered at least once in the HDD 21. Thus, in this case, the program moves to step S40 where the use condition management program 140 checks, from the date and time of the selected contents registered in the terminal database, whether or not the current date and time, that is the current date and time outputted by the RTC 35 of the adapter 26, is not less than 48 hours older than the date and time of registration of the selected contents registered in the terminal database. If the current date and time is older by not less than 48 hours than the date and time of registration, copying on the HDD 21 is allowed, for the reason that, although the contents were recorded at least once, not less than 48 hours have elapsed since that time, so that, if the contents are again copied, copying of the contents in large quantities is virtually impossible. Thus, the program moves to step S41 where the use condition management program 140 changes the date and time of the terminal database from the date and time of the past registration to the current date and time outputted by the RTC 35. The program reverts to step S38 where the use condition management program 140 causes the CPU 32 to compute the hash value of the entire terminal database to save the computed hash value in the non-volatile memory 34. At step S39, the use condition management program 140 sets an unregistered flag in the contents.

If is has been verified at step S40 that the current date and time is not older by not less than 48 hours than the registered date and time, copying of the selected contents in the HDD 21 is inhibited. In this case, the program moves to step S42 where the use condition management program 140 sets a registered flag for the selected contents.

If, as the result of the processing at step S40, pre-set time has not elapsed, new copies of the contents cannot be generated. Thus, copying of the contents for ordinary use other than the illicit use is not unduly prohibited, while copying of the contents necessary for illicit marketing or distribution becomes virtually impossible. Although the criterium of decision at step S40 is not less than 48 hours, it may also be any time duration between 12 and 168 hours, without being limited to 48 hours.

Thus, by the terminal database check processing, described above, a flag indicating whether or not the selected contents have been registered in the HDD 21 is set.

Returning to FIG. 7, the copying management program 133 at step S113 checks whether or not the selected contents have been registered in the terminal database. If the selected contents have been registered, the program moves to step S14 where the copying management program 133 causes the audio recording program 113 to demonstrate on the display 20 a message reading: "this air has not been copied for more than 48 hours, so it cannot be copied". This apprises the user of the reason why the contents cannot be copies on the HDD 21.

If it has been found at step S13 that the selected contents have not been registered in the terminal database, the program moves to step S15 where the audio recording program 113 controls the driver to read out contents from the CD loaded therein. In these contents, water mark codes are inserted at pre-set positions, as shown in FIG. 10. The audio recording program 113 at step S16 extracts the water mark codes contained in the contents to verify at step S17 whether or not the water mark code indicates copy inhibition. If the water mark code indicates copy inhibition, the program moves to step S18 where the copying management program 133 causes the audio recording program 113 to display a message reading: "copying inhibited" via interface 17 on the display 20 to terminate the copying processing.

If conversely the water mark at step S17 does not indicate copy inhibition, the program moves to step S19 where the audio recording program 113 causes the compression/expanding program 138 to compress the contents by software processing in accordance with e.g., the adaptive transform acoustic coding (ATRAC) 3 (registered trade mark). At step S20, the audio recording program 113 causes the encryption program 137 to encrypt the contents, in accordance with data encryption standard (DES) system or the fast encipherment algorithm (FEAL), using the pre-set encryption key stored in the memory 13. The encryption key, generated based on the random numbers, generated by software, or on the random numbers generated by the CPU 32 of the adapter 26, may be used. By executing the encryption processing not only by the personal computer 1, but also by the CPU 32 of the adapter 26 as the hardware, loaded as ancillary device to the personal computer 1, it becomes possible to execute the encryption which is more difficult to decode.

Then, at step S21, the audio recording program 113 transfers the encrypted data to the contents database 114 to save the data as a file (contents file 161) with a filename in the HDD 21. Alternatively, the data may be saved as the position information, such as the number of bytes as from the leading end, is accorded as a portion of the sole file.

This saving operation may be executed simultaneously in parallel with or separately from the above-mentioned compression encoding processing and the encryption processing.

At the next step S22, the audio recording program 113 causes the encryption program 137 to encrypt the pre-set encryption key stored previously in the non-volatile memory 34 in accordance with the above-mentioned DES or FEAL system to store the encrypted encryption key in an air database of the HDD 21, corresponding to the use condition files 162-1 to 162-N of the contents database 114 shown in FIG. 4.

At step S23, the audio recording program 113 groups the information concerning the saved file, encrypted encryption key, the information on the contents and the elements of the information of the number of airs inputted by the user through the GUI together as a set to register the set in the air database of the HDD 21, that is to record the set as the use condition files 162-1 to 162-N. At step S24, the audio recording program 113 causes the CPU 32 to compute the hash values of the entire air database to store the computed hash values in the non-volatile memory 34.

In this manner, the air database, shown for example in FIG. 11, is registered on the HDD 21. In the present embodiment, the filenames of the items 1 to 3, the encrypted encryption key, title and length of the musical air, replay conditions, such as date and time of start, date and time of end and limitations on the number of times, number of times of playback counter, charging conditions on playback, the copying conditions, such as the number of times of copying, number of times of copying counter and copying conditions, are recorded.

For example, in the system prescribed by the SDMI (secure digital music initiative), the number of times the contents can be checked out is set to three in association with the contents copied from a CD.

If pre-set time has elapsed as from the time of duplication of the contents from the CD to the HDD 21, it becomes again possible to duplicate the contents, so that a few times of duplication is possible for the private use by the user. If attempts are made to duplicate the contents in large quantities, much time is required to render the duplication virtually impossible. If the personal computer 1 is malfunctioning such that the contents recorded on the HDD 21 are erased, it is possible to duplicate again the erased contents after lapse of a pre-set time for recording on the HDD 21.

It is also possible to co-own the contents of the terminal database recorded on the HDD 21 through e.g., the network 2.

In the foregoing, explanation has been made of the case in which the date and time of duplication is stored in association with the ISRC. If the information discriminating the contents or the CD, other information, such as the title of the air or album or combination thereof may also be used.

Figure 12:
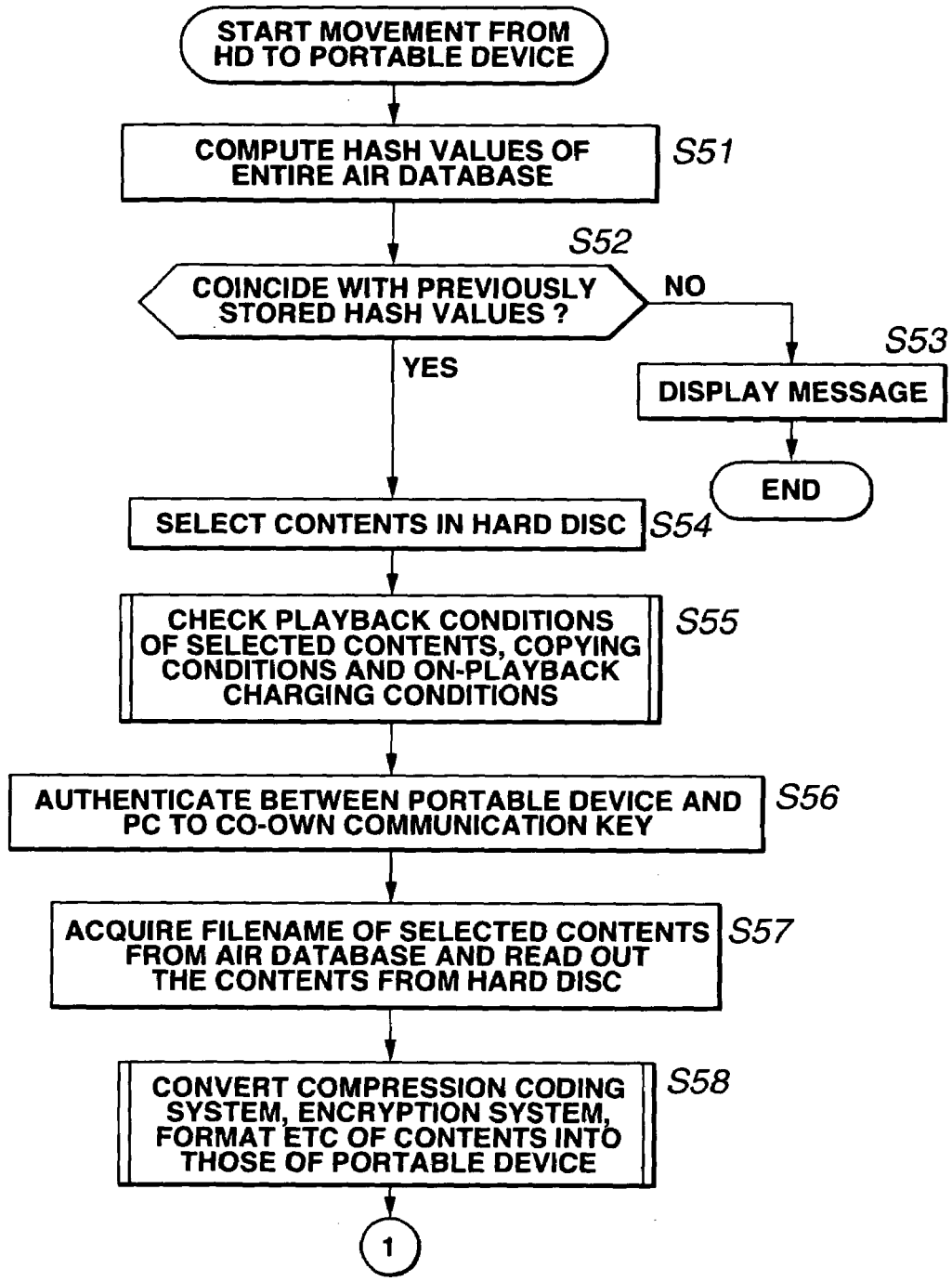
FIG. 12 is a flowchart for illustrating the operation of moving contents from the HDD 21 to the portable device 6.
Figure 13:
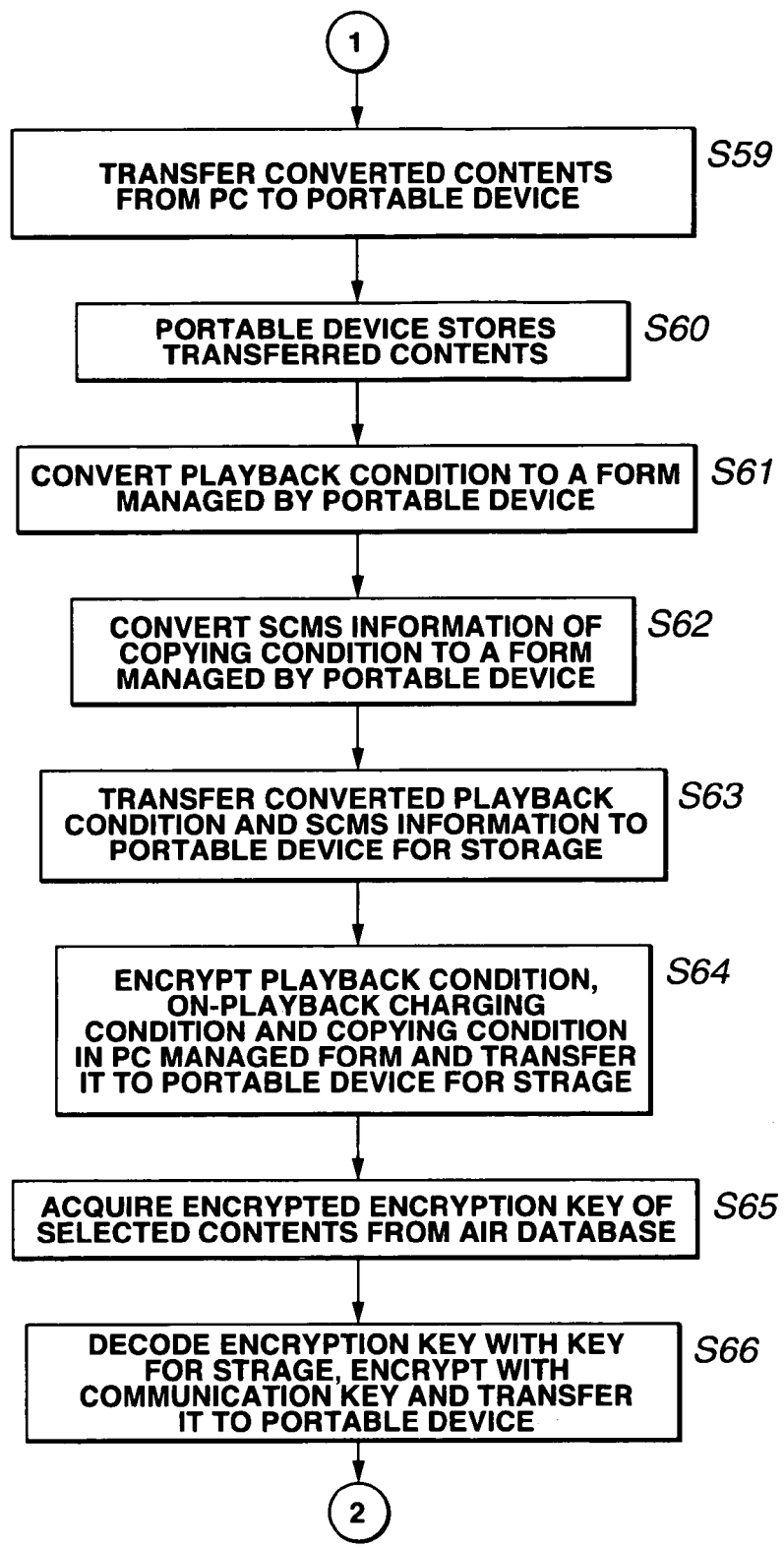
FIG. 13, continuing to FIG. 12, is a flowchart for illustrating the operation of moving contents from the HDD 21 to the portable device 6.
Figure 14:
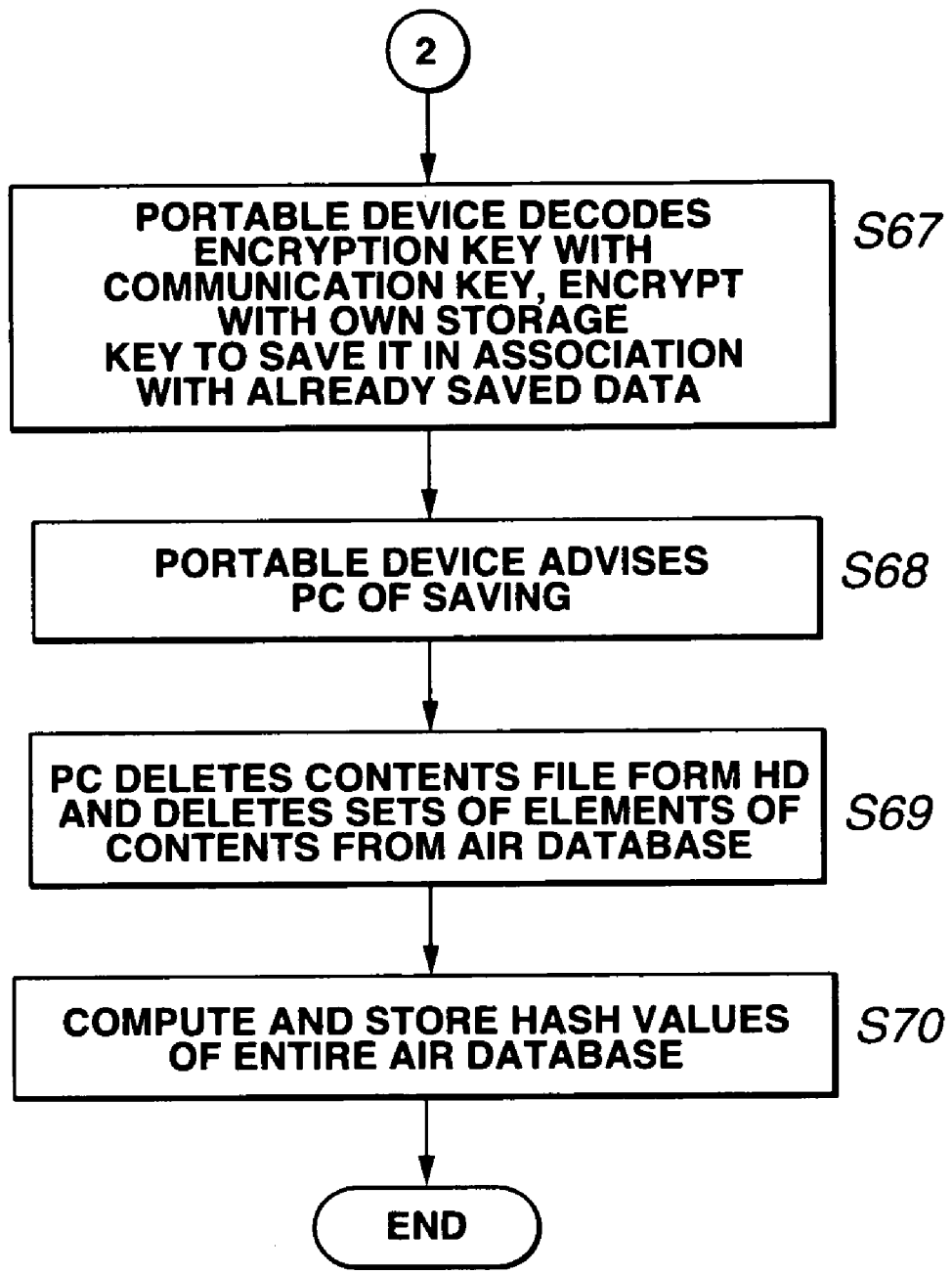
FIG. 14, continuing to FIG. 13, is a flowchart for illustrating the operation of moving contents from the HDD 21 to the portable device 6.

Referring to the flowchart of FIGS. 12 to 14, explanation is made of the processing of transferring the contents from the HDD 21 to the flash memory 61 (such as memory stick, registered trade mark) of the portable device 6 and the processing of check-out, by the CPU 11 executing the display operation command program 112 and the contents management program 111 and the CPU 52 executing the main program.

First, the processing of contents movement is explained. At step S51, the movement management program 134 causes the use condition management program 140 to compute the hash values of the entire air database. At step S52, the movement management program 134 compares the computed hash values with the hash value computed previously by the CPU 32 and stored in the non-volatile memory 34. If the two are non-coincident, the movement management program 134 advances to step S53 to cause the display operation command program 112 to display a message reading: "the air database may have been modified" on the display 20 to terminate the processing. This processing is the dame as that of the processing of steps S31 to S34. In this case, contents movement from the HDD 21 to the portable device 6 is not executed.

At step S54, the movement management program 134 causes the contents information, registered in the air database provided on the HDD 21 as a part of the contents database 114, to be read out therefrom to cause the display operation command program 112 to demonstrate the read-out contents in on the display 20 as the GUI for selection. Based on this GUI for selection, the user selects the contents moved from the HDD 21 to the portable device 6 by clicking the air title displayed on the field 212 of FIG. 5 or the button 216. The movement management program 134 at step S55 checks the replay conditions, replay conditions and on-playback charging conditions of the contents selected at step S54. This processing will be explained in detail with reference to the flowchart of FIG. 15.

Then, at step S56, reciprocal authentication processing is carried out between the authentication program 141 of the personal computer 1 and the CPU 53 of the portable device 6, whereby the key for communication is co-owned.

For example, it is assumed that a master key KM is previously stored in the flash memory 61 or in the EEPROM 68 of the portable device 6, and that the personal key KP and the ID are previously stored in the RAM 13 of the personal computer 1 or in a pre-set file in the HDD 21. The CPU 53 is supplied from the authentication program 141 with the ID previously stored in the RAM 13 and applies the hash function to the ID and the master key KM the authentication program 141 itself owns to generate the key which is the same as the personal key of the personal computer 1 memorized in the RAM 13. By so doing, a common personal key is co-owned by both the personal computer 1 and the portable device 6. Using this personal key, it is possible to generate a transient communication key.

Alternatively, the ID and the master key KMP are previously stored in the RAM 13 of the personal computer 1, while the ID of the portable device 6 and the master key KMM are stored in the flash memory 61 of the portable device 6. The respective IDs and the master keys are reciprocally transmitted so that one of the RAM 13 and the flash memory 61 applies the hash function to the ID and the master key to the other to generate the personal key of the other to generate a transient conventional key further from the personal key.

As the method for authentication, the IOS (international organization for standardization) 9798-2, for example, may be used.

If reciprocal authentication has not been carried out correctly, the processing is terminated. However, if the reciprocal authentication has been carried out correctly, the movement management program 134 causes the contents database 114 to read out the filename of the selected contents from the air database to read out the contents of the selected filename, encrypted by the processing of step S20 of FIG. 7, from the HDD 21. At step S58, the movement management program 134 executes the processing of converting the compression encoding system (processing at step S19), encryption system (processing of step S19), encryption system (processing of step S20) and the format (e.g., header system) for the contents as digital data read out from step S57 into those of the portable device 6. This conversion processing is explained subsequently by referring to the flowchart of FIG. 17.

At step S59, the movement management program 134 causes a driver for PD 143 to transfer the contents converted at step S58 via USB port 23 to the portable device 6. On reception of the contents transferred via USB connector 56, the CPU 53 of the portable device 6 directly causes the contents to be memorized directly in the flash memory 61.

At step S61, the movement management program 134 causes the use condition conversion program 139 to convert the replay conditions of the selected contents registered in the air database, such as the start date and time, end date and time or limitations on the number of times, into the form supervised by the portable device 6. At step S62, the movement management program 134 causes the use condition conversion program 139 to convert the SCMS information in the copying conditions registered in the air database of the selected contents into the form supervised by the portable device 6. At step S63, the movement management program 134 causes the driver for PD 143 to transfer the replay conditions converted at step S61 and the SCMS information converted at step S62 to the portable device 6. The CPU 53 of the portable device 6 saves the transferred replay conditions and SCMS information in the flash memory 61.

At step S64, the movement management program 134 also causes the driver for PD 143 to transfer the driver for PD 143 to transfer the replay conditions, on-playback charging conditions or copying conditions, registered in the air database of the selected contents, to the portable device 6, in the form in which the CPU 11 handles them in the air database, for storage in the flash memory 61.

At step S65, the movement management program 134 causes the contents database 114 to read out the encrypted encryption key of the selected contents. At step S66, the movement management program 134 causes the decoding program 142 to decode the encryption key with a key for storage saved in the RAM 13 to cause the encryption program 137 to encrypt the encryption key with the key for communication. The movement management program 134 causes the driver for PD 143 to transfer the encryption key encrypted by the key for communication to the encryption program 137.

At step S65, the movement management program 134 causes the contents database 114 to read out the encrypted encryption key of the selected contents from the air database. At step S66, the movement management program 134 decodes the encryption key with the key for storage saved in the RAM 13 to cause the encryption program 137 to encrypt the decoded key with the key for communication. The movement management program 134 causes the driver for PD 143 to transfer the encryption key encrypted by the key for communication to the portable device 6.

The CPU 53 of the portable device 6 decodes the encryption key transferred from the personal computer 1 with the key for communication co-owned with the reciprocal authentication processing and encrypts the decoded key using its own key for storage to store the encrypted encryption key in the flash memory 61 in association with the previously saved data.

On completion of the saving of the encryption key, the CPU 53 at step S68 advises the personal computer 1 of the fact that the encryption key has been saved. On reception of this notification from the portable device 6, the movement management program 134 of the personal computer 1 at step S69 causes the contents database 114 to delete the contents files 161 associated with the contents and to delete the set of elements of the contents, that is the use condition files 162, from the air database. This produces movement instead of copying. At step S70, the movement management program 134 causes the CPU 32 of the adapter 26 to transfer the data of the air database, to compute the entire hash values and to save the computed hash values in the non-volatile memory 34. The hash values, thus obtained, are used at the above-mentioned step S52 as the previously saved hash values.

The processing of checking out the contents from the personal computer 1 to the portable device 6 is now explained. The processing of checking out the contents from the personal computer 1 to the portable device 6 is basically similar to the processing of moving the contents from the personal computer 1 of FIGS. 12 to 14 to the portable device 6. That is, the check-out processing is executed in the personal computer 1 by the check-in/check-out management program 132, and is similar to the processing for movement except executing the processing of updating the number of times of check-out of the checked-out contents, (or number of times of possible check-out) as recorded on the air database, at step S69 of FIG. 14, in place of the processing of deleting the contents. Therefore, the processing is not explained in detail for simplicity.

Figure 15:
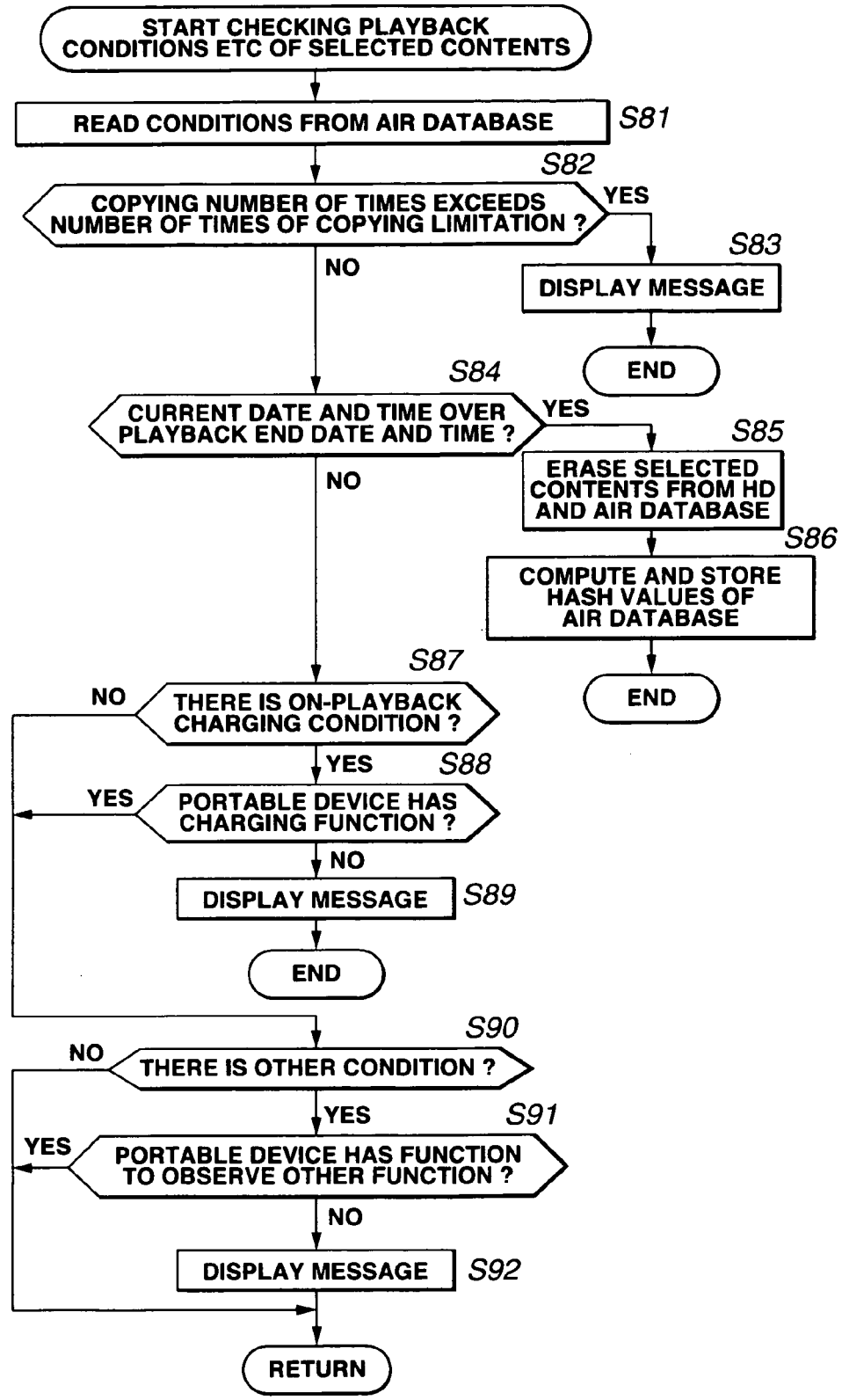
FIG. 15 is a flowchart for illustrating the check processing of checking replay conditions of contents selected at step S55 of FIG. 12.

The check processing for checking the replay conditions, such as those of contents selected at step S55 of FIG. 12 by the CPU 11 executing the contents management program 111, is explained with reference to the flowchart of FIG. 15. At step S81, the movement management program 134 causes the contents database 114 to read out variable conditions from the air database. The movement management program 134 at step S82 verifies whether or not the number of times of copying has exceeded the limitations on the number of times of copying, which is one of the variable conditions read out at step S81. If the number of times of copying has exceeded the limitations on the number of times of copying, copying is no longer allowed. Thus, the program moves to step S83 where the movement management program 134 causes the display operation command program 112 to display a message reading: "the number of times of copying has already surpassed the limitations on the number of times of copying" on the display 20 to terminate the processing. If it is verified at step S82 that the number of times of copying has exceeded the limitations on the number of times of copying, the program moves to step S84 where it is verified whether or not the current date and time have passed the playback end date and time. As the current date and time, that outputted by the RTC 35 of the adapter 26 is used. This prevents use of the date and time corrected intentionally by the user to a past date and time as being the current date and time. The movement management program 134, supplied with the current date and time from the CPU 32, performs the decision of step S84 for itself, or supplies the replay conditions read out from the air database at step S81 to the CPU 32 of the adapter 26 to cause the CPU 32 to execute the decision at step S84.

If the current date and time is past the playback end time, the program moves to step S85, where the movement management program 134 causes the selected contents to be erased from the HDD 21, while erasing the information of the selected contents from the air database. At step S86, the movement management program 134 causes the CPU 32 to compute the hash values of the air database to save the computed hash values in the non-volatile memory 34. Then, processing is terminated. Therefore, in this case, the contents movement is not executed.

If it is found at step S84 that the current date and time is not past the playback end time, the program moves to step S87, where the movement management program 134 checks whether or not the on-playback charging conditions of the selected contents, such as fee per each replay, has been registered in the air database. If the on-playback charging conditions have been registered, the movement management program 134 at step S88 causes the driver for PD 143 to have communication with the portable device 6 to check whether or not the portable device 6 has the charging function. If the portable device 6 has no charging function, the selected contents are not allowed to be transferred to the portable device 6. Thus, the movement management program 134 causes the display operation command program 112 to display a message reading: "the destination of transfer has no charging function" on the display 20 to terminate the contents movement processing.

If it is verified at step S87 that the on-playback charging conditions have not been registered, or if it is verified at step S88 that the portable device 6 has the charging function, the program moves to step S90 where the movement management program 134 verifies whether or not other playback conditions, such as the limitations on the number of times of playback, have been registered for the selected contents. If the other replay conditions have been registered, the program moves to step S91 where the movement management program 134 checks whether or not the portable device 6 has the functions of observing the replay conditions. If the portable device 6 has no function of observing the replay conditions, the program moves to step S92 to cause the display operation command program 112 to demonstrate a message reading: "the device of destination of transfer has no function of observing the replay conditions" on the display 20 to terminate the processing.

If it is found at step S90 that the replay conditions have not been registered, or if it is found at step S91 that the portable device 6 has the function of observing the replay conditions, the check processing for the replay conditions etc is terminated to return to the step S56 of FIG. 12.

FIG. 16 shows an example of replay conditions supervised by the portable device 6, that is, those that can be observed. The playback information shown in FIG. 16 are memorized in e.g., the EEPROM 68. In the present instance, the replay start date and time and replay end date and time for each of the items 1 to item 3 have been registered, however, the replay conditions are registered only for the item 2, while those for the items 1 or 3 are not registered. Thus, if the contents of the item 2 are the selected contents, the replay conditions for the number of times of playback can be observed, however, those for the number of times of replay cannot be observed.

Figure 17:
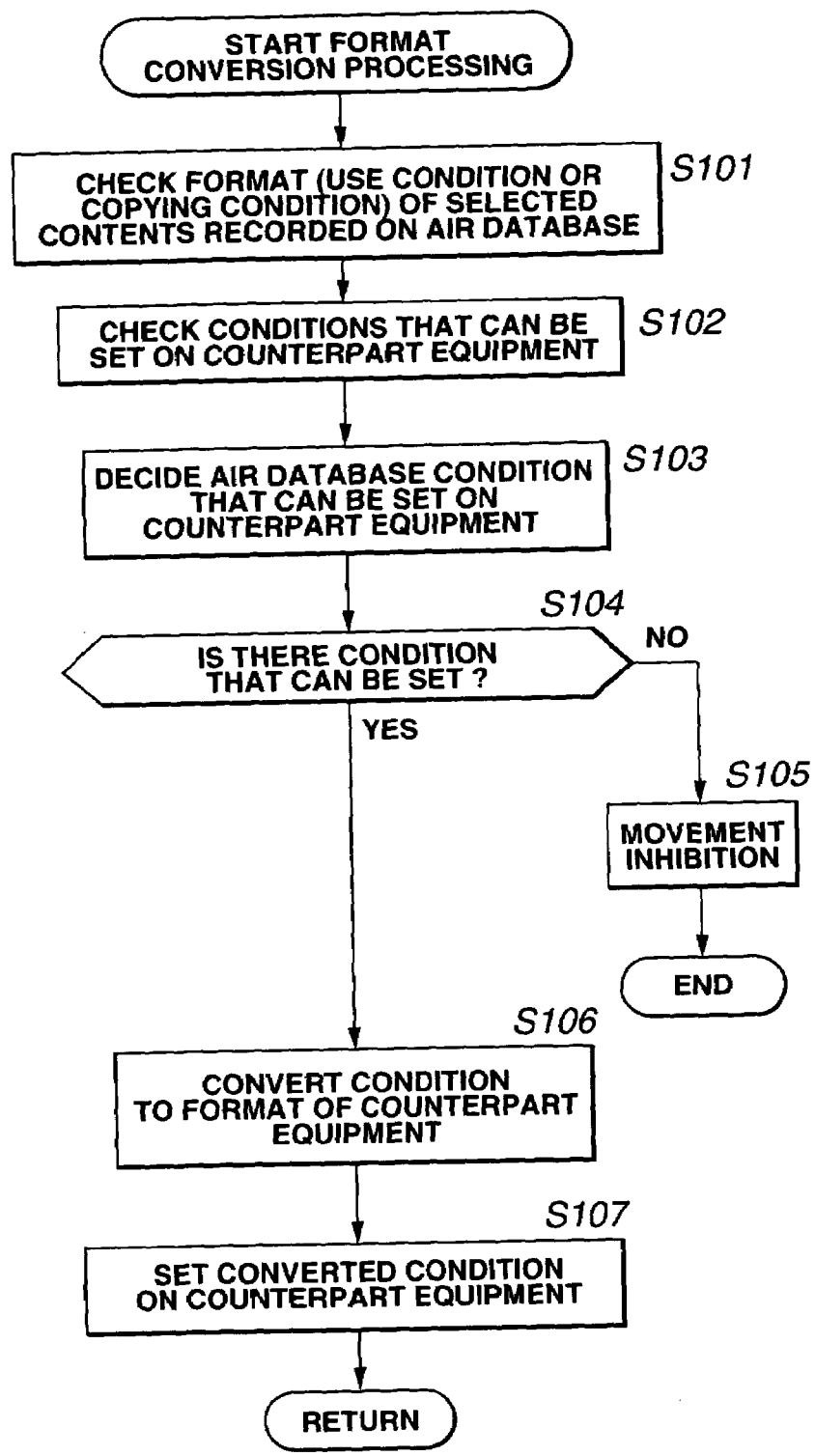
FIG. 17 is a flowchart for illustrating details of the format conversion processing at step S58 of FIG. 12.

Referring to the flowchart of FIG. 17, the format conversion processing at step S58 of FIG. 12 by the CPU 11 executing the contents management program 111 are explained in detail. At step S101, the movement management program 134 checks the format of the selected contents recorded in the contents database 114, such as formats including the replay conditions, use conditions or copying conditions. At step S102, the movement management program 134 checks the conditions that can be set on counterpart equipment, herein the portable device 6. That is, the movement management program 134 inquires into the conditions that can be set on the CPU 53 of the portable device 6 to acquire its response. At step S103, the movement management program 134 determines the condition that can be set on the counterpart equipment, among the conditions of the format registered in the air database, based on the condition checked at step S102.

At step S104, the movement management program 134 verifies whether or not there is any condition that can be set. If there is no condition that can be set, the program moves to step S105 to inhibit the processing of moving the contents to the portable device 6. That is, since the portable device 6 is unable to observe the conditions registered in the air database, such portable device 6 is inhibited from moving the contents.

If it is found at step S104 that there is any condition that can be set, the program moves to step S106 where the movement management program 134 causes the use condition conversion program 139 to change the condition to the condition of the counterpart equipment, for example, the condition stored in a header when transferring the contents to the portable device 6. At step S107, the movement management program 134 sets the changed conditions on the counterpart equipment. As a result, the portable device 6 is able to reproduce the contents under the so-set conditions.

Figure 18:
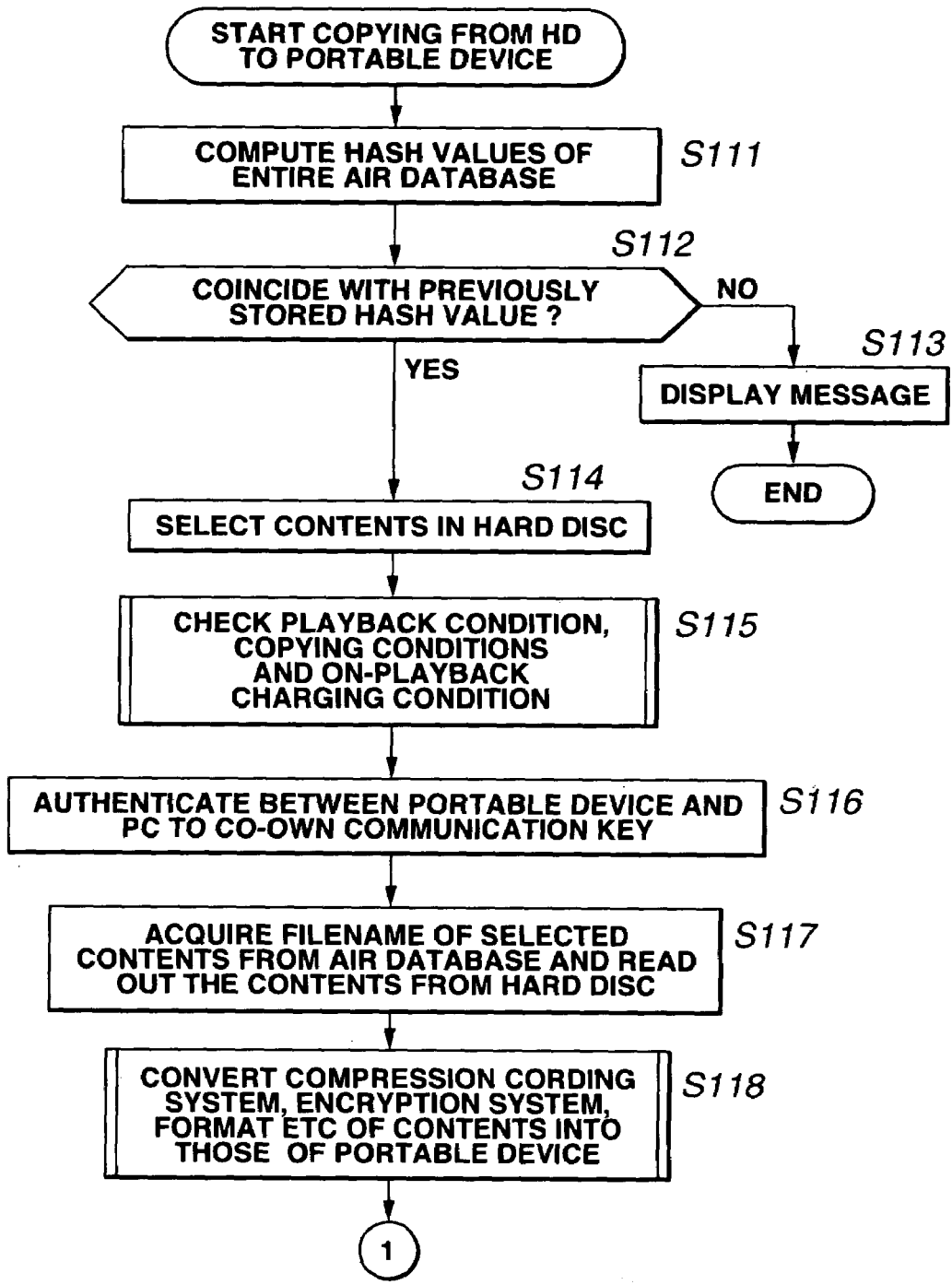
FIG. 18 is a flowchart for illustrating the operation of copying contents from the HDD 21 to the portable device 6.
Figure 19:
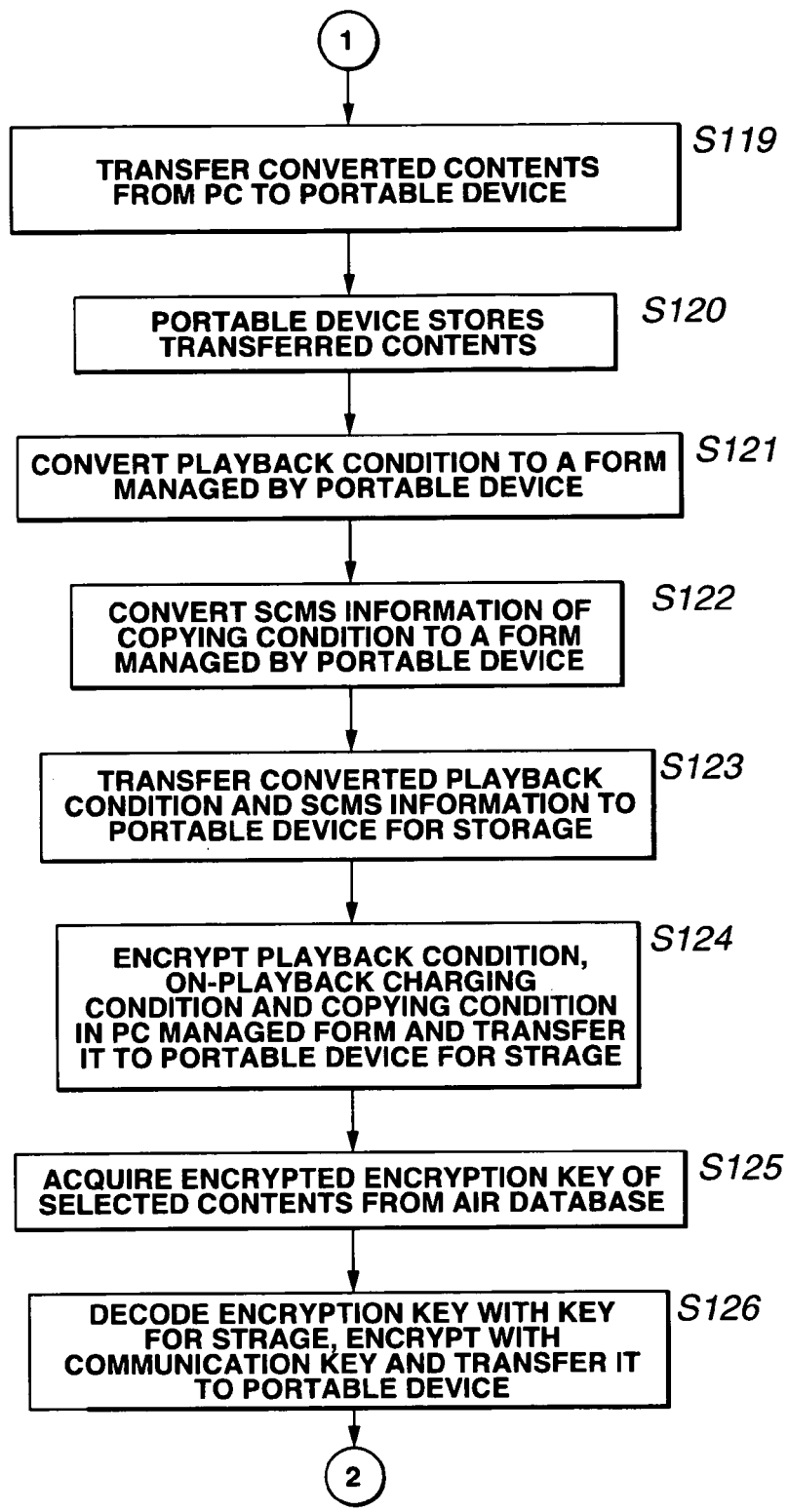
FIG. 19, continuing to FIG. 18, is a flowchart for illustrating the operation of copying contents from the HDD 21 to the portable device 6.
Figure 20:
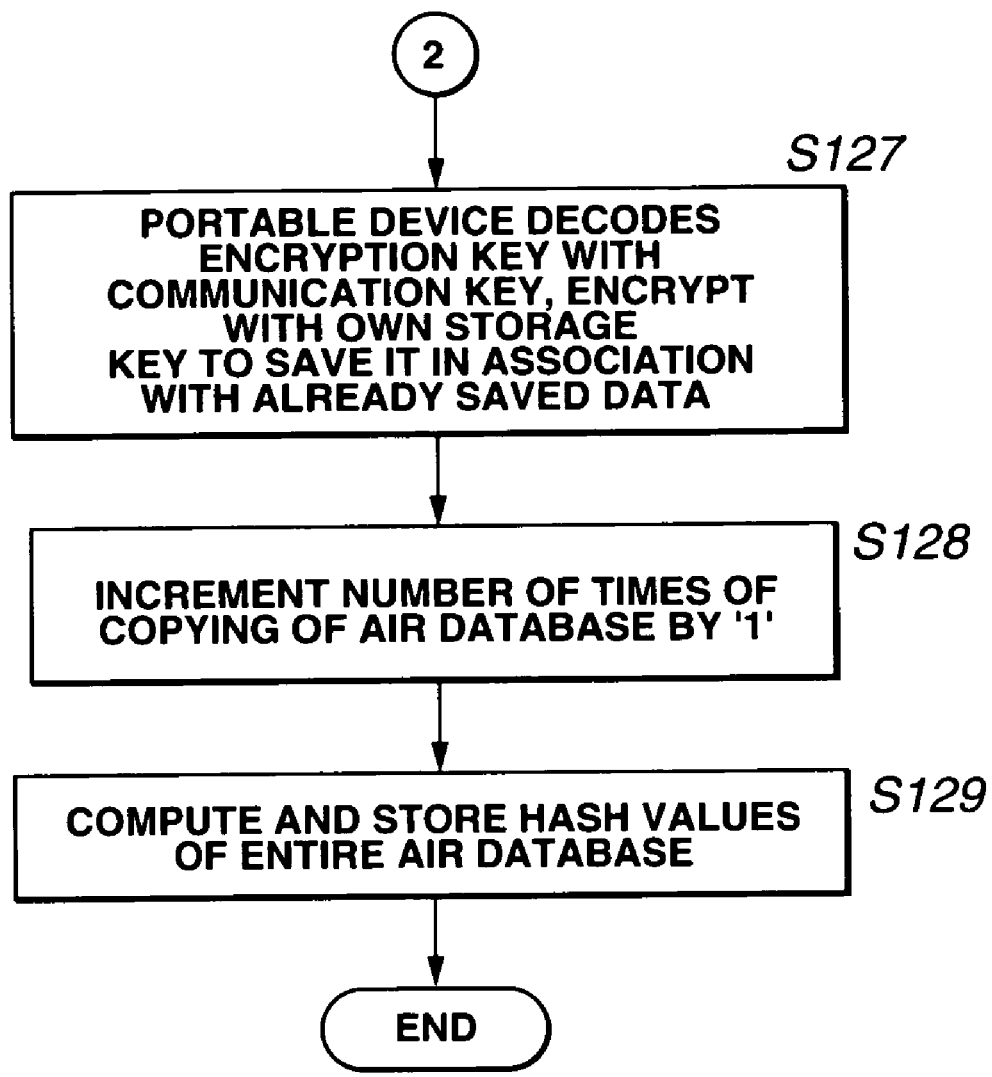
FIG. 20, continuing to FIG. 19, is a flowchart for illustrating the operation of copying contents from the HDD 21 to the portable device 6.

Referring to the flowchart of FIGS. 18 to 20, the processing for copying the contents from the HDD 21 to the portable device 6 by the CPU 11 executing the contents management program 111 and by the CPU 53 executing the main program. The processing of steps S111 to S127 of FIGS. 18 to 20, executed by the copying management program 133, is the processing similar to that from steps S51 to S67 in moving the contents from the HDD 21 of FIGS. 12 to 14 to the portable device 6. That is, in this case, the air database is checked as to whether or not it has been modified, and subsequently replay conditions of the selected contents are checked. After reciprocal authentication between the portable device 6 and the personal computer, the contents are transferred from the HDD 21 of the personal computer 1 to the flash memory 61 of the portable device 6 for storage therein. Then, at step S129, the copying management program 133 causes the CPU 32 to compute the entire hash values of the air database to save the computed value in the non-volatile memory 34.

Figure 21:
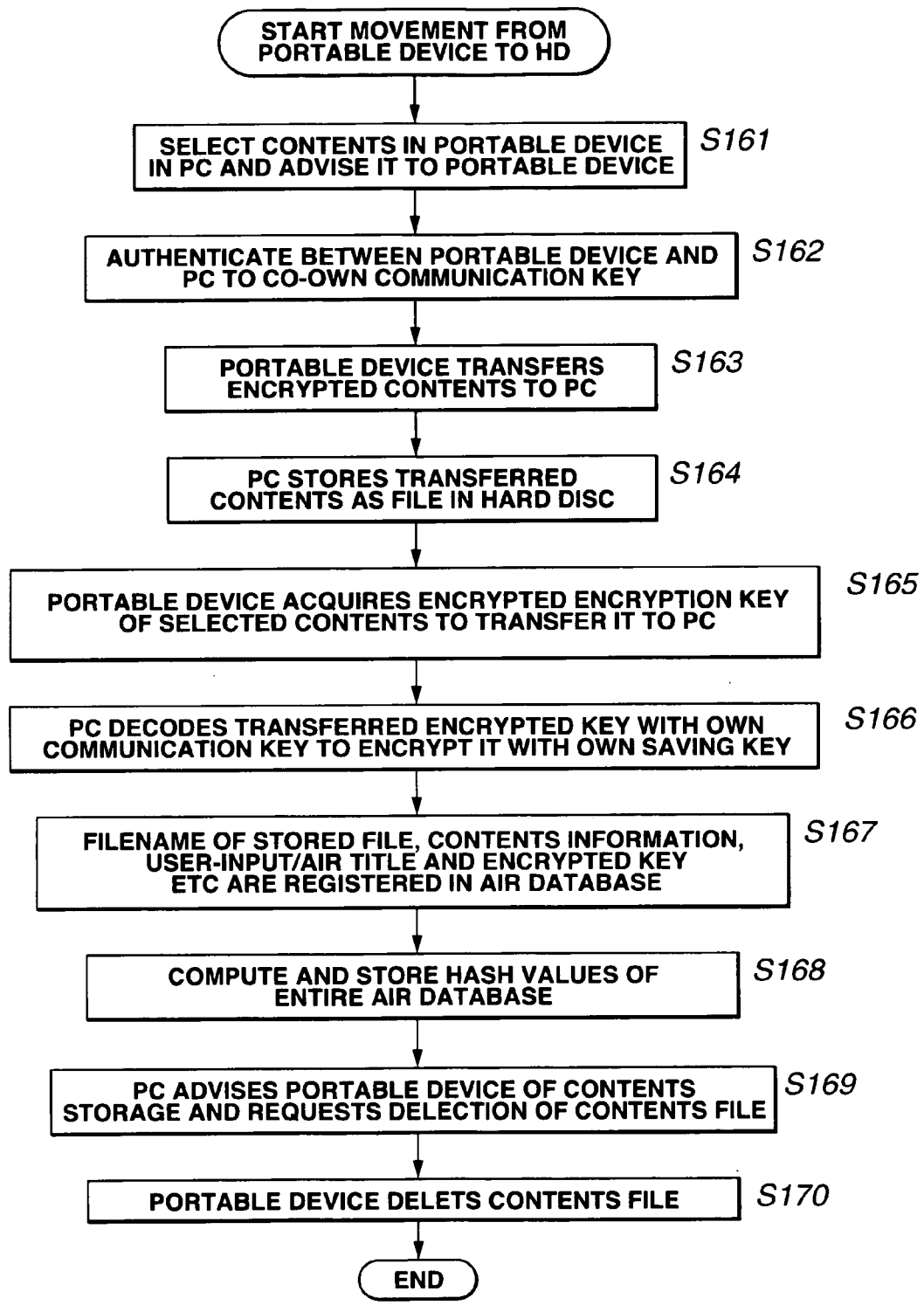
FIG. 21 is a flowchart for illustrating the operation of moving contents from the portable device 6 to the HDD 21.

Referring to the flowchart of FIG. 21, the processing of moving the contents from the portable device 6 to the HDD 21, by the CPU 11 executing the contents management program 111 and by the CPU 53 executing the main program.

First, the processing for moving the contents is explained. At step S161, the movement management program 134 requests the CPU 53 of the portable device 6 to read out the information of the contents stored in the flash memory 61. The CPU 53 is responsive to this request to transmit the information on the contents stored in the flash memory 61 to the personal computer 1. Based on this information, the movement management program 134 causes the GUI for selecting the contents stored in the flash memory 61 to be demonstrated on the display 20. The user actuates the keyboard 18 or the mouse 19 to designate the contents to be moved from the portable device 6 to the contents database 114 of the HDD 21.

At step S162, the movement management program 134 causes the authentication program 141 to execute the reciprocal authentication processing between it and the CPU 53 to effect co-owning of the key for communication. This processing is similar to that performed at step S56 of FIG. 12.

At the next step S163, the CPU 53 causes the authentication program 141 to read out the encrypted selected contents, stored in the flash memory 61, to transfer the read-out contents to the personal computer 1. The movement management program 134 at step S164 accords a filename as a file to the contents transferred from the portable device 6 to store the file in the contents database 114 (HDD 21). This storage is made by according the position information of the filename, such as the number of bytes from the leading end, as a portion of a sole file.

At step S165, the CPU 53 reads out its own encrypted encryption key of the selected contents stored in the flash memory 61 to transfer the encrypted key to the personal computer 1. This encryption key has been saved in the flash memory 61 by the processing of step S67 of FIG. 14.

On reception of the encryption key from the picture data 6, the movement management program 134 at step S166 decodes the encryption key with the key for communication to cause the encryption program 137 to encrypt the key with its own key for storage. At step S167, the movement management program 134 the movement management program 134 causes the contents database 114 to register the filename of the contents saved at step S164, the information on the contents, the title of the air inputted by the user via the GUI and the encryption key encrypted at step S166 in the air database of the HDD 21. The movement management program 134 at step S168 causes the CPU 32 to compute the hash values of the entire air database by the condition management program 140 to save the computed hash values in the non-volatile memory 34.

At step S169, the movement management program 134 advises the portable device 6 that the encryption key has been saved and requests the contents to be deleted. If requested by the personal computer 1 to delete the contents, the movement management program 134 at step S170 deletes the contents stored in the flash memory 61.

The processing of checking-in the contents from the portable device 6 to the personal computer 1 is explained. The processing of checking in the contents from the portable device 6 to the personal computer 1 is the processing similar to the processing of moving the contents from the portable device 6 to the personal computer 1 in FIG. 21. That is, the check-in processing is executed in the personal computer 1 by the check-in/check-out management program 132, as the processing from step S162 to step S166 in FIG. 21 is omitted. Also, the personal computer 1 performs a processing, which is the same as the processing for movement, except that it updates the number of times of checking out the checked-in contents, recorded in the air database, at step S167 of FIG. 21, to delete the contents file after the processing of step S170. Therefore, detailed explanation of the processing is omitted for simplicity.

Meanwhile, if the flash memory 61 of the portable device 6 can be mounted or dismounted as a memory card, the personal computer 1 executes the processing of reciprocal authentication at step S162 of FIG. 21 in the check-in processing.

The contents checked out from a pre-set personal computer are adapted to be checked-in in only the personal computer, such that there is a step, as a pre-processing of the check-in processing, in which, if the contents are verified to be not checked-out from the PC, the check-in is not performed, as when the contents marked x in the field 213 of FIG. 5 are to be checked-in.

Figure 22:
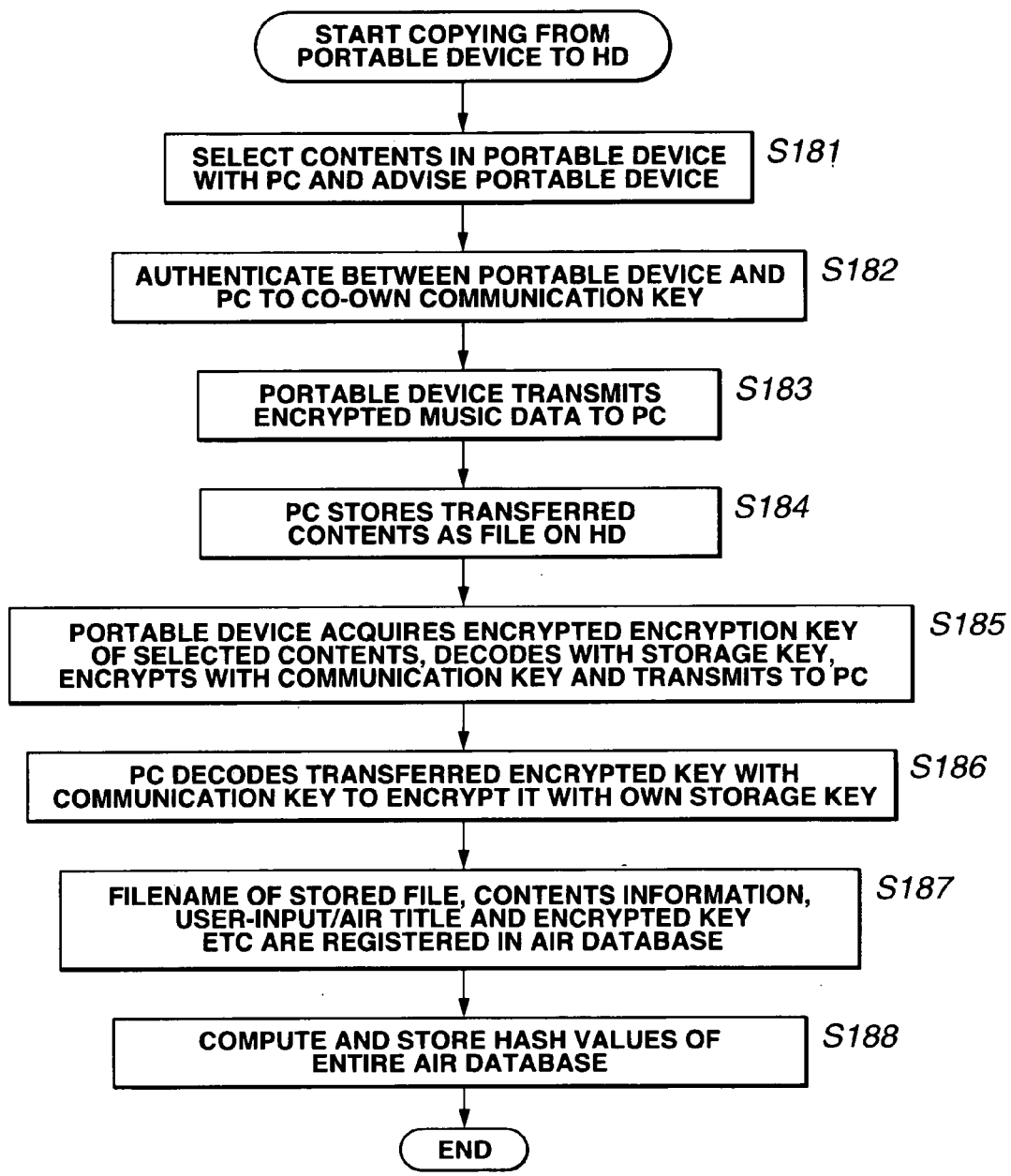
FIG. 22 is a flowchart for illustrating the operation of copying contents from the portable device 6 to the HDD 21.

The processing of copying the contents from the portable device 6 to the HDD 21 by the CPU 11 executing the CCD video camera 11 and the CPU 53 executing the main program is explained by referring to the flowchart of FIG. 22. The processing from step S181 to step S188 shown in FIG. 22 is similar to the processing at steps S161 to S168 in the processing of moving the contents from the portable device 6 to the HDD 21 in FIG. 21. That is, the copying processing is basically similar to the processing for movement except that the processing of steps S169 and S170 in FIG. 21 is omitted and hence is not explained specifically.

Figure 23:
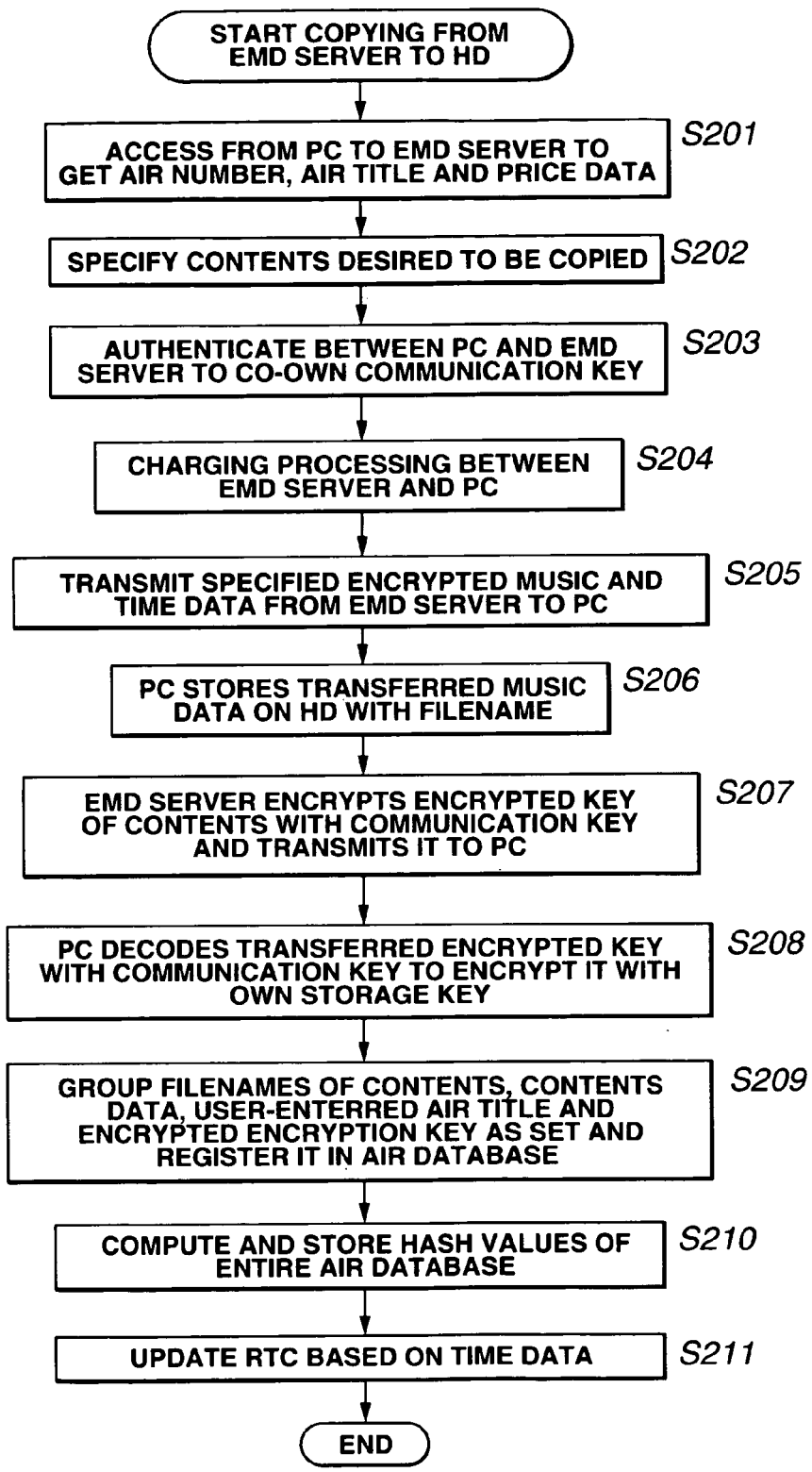
FIG. 23 is a flowchart for illustrating the operation of copying contents from an EMD server 4 to the HDD 21.

Referring to the flowchart of FIG. 23, the processing of copying the contents transferred from the EMD server 4 in the HDD 21 by the EMD server 4 and the CPU 11 executing the contents management program 111 is hereinafter explained. When the button 202 shown in FIG. 5 is clicked such that accessing to the EMD server 4 is commanded by the user, the purchase program 144 controls the communication device 25 to access to the EMD server 4 over the network 2. The EMD server 4 is responsive to this accessing to transfer the information on the air number, title of the air and the like information of the contents it owns over the network 2 to the personal computer 1. The purchase program 144 on acquisition of this information via the communication device 25 causes the display operation command program 112 to demonstrate the information via the interface 17 on the display 20. The user at step S202 designates the contents desired to be copied by exploiting the GUI demonstrated on the display 20. This designated information is transferred over the network 202 to the EMD server 4. At step S203, the purchase program 144 executes reciprocal authentication processing over the network 2 with the EMD server 4 to co-own the key for communication.

The reciprocal authentication processing performed between the personal computer 1 and the EMD server 4 can also be performed using an open key and a secret key provided in e.g., ISO 9798-3. In this case, the personal computer 1 owns the own secret key and the open key of the EMD server 4. The EMD server 4 owns its own secret key to perform the reciprocal authentication processing. The open key of the personal computer may be transferred from the EMD server 4 or a certificate previously distributed to the personal computer 1 may be transferred from the personal computer 1 to the EMD server 4 and confirmed by the EMD server 4 to obtain the open key. At step S204, the purchase program 144 executes the processing for charging between it and the EMD server 4. Moreover, the purchase program 144 at step S204 executes the processing for charging between it and the EMD server 4. The processing for charging will be explained in detail by referring to the flowchart of FIG. 24.

Next, at step S205, the EMD server 4 transfers the encrypted contents, designated at step S202, over the network 2 to the personal computer 1. At this time, the time information is also transmitted as appropriate. The purchase program 144 at step S206 saves the transferred contents in the HDD 21 as a sole contents file 161 as it accords a filename to the file. At step S207, the EMD server 4 encrypts the encryption key of the contents using the key for communication co-owned with the personal computer 1 at step S203 to transfer the encrypted encryption key to the personal computer 1.

The purchase program 144 at step S208 causes the decoding program 142 to decode the encryption key transferred from the EMD server 4 either by itself or in cooperation with the CPU 32 of the adapter 26 to cause the encryption program 137 to encrypt the encryption key obtained on decoding using its own key for storage. At step S209, the purchase program 144 causes the contents database 114 to store the contents in the air database of the HDD 21, with the filename of the contents, information on the contents, the title of the air inputted by the user and the encrypted encryption key as a set. The purchase program 144 at step S210 causes the CPU 32 to compute the hash values of the entire air database to save the computed hash values in the non-volatile memory 34.

At step S205, the EMD server 4 transmits the time data along with the contents to the personal computer 1. This time data is transferred from the personal computer 11 to the adapter 26. On reception of the time data transferred from the personal computer 1, the CPU 32 of the adapter 26 at step S211 corrects the time of the RTC 35. Since the time information of the RTC 35 of the adapter 26 is corrected in this manner based on the time information obtained from the external equipment recognized to be a correct equipment as a result of reciprocal authentication, it becomes possible to maintain the correct time information in the adapter 26 at all times.

Figure 24:
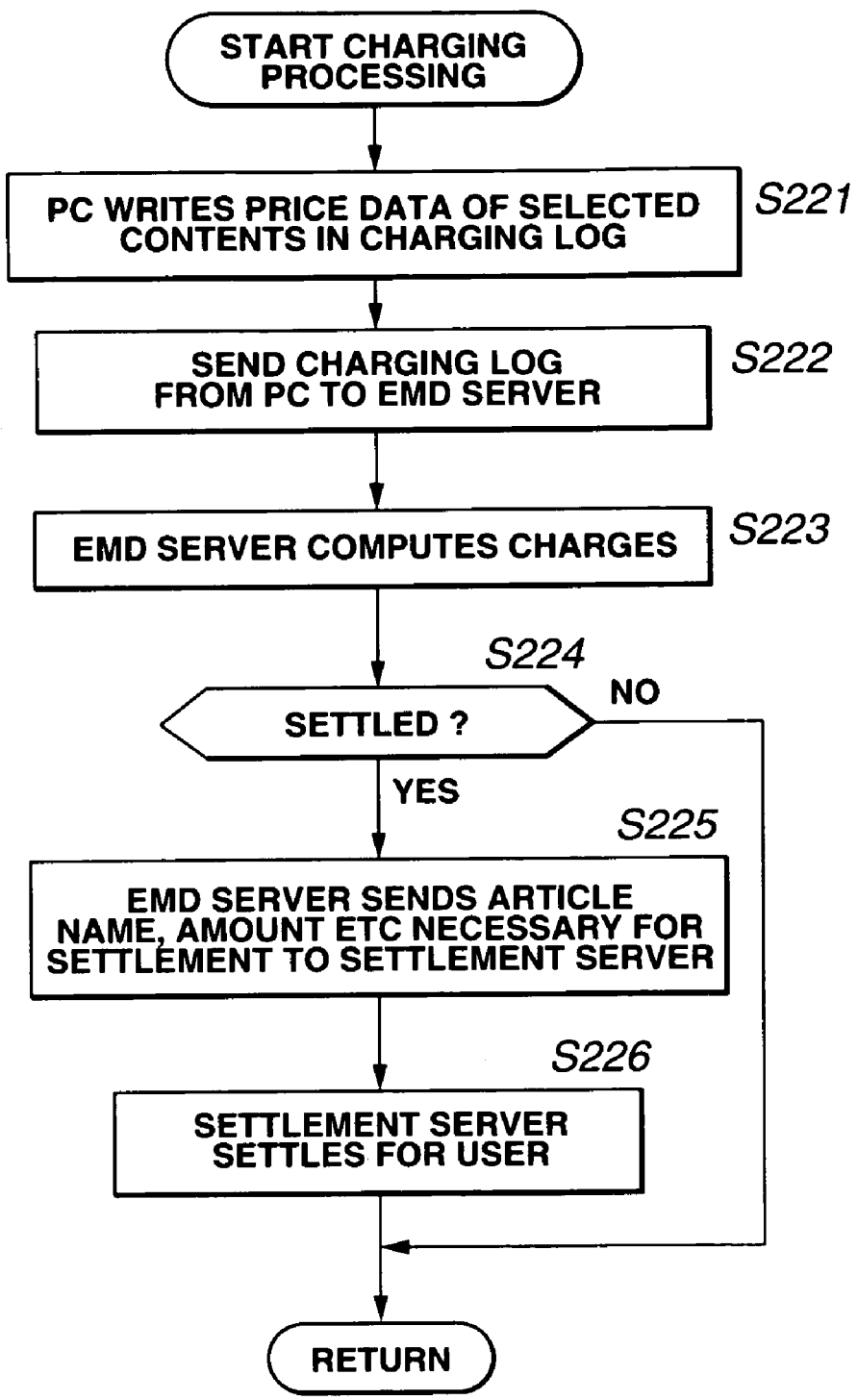
FIG. 24 is a flowchart for illustrating details of charging processing of step S204 of FIG. 23.

Referring to the flowchart of FIG. 24, the processing concerning the charging at step S204 of FIG. 23 by the CPU 11 adapted to execute the contents management program 111 and the EMD server 4 is hereinafter explained. At step S221, the purchase program 144 reads out the price information of the selected contents designated at step S202, from the price information transferred at step S201 from the EMD server 4, to write the read-out price information on a charging log on the HDD 21. FIG. 25 shows an example of this charging log. In the present instance, the user copies the items 1 to 3 from the EMD server 4. The area for item 1 and item 2 is 50 yen, with the fee for item 3 being 60 yen. The hash value of the charging log at this time point is also computed by the CPU 32 and registered in the non-volatile memory 34.

At the next step S222, the purchase program 144 reads out the charging log written at step S221 from the HDD 21 to transfer the charging log over the network 2 to the EMD server 4. The EMD server 4 at step S223 executes the charging computing processing based on the charging log transferred from the personal computer 1. That is, the EMD server 4 additionally updates the charging log transmitted from the user of the personal computer 1 in the enclosed database. At step S224, the EMD server 4 decides whether or not the charging log should be settled at once. If the log is to be settled at once, the program moves to step S225 where the EMD server 4 transfers the name of articles or the amount necessary for the settlement to the settlement server, not shown. At step S226, the settlement server executes the settlement processing for the user of the personal computer 1. If it is verified at step S224 that the settlement be not made at once, the processing at steps S225 and S226 is skipped. Thus, this processing is subsequently executed periodically, such as every month.

Figure 26:
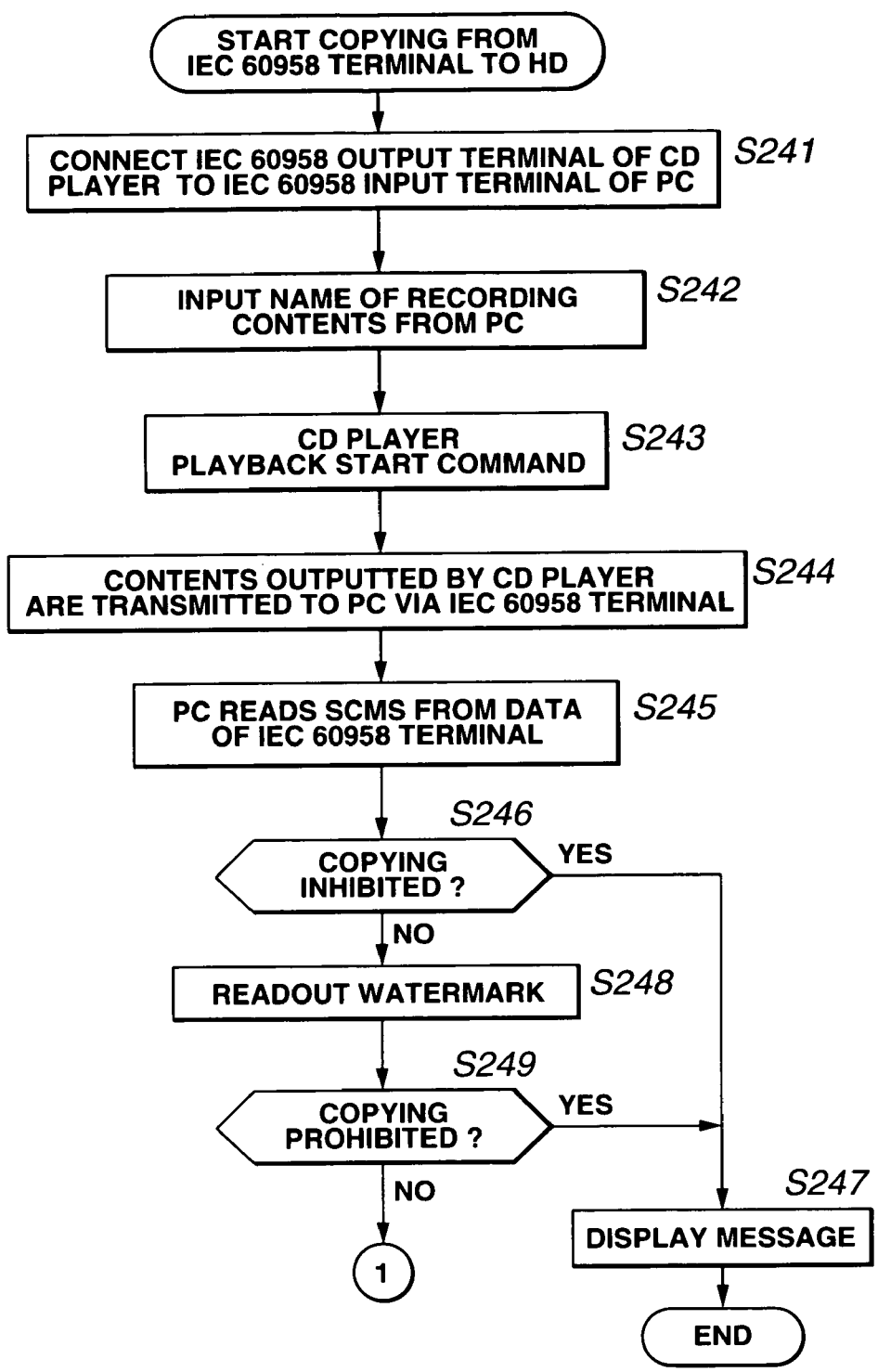
FIG. 26 is a flowchart for illustrating the processing of copying contents to the HDD 21 form an IEC 60958 terminal 24*a* to the personal computer 1 of FIG. 2.
Figure 27:
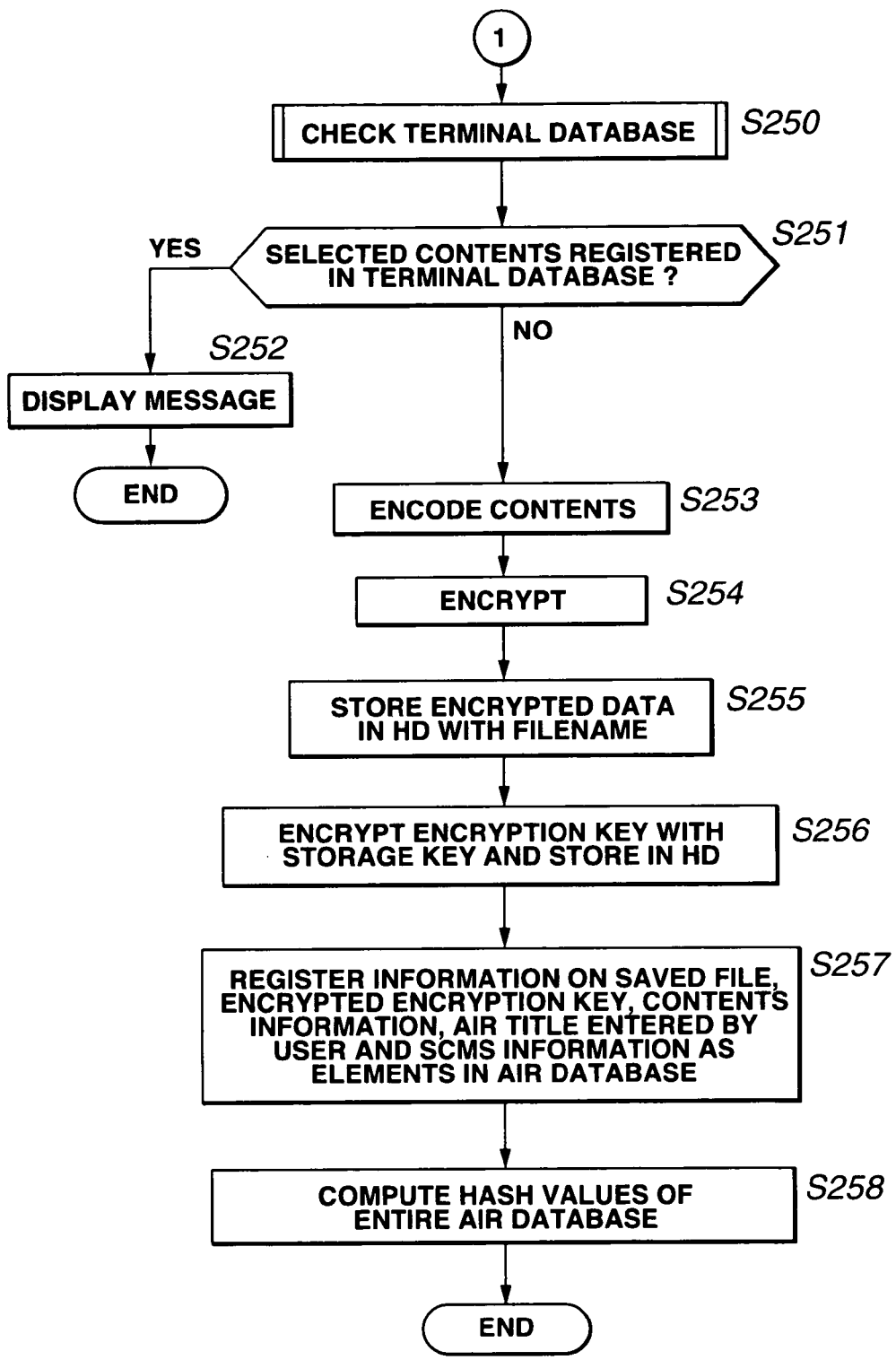
FIG. 27, continuing to FIG. 26, is a flowchart for illustrating the processing of copying contents to the HDD 21 form an IEC 60958 terminal 24*a* to the personal computer 1 of FIG. 2.

Referring to the flowchart of FIGS. 26 and 27, the processing of copying of the contents reproduced from a CD player, not shown, in the HDD 21 by the CPU 11 executing the contents management program 111, is explained. At step S241, the user connects the IEC60958 terminal 24a of the CD player to an IEC 60598 terminal 24a of the audio input/output interface 24 of the personal computer 1. At step S242, the user actuates the keyboard 18 or the mouse 19 to enter the title of the musical air to be copied from the CD player (or the number corresponding to the contents). At step S243, the user actuates a button of the CD player to start the replay of the CD player. If there is a line interconnecting the CD player and the personal computer for sending/receiving the control signals, it is possible for the CD player to commence the reproduction of the CD by entering a playback start command via the keyboard 18 or the mouse 19 of the personal computer 1.

If the CD replay is started in the CD player, the contents outputted from the CD player at step S244 are transferred via the IEC 60958 terminal 24a to the personal computer 1. At step s245, the copying management program 133 reads SCMS (serial copy management system) data from the data inputted at the IEC 60958 terminal 24a. This SCMS data contains the copying information, such as copying inhibition, copying possible only once or copying free. At step S246, the CPU 11 verifies whether or not the SCMS data indicates copying inhibition. If the SCMS data indicates copying inhibition, the program moves to step S247 where the copying management program 133 causes the display operation command program 112 to demonstrate a message reading: "copying inhibited" on the display 20 to terminate the copying processing. Thus, in this case, copying in the HDD 21 is inhibited.

If it is verified at step S246 that the SCMS information read out at step S245 does not indicate copying inhibition, the copying management program 133 advances to step S248 to read out the water mark code to verify whether or not the water mark code indicates copying inhibition. If the water mark code indicates copying inhibition, the program moves to step S247 where the pre-set message is displayed, as in the above case, to terminate the copying processing.

If it is verified at step S249 that the water mark does not indicate copying inhibition, the program moves to step S250 where the terminal database check processing is executed. If, as a result of the terminal database check processing, the selected contents have already been registered, the processing comes to a close with the processing of the steps S251 and S252. This processing is similar to the processing of steps S13 and S14 of FIG. 7.

If the selected contents are those not as yet registered in the HDD 21, these contents are registered by the steps S253 to S258. Since the processing of the steps S253 to S258 is similar to the processing of the steps S19 to S24 of FIG. 7, except that the SCMS information supplied from the IEC 60958 terminal 24a also is registered in the air database, the explanation is omitted for simplicity.

Figure 28:
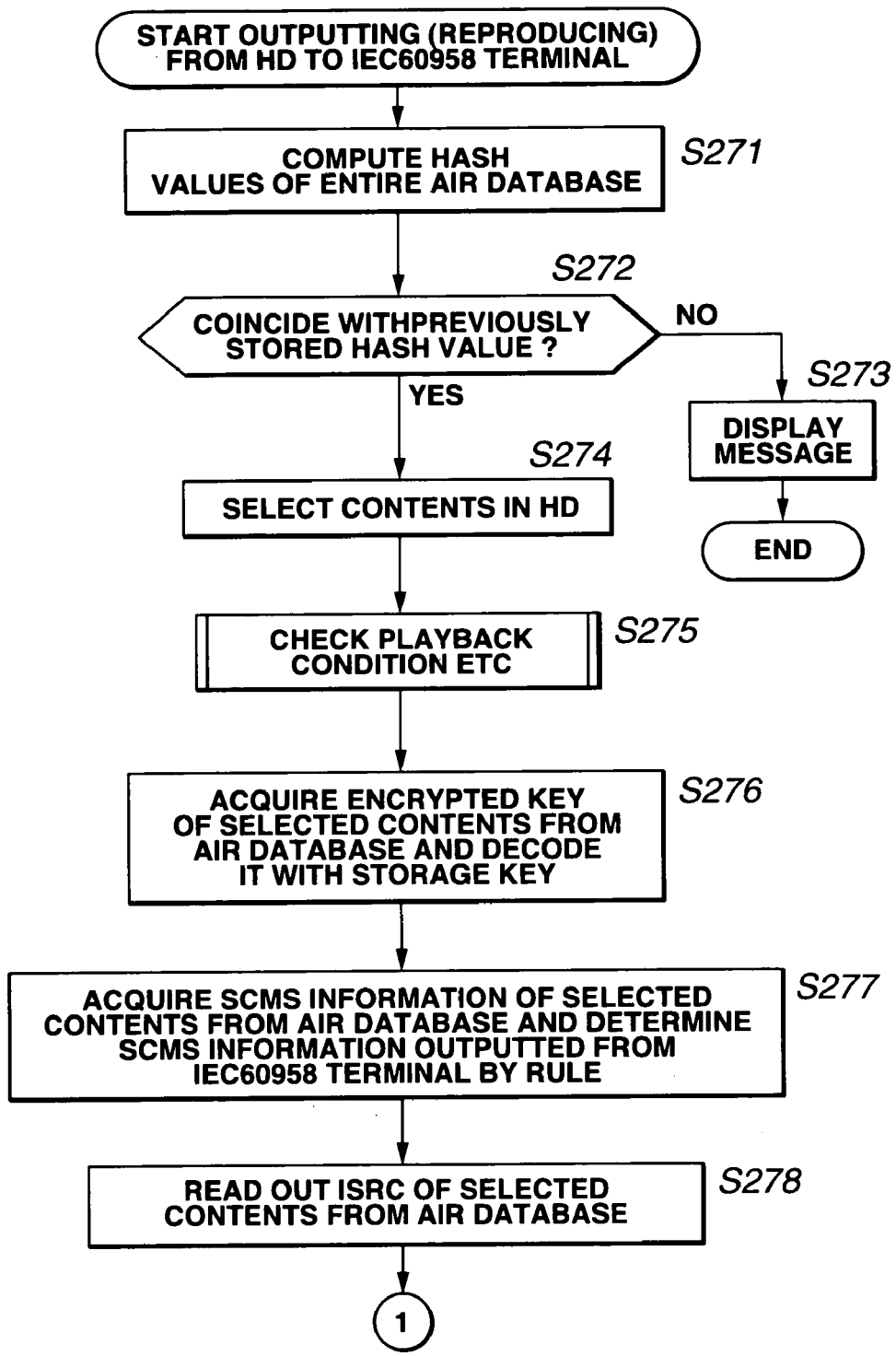
FIG. 28 is a flowchart for illustrating the operation of outputting contents from the HDD 21 to the IEC 60958 terminal 24*a*.
Figure 29:
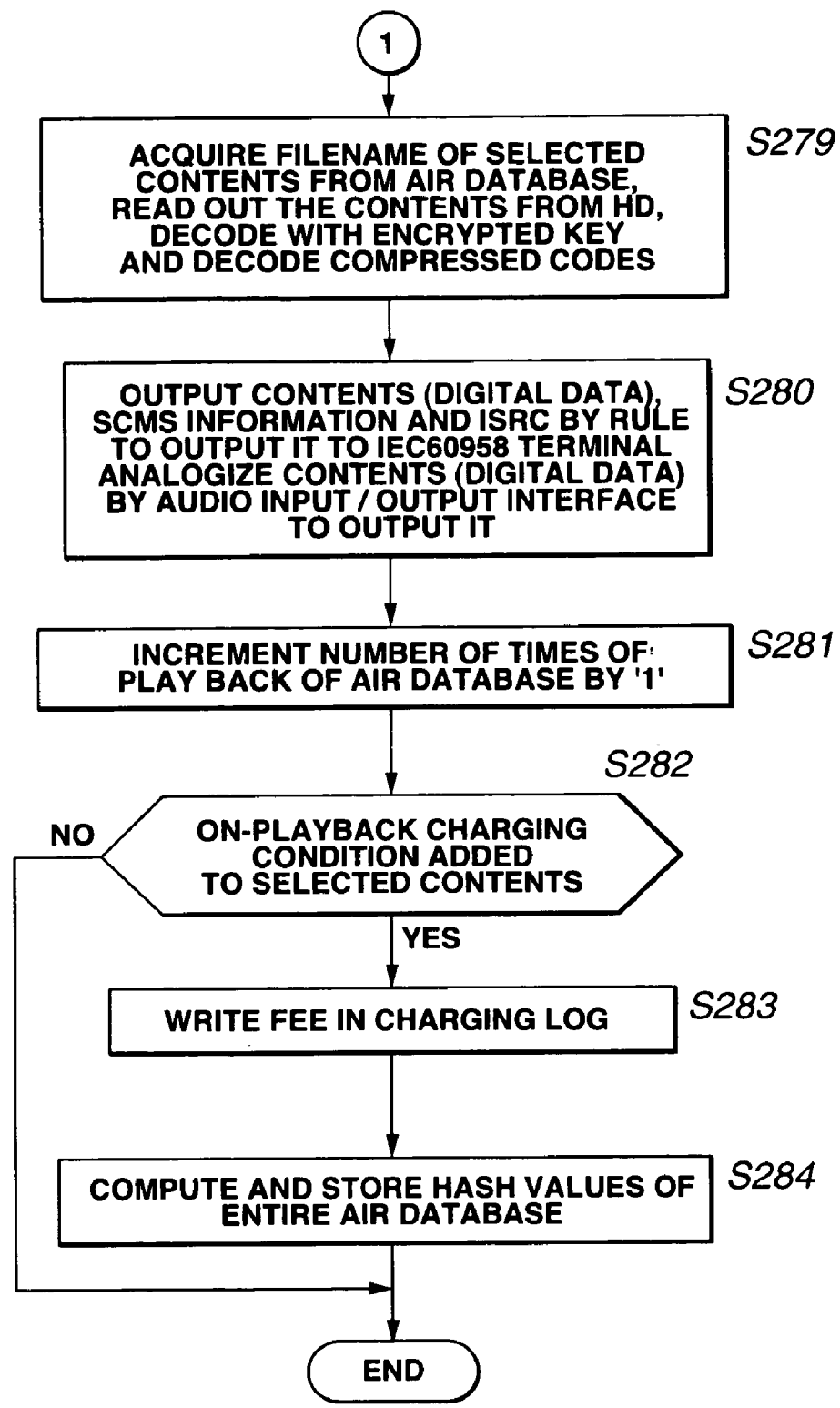
FIG. 29, continuing to FIG. 26, is a flowchart for illustrating the operation of outputting contents from the HDD 21 to the IEC 60958 terminal 24*a*.

Referring to the flowchart of FIGS. 28 and 29, the processing of outputting (reproducing) the contents from the HDD 21 to the IEC 60958 terminal 24a by the CPU 11 executing the contents management program 111 is explained. At steps S271 to S273, the hash values of the entire air database are computed, as at steps S111 to S113 of FIG. 18, and verified as to whether or not these hash values coincide with the previously saved hash values to check as to whether or not the air database has been modified. If it is found that the air database has not been modified, the program moves to step S274, where the display operation command program 112 causes the contents management program 111 to access to the air database of the HDD 21 via the contents database 114 to read out the information on the musical air registered therein to display the read-out information on the display 20. The user views the display to actuate the keyboard 18 or the mouse 19 appropriately to select the contents to be reproduced. At step S275, the display operation command program 112 checks e.g., playback conditions of the selected contents. The check processing of the reproducing conditions etc will be explained subsequently with reference to the flowchart of FIG. 30.

At the next step S276, the display operation command program 112 causes the contents management program 11 to read out the encryption key of the contents selected at step S274 from the air database into the contents database 114 to cause the decoding program 142 to decode the key for storage. At step S277, the display operation command program 112 causes the contents management program 111 to read out the SCMS information of the selected contents from the air database into the contents database 114 to determine the SCMS information outputted from the IEC 60958 terminal 24a in accordance with the rule of the SCMS system. For example, if there is placed a limitation as to the number of times of replay, the number of times of replay is incremented by one to give the new SCMS information. At step S278, the display operation command program 112 causes the contents management program 111 to read out the ISRC of the selected contents from the air database into the contents database 114.

At the next step S279, the display operation command program 112 causes the contents management program 111 to read out the filename of the selected contents from the air database into the contents database 114 to read out the contents from the HDD 21. The display operation command program 112 causes the contents management program 111 to read out the encryption key corresponding to the contents from the air database, while causing the decoding program 142 to decode the read-out encryption key with the key for storage to decode the encrypted contents using the decoded encryption key. The compression/expanding program 138 also decodes (expands) the compression code of the contents. At step S280, the display operation command program 112 causes the driver 117 to output the contents, as the decoded digital data, to be outputted at the IEC 60958 terminal 24a, in accordance with the IEC60958 rule, along with the ISRC information read out at step S278. Also, the display operation command program 112 actuates a program, such as a Real Player (registered trade mark), not shown, to analogize the contents, as digital data, to output the resulting analog data at an analog output terminal of the audio input/output interface 24.

At step S281, the display operation command program 112 causes the contents management program 111 to increment the value of the playback number of times counter in the air database by one in the contents database 114. At step S282, the display operation command program 112 checks whether or not the on-playback charging conditions have been added to the selected contents. If the on-playback charging conditions have been added, the program moves to step S283 where the display operation command program 112 causes the contents management program 111 to write the corresponding charge to be written in the charging log. At step S284, the display operation command program 112 causes the use condition management program 140 to compute the hash values of the entire air database by the CPU 32 to store the computed hash values in the non-volatile memory 34. If it is verified at step S282 that the on-playback charging conditions have not been added to the selected contents, the processing at steps S283 and S284 is skipped.

Figure 30:
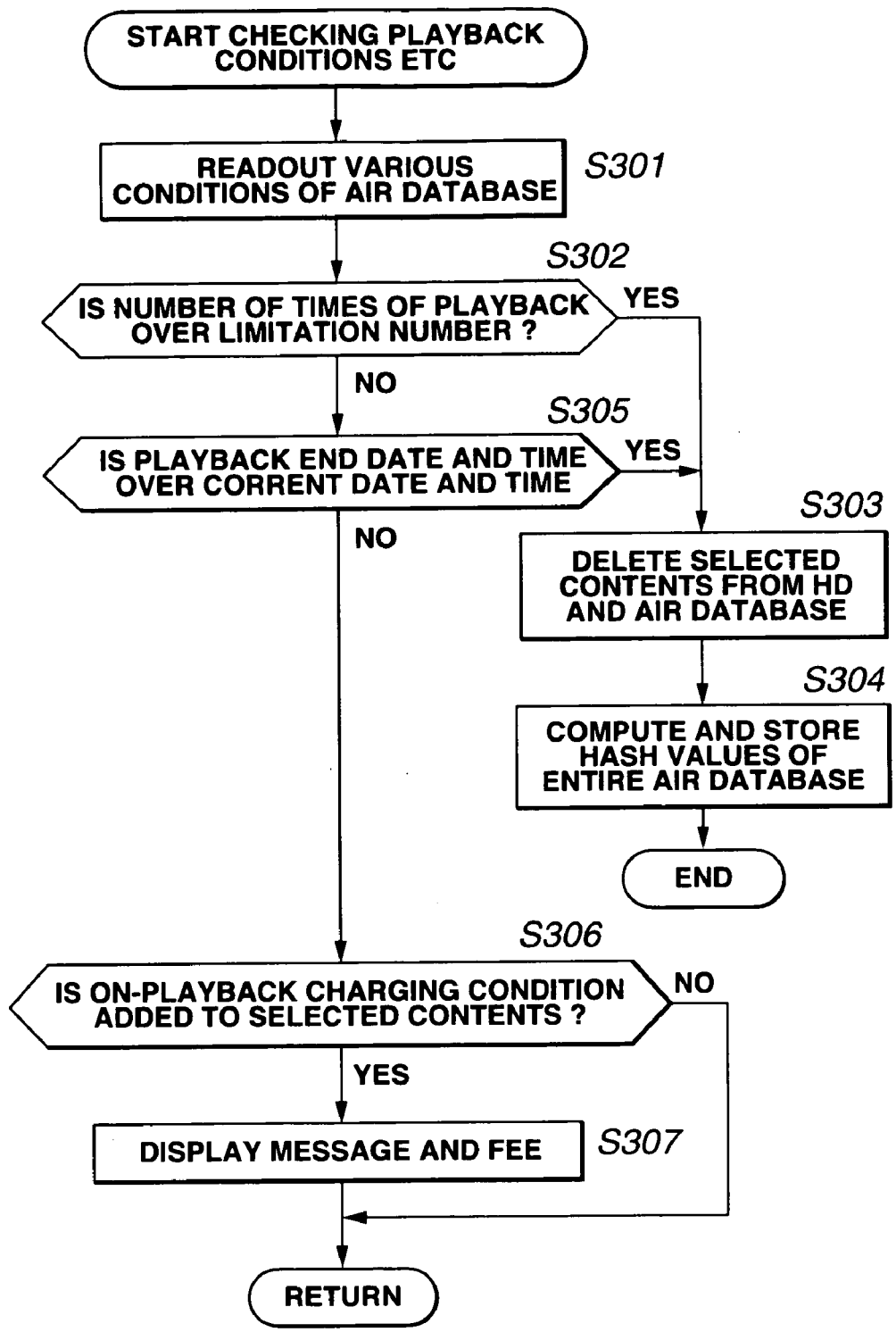
FIG. 30 is a flowchart for illustrating the processing of checking replay conditions of step S275 of FIG. 28.

Referring to the flowchart of FIG. 30, the processing for checking the replay conditions at step S275 of FIG. 28 is explained in detail. At step S301, the display operation command program 112 causes the contents management program 111 to read out the variable conditions of the air database into the contents database 114. At step S302, the use condition management program 140 checks whether or not the number of times of playback has exceeded the number of times of limitation, as among the conditions of the air database read out at step S302 by the use condition management program 140. If the result of check indicates that the number of times of playback has exceeded the number of times of limitation, the program moves to step S303 where the use condition management program 140 causes the contents management program 111 to delete the selected contents from the HDD 21 in the contents database 114. At step S304, the display operation command program 112 causes the use condition management program 140 to compute the new hash values of the air database by the CPU 32 to save the computed hash values in the non-volatile memory 34. In this case, playback output is inhibited.

If the result of check indicates that the number of times of playback has not exceeded the number of times of limitation, the program moves to step S305 where the use condition management program 140 verifies whether or not the playback end date and time has passed the current date and time. If the playback end date and time has passed the current date and time, the selected contents are deleted from the HDD 21, at step S303, as in the above case, and also from the air database. At step S304, the hash values of the new air database are computed and saved. In this case, playback output similarly is inhibited.

If it is found at step S305 that the replay end date and time has not passed the current date and time, the program moves to step S306 where the CPU 32 checks whether or not the on-playback charging conditions have been added to the selected contents. If the on-playback charging conditions have been added, the program moves to step S307 where the display operation command program 112 demonstrates the message that the on-playback charging conditions have been added and the fee on the display. If it is found at step S306 that the on-playback charging conditions have not been added, the processing at step S307 is skipped.

Figure 31:
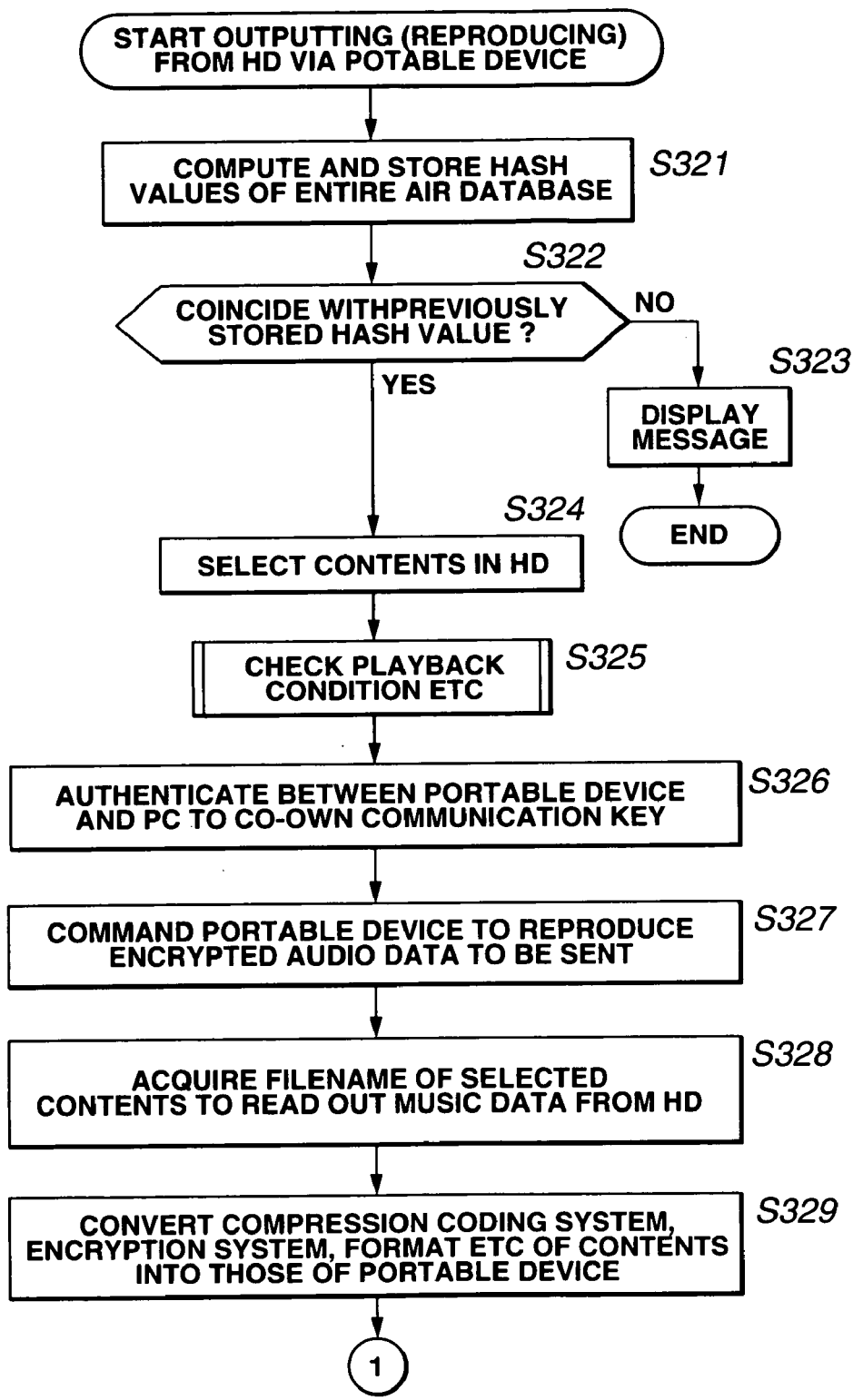
FIG. 31 is a flowchart for illustrating the operation of outputting contents from the HDD 21 through the portable device 6.
Figure 32:
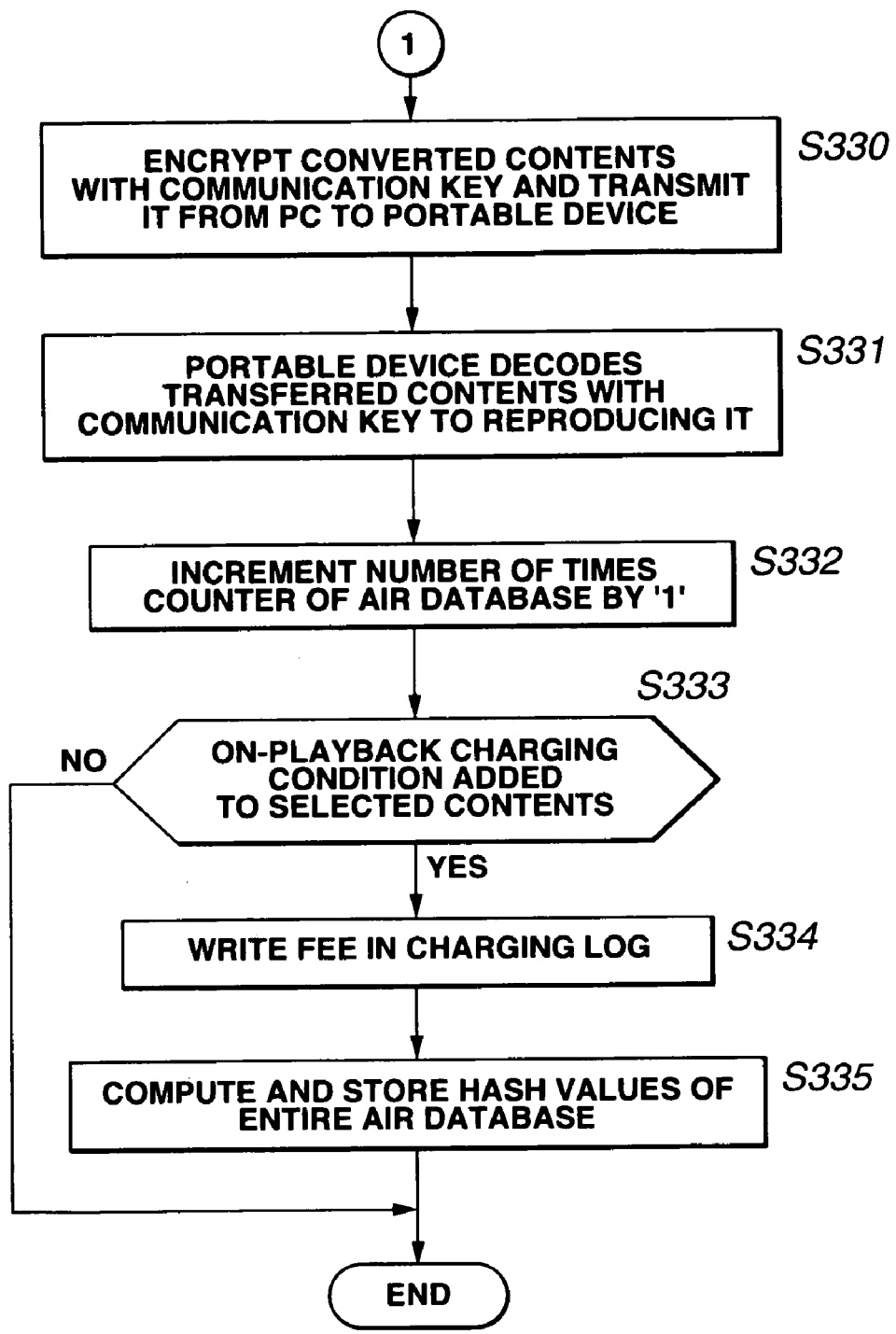
FIG. 32, continuing to FIG. 31, is a flowchart for illustrating the operation of outputting contents from the HDD 21 through the portable device 6.

Referring to the flowchart of FIGS. 31 and 32, the processing of outputting (reproducing) the contents from the HDD 21 via the portable device 6, by the CPU 11 executing the contents management program 111 and by the CPU 53 executing the main program, is explained. At steps S321 to S325, it is checked as to whether or not the air database has been modified, as to whether or not the selected contents have been specified, and as to the reproducing conditions of the selected contents. Since the processing is similar to that of the steps S271 to S275 of FIG. 28, the corresponding description is omitted for simplicity.

At step S326, reciprocal authentication processing is executed between the portable device 6 and the personal computer 1 so that the key for communication is co-owned by the portable device 6 and the personal computer 1. At step S327, the display operation command program 112 commands the portable device 6 to reproduce the encrypted contents now to be sent. At step S328, the display operation command program 112 causes the contents management program 111 to read out the filename of the designated selected contents from the air database into the contents management program 111 at step S324 to read out the contents of the filename from the HDD 21. At step S329, the display operation command program 112 causes the contents management program 111 to execute the processing of converting the contents compression encoding system, encryption system, or the format into those for the portable device 6. At step S330, the display operation command program 112 causes the encryption program 137 to encrypt the contents converted at step S329, with the key for communication, to transmit the encrypted contents to the portable device 6.

At step S331, the CPU 53 of the portable device 6 decodes the transmitted data with the key for communication, in association with the command transmitted from the personal computer 1, at step S327, to output the decoded data. At step S332, the display operation command program 112 causes the contents management program 111 to increment the number of times of replay count of the air database by 1 in the contents database 114. At step S333, the display operation command program 112 checks whether or not the on-playback charging conditions have been added to the selected contents. If the on-playback charging conditions have been added to the selected contents, the fee is written via the contents management program 111 at step S334 in the contents database 114. At step S335, the hash values of the entire air database are newly computed and saved by the CPU 32. If the on-playback charging conditions have not been added to the selected contents, the processing of the steps S334 and S335 is skipped.

In the present invention, a variety of techniques are used to prevent illicit duplication of contents. For example, the program for operating the CPU 11 is a so-called tamper-resistant software in which the sequence of execution thereof is changed from one executing operation to another.

Also, as explained above, a portion of the function of the CPU 11 is taken charge of by the adapter 26 as a hardware, so that the two will execute variable processing in cooperation with each other, thereby further improving the safety.

Figure 8:
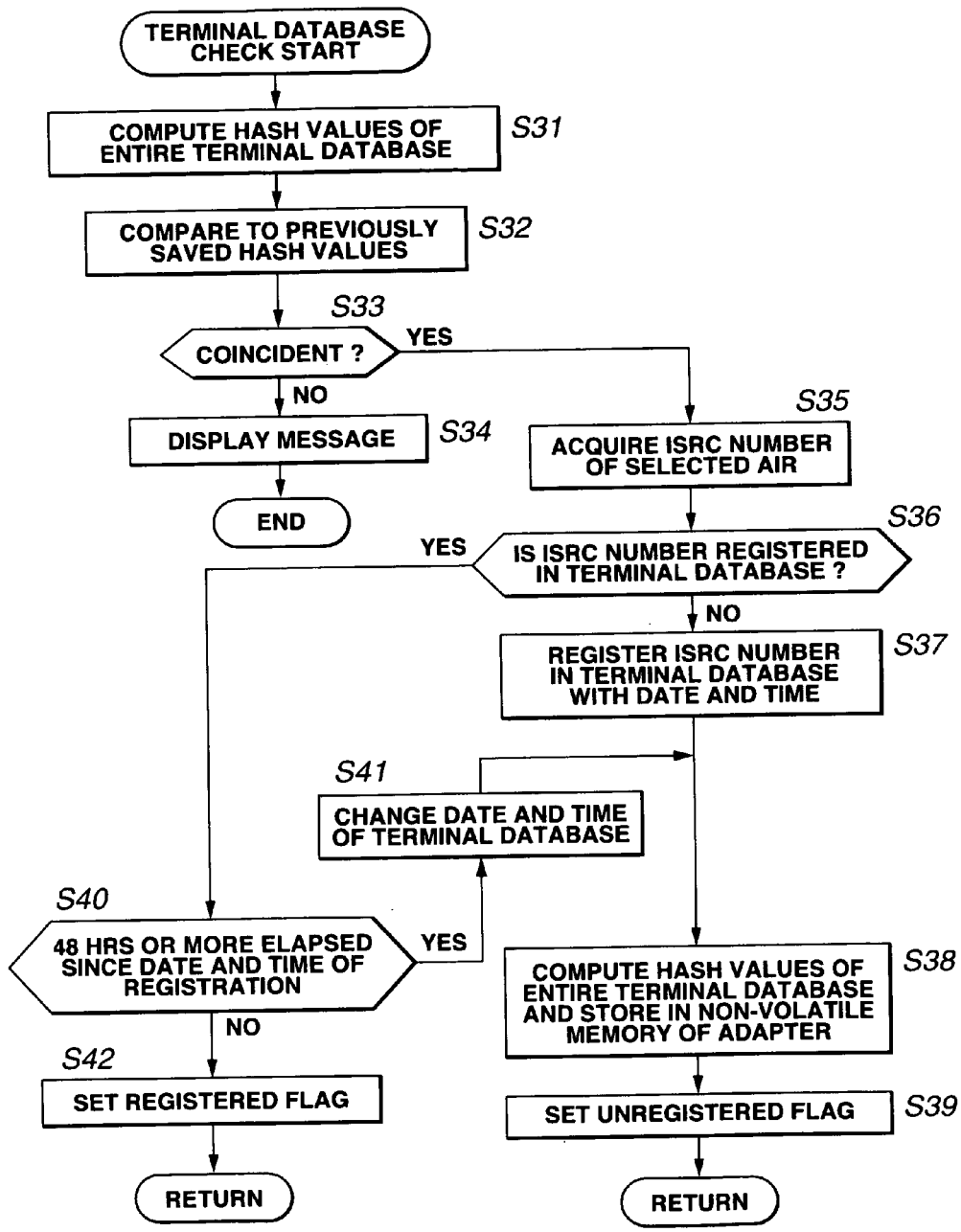
FIG. 8 is a flowchart for illustrating the terminal database. Check processing of step S12 of FIG. 7.

For example, as described above, the hash values of the air database are not stored in the air database itself, but is stored in the non-volatile memory 34 of the adapter 26. That is, past hash values, used for comparison with the previous hash values saved at steps S32 and S33 of FIG. 8, are stored in the non-volatile memory 34. If, for example, the entire recording contents including the contents stored in the HDD 21 are backed up before copying or moving to other recording mediums, and the contents contained in the recording contents backed up in the HDD 21 are re-stored, after copying or moving the contents saved in the HDD 21 from the HDD 21, it is possible to prevent the situation in which copying or movement is enabled without limitations to the disregard of the use conditions.

Figure 33:
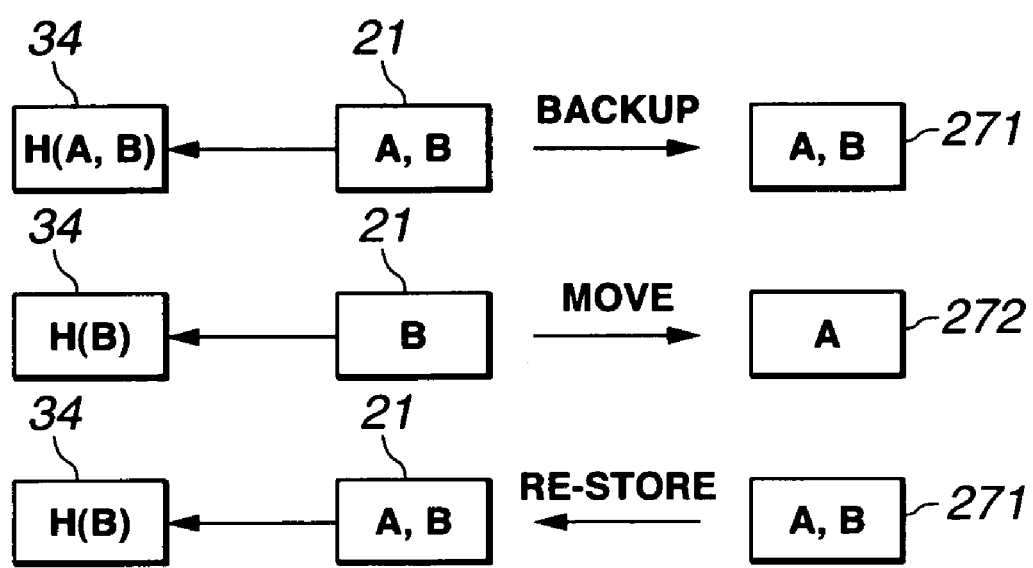
FIG. 33 illustrates the function of a non-volatile memory 34.

For example, if contents A and B are saved in the HDD 21, as shown in FIG. 33, the hashed values corresponding to the information of the contents A and B are saved in the non-volatile memory 34. In this state, part or all of the recording data containing the contents A and B of the HDD 21 is backed up in the HDD 21. If subsequently the contents A saved in the HDD 21 along with the contents B are moved to another recording medium 272, the contents recorded at this time point in the HDD 21 are only the contents B, so that the hash values of the non-volatile memory 34 are changed to the hash values corresponding to the contents B.

Thus, if, after part or all of the recording data containing the contents A and B of the HDD 21, backed up in the recording medium 271, are re-stored in the HDD 21, to save the contents A and B again in the HDD 21, the hashed values computed from the information on the contents B are stored in the non-volatile memory 34, while the hashed values computed from the information of the contents A and B are not stored therein. Thus, at this time point, the hash values derived from the contents A and B stored in the HDD 21 cease to be coincident with the past hash values stored in the non-volatile memory 34, thus detecting the modification of the air database. Thus, from this time on, limitations are imposed on the use of the contents A and B saved in the HDD 21.

As described above, the adapter 26 has enclosed therein the RTC 35, the value of which corrects the time information based on the time data transferred from another device, such as EMD server 4, from which correct results of authentication have been obtained. As the current date and time, the current date and time outputted by the RTC 35 is used instead of that supervised by the user. Thus, it is not possible for a user to correct the current date and time of the personal computer 1 willfully to the past date and time to evade the decision of the replay end date and time as the replay conditions.

Figure 34:
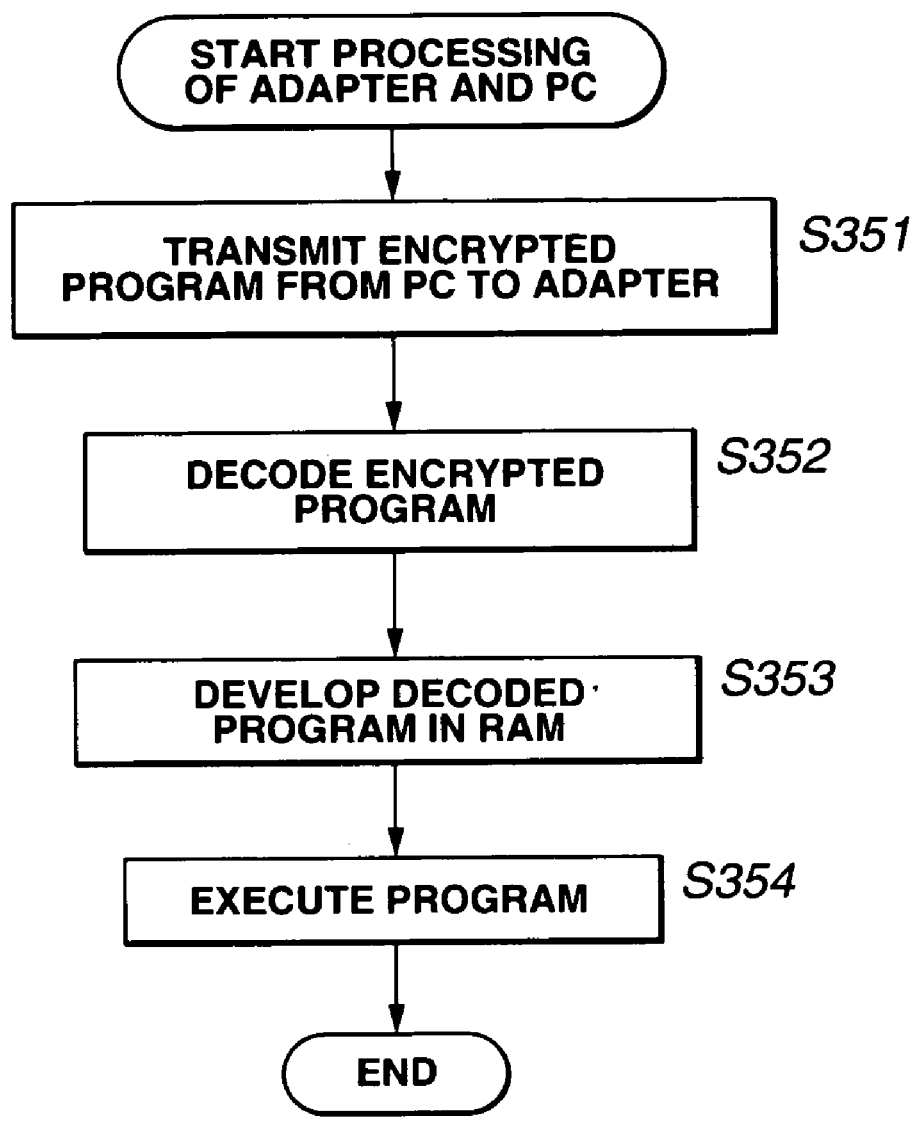
FIG. 34 is a flowchart for illustrating the operation of an adapter 26.

The adapter 26 is configured to decode and execute the program transferred in an encrypted form in accordance with a program pre-stored in the ROM 36 to assure higher safety. This point will be explained by referring to the flowchart of FIG. 34.

That is, if desired to perform certain processing on the adapter 26, the personal computer 1 at step S351 encrypts the program to be executed on the adapter 26, using an encryption key pre-stored in the RAM 13, to transfer the encrypted program to the adapter 26. In the ROM 36 of the adapter 26 is pre-stored the program for decoding and executing the program adapted for decoding the encrypted program transferred from the personal computer 1 and for executing the decoded program. The CPU 32 at step S352 decodes the program transferred from the personal computer 1 in accordance with the program stored in the ROM 36. The CPU 32 at step S313 develops the decoded program in the RAM 33 to execute the program at step S354.

When causing the adapter 26 to compute the hash value of the air database of the HDD 21, the CPU 11 of the personal computer 1 encrypts the data of the air database with the encryption key to transfer the encrypted data to the CPU 32 of the adapter 26. The CPU 32 applies the hash function to the data of the air database transferred thereto to compute the hash values. The computed hash values are stored in the non-volatile memory 34. Alternatively, the hash values are compared to the previously stored past hash values to give the results of comparison which are transferred transition probability the CPU 11 of the personal computer 1.

Figure 35:
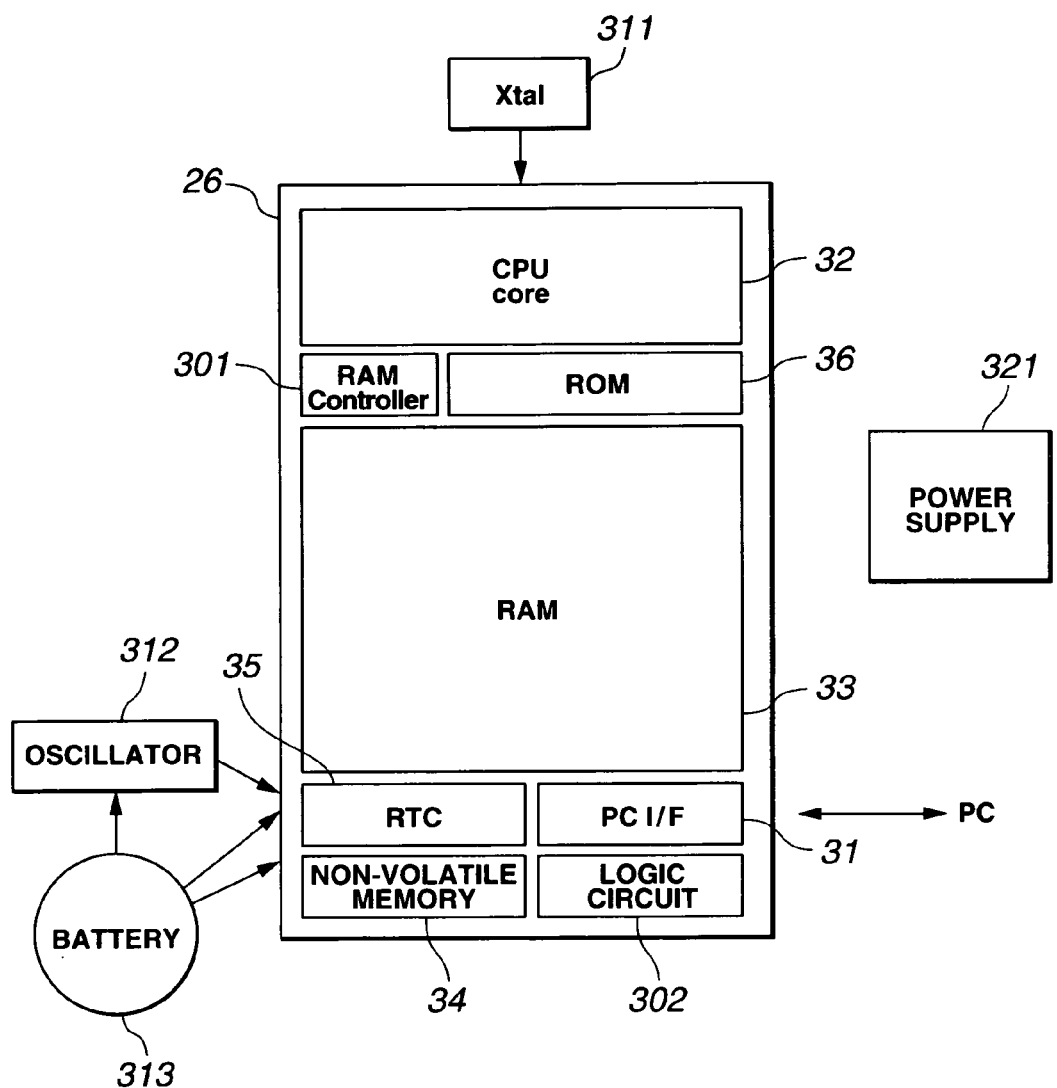
FIG. 35 shows an inner structure of the adapter 26.

FIG. 35 shows a more detailed inner structure of the adapter 26 configured as a semiconductor IC. The adapter 26 includes, in addition to the interface 31, CPU 32, RAM 33, non-volatile memory 34, RTC 35 and the ROM 36, a RAM controller 301 for controlling the write and read-out for the RAM 33, and a logic circuit 302. The logic circuit 302 is used when decoding the encrypted contents and directly outputting the decoded data from the adapter 26.

The components from the interface 31 to the ROM 36, RAM controller 301 and the logic circuit 302 are monolithically assembled in a semiconductor IC to frustrate an effort to dismount it from outside.

A quartz oscillator 311 is used for generating reference clocks by the adapter 26 executing variable processing operations. An oscillator circuit 312 is used for operating the RTC 35. A battery 313 supplies the power for backup to the oscillator circuit 312, non-volatile memory 34 and to the RTC 35. Other circuits of the adapter 26 are fed with the power from a power source supply circuit 321 of the personal computer 1.

Figure 36A:
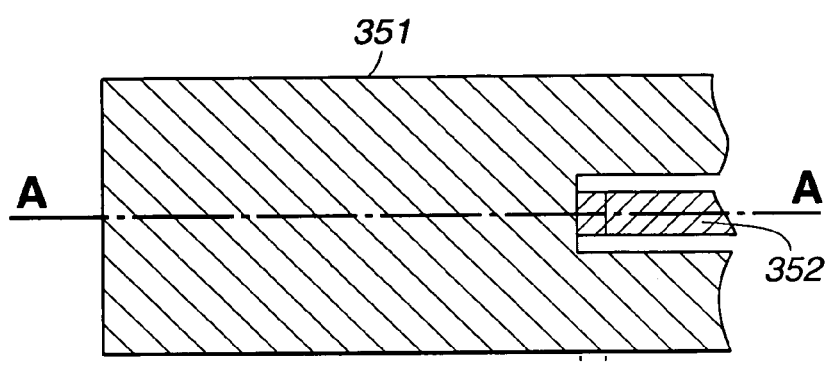
FIGS. 36A and 36B are flowcharts.
Figure 36B:
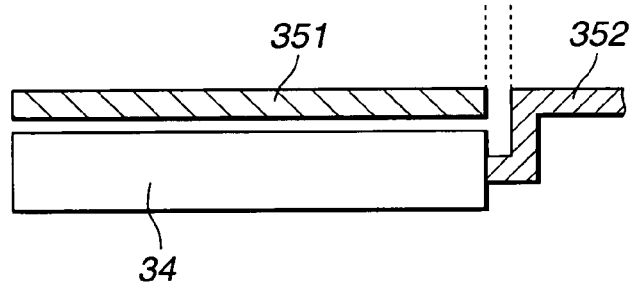
Figure 37:
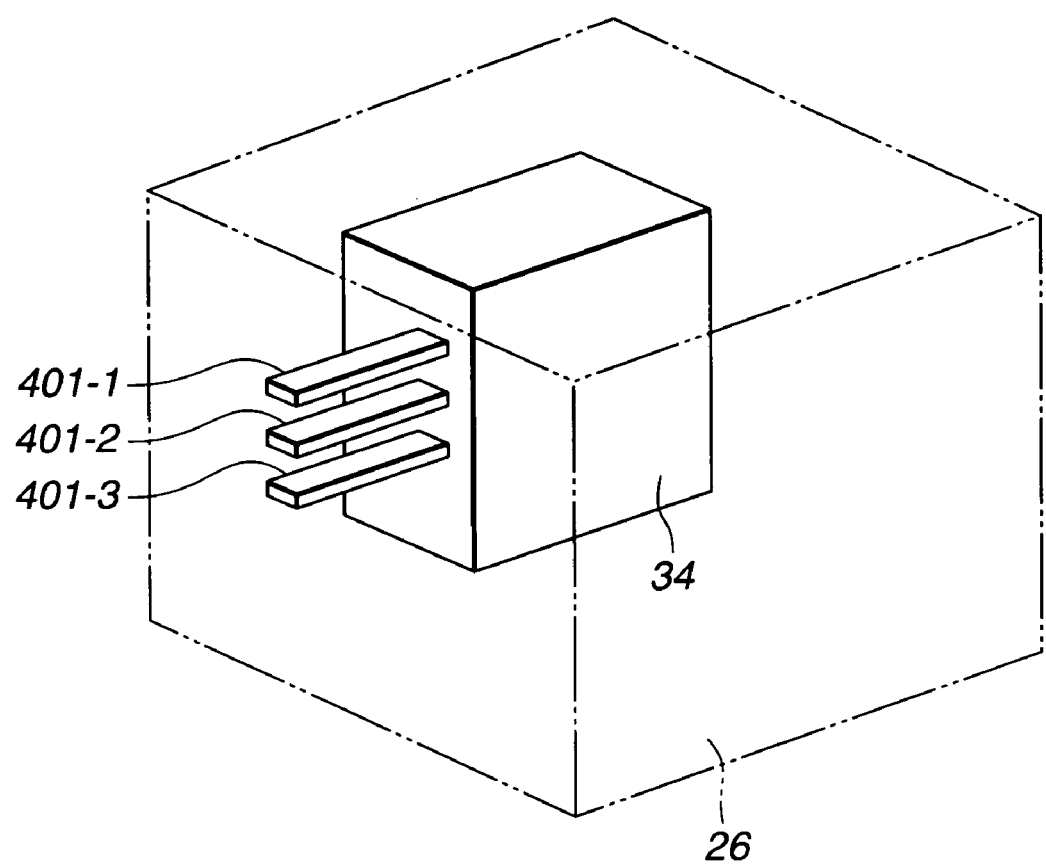
FIG. 37 shows another illustrative inner structure of the non-volatile memory 34.

The non-volatile memory 34 may be configured by a write-erase ROM. However, if the non-volatile memory 34 is formed by a RAM backed up by a backup power source from the battery 313, it is possible to form a protective aluminum layer 351 on the non-volatile memory 34, and to form a power source pattern 352 flush with the protective aluminum layer 351 to supply the power from the battery 313 to the non-volatile memory 34, as shown in FIG. 36. By so doing, if it is attempted to delete the protective aluminum layer 351 to modify the non-volatile memory 34, the power source pattern 352 flush with the protective aluminum layer 351 is also deleted to interrupt power supply to the non-volatile memory 34 to erase the data stored therein. This structure described above further increases tamper resist properties. Referring to FIG. 37, wirings 401-1 to 401-3 for data write and readout for the non-volatile memory 34 are formed so as to overlie one another in the up-and-down direction (depth-wise direction) in the registering positions. With this structure, the upper wirings 401-1 and 402-2 need to be removed if desired to read out data from the lower wiring layer 401-3, such that data cannot be read simultaneously from the plural wirings 401-1 to 401-3.

The non-volatile memory 34 may be constructed to render the wirings 401-1 to 401-3 redundant. For example, if the wirings 401-1 to 401-3, provided in the inside of the non-volatile memory 34, are used to interconnect the elements making up the non-volatile memory 34, such as transistors, the path is not designed to be linear, even if this is possible, and is designed to be of a pre-set length. By so doing, the length required for the wirings 401-1 to 401-3 may be longer than an inherently required length, such that the parasitic capacitance is larger than in case the length of the wirings 401-1 to 401-3 is a minimum length required as the wiring.

With a dedicated circuit, designed for reading out the data from the non-volatile memory 34, and which is enclosed in the adapter 26 as the semiconductor IC, data stored in the non-volatile memory 34 can be read out as normally by setting the impedance matched to the parasitic capacity. However, if a probe is connected to the wirings 401-1 to 401-3 to read out data stored in the non-volatile memory 34, the combined capacitance of the parasitic capacitance and the probe capacitance operates as an influencing factor to render it difficult to read out data as normally.

Figure 38:
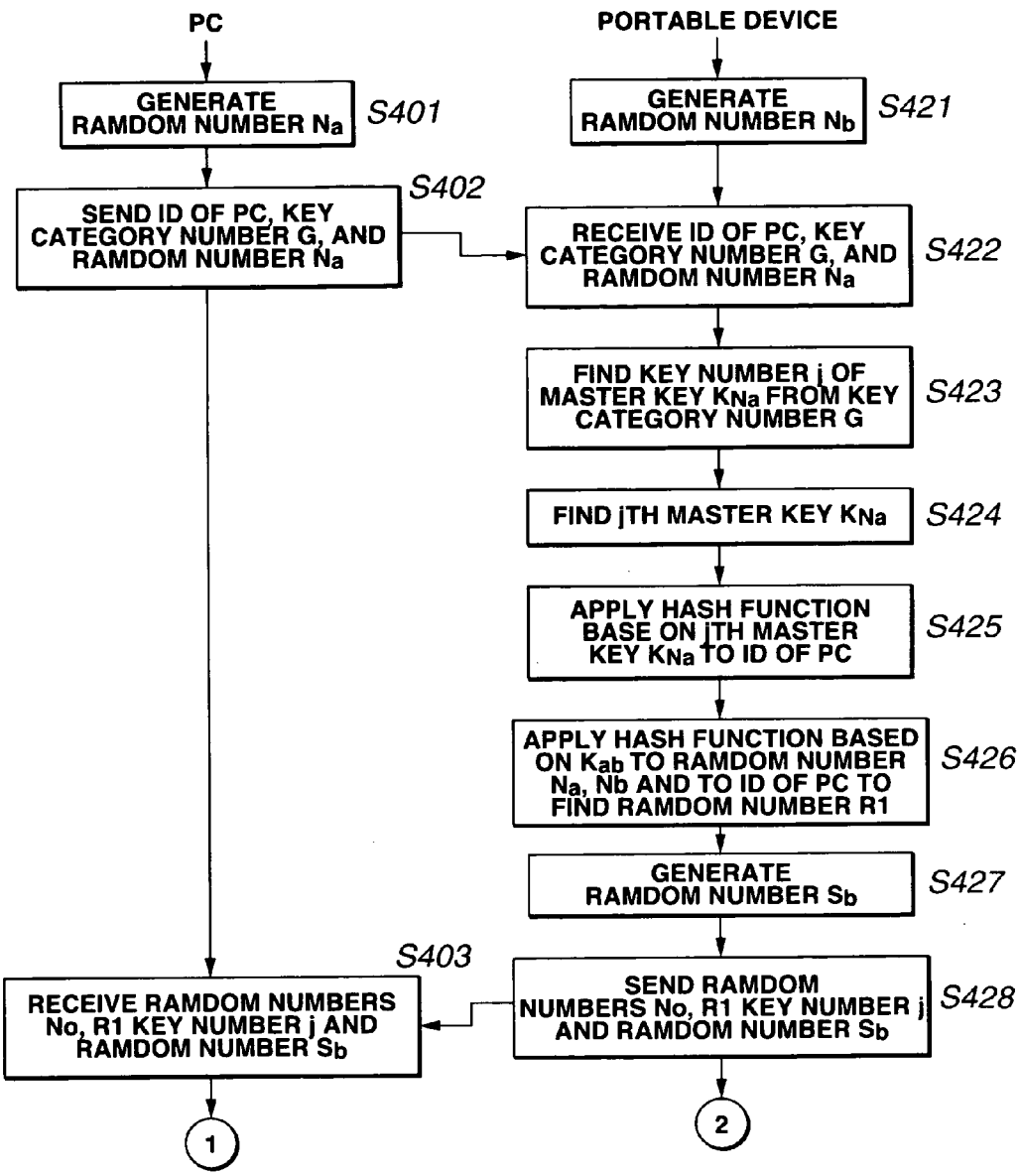
FIG. 38 is a flowchart for illustrating the reciprocal authentication processing between the adapter 7 and the personal computer 1.
Figure 39:
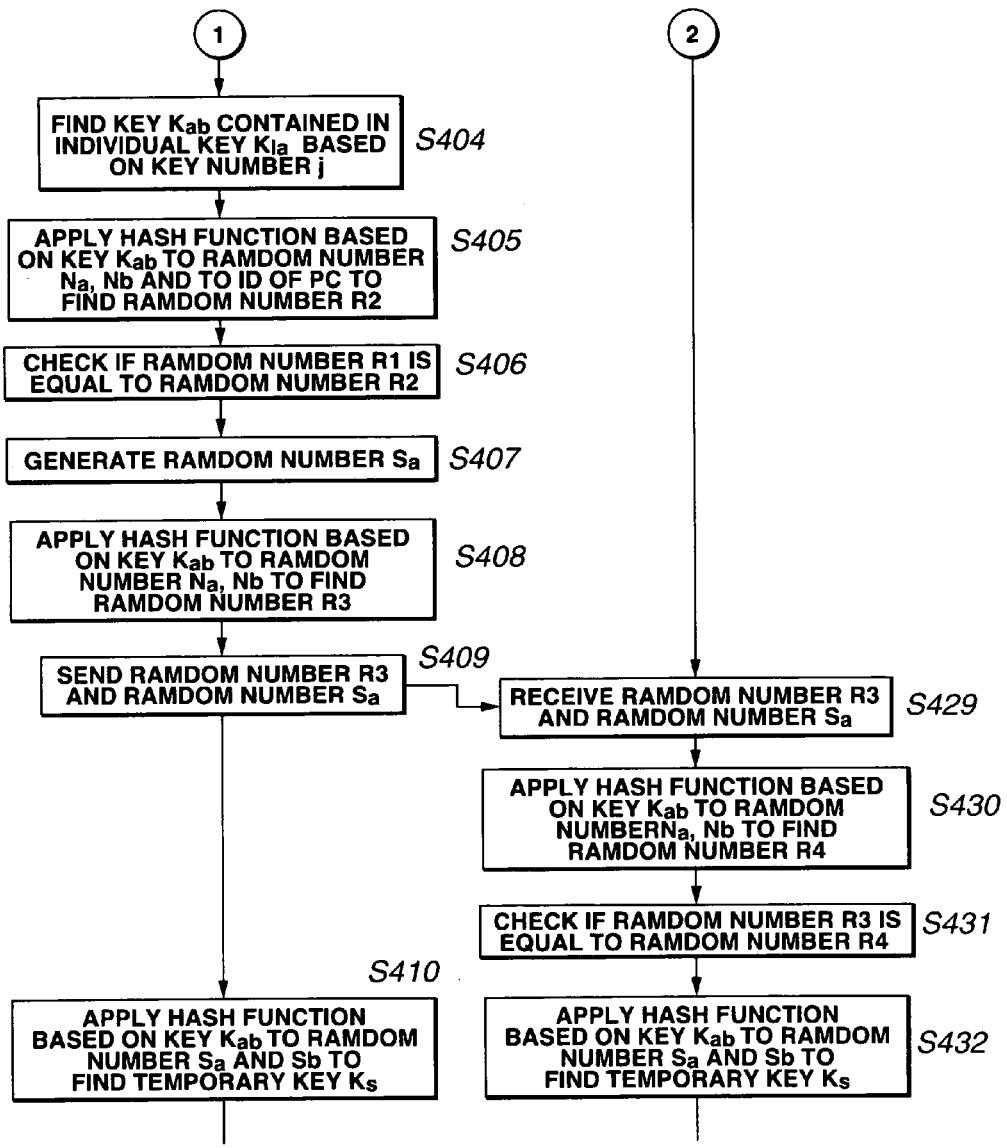
FIG. 39, continuing to FIG. 38, is a flowchart for illustrating the reciprocal authentication processing between the adapter 7 and the personal computer 1.

The reciprocal authentication processing in case the portable device 6 receives pre-set data from the personal computer 1 is explained by referring to the flowchart of FIGS. 38 and 39. At step S401, the CPU 11 of the personal computer 1 generates a random number Na. At step S402, the CPU 11 of the personal computer 1 transmits the ID of the personal computer 1, a category number G of the key and the random number Na to the portable device 6.

At step S421, the CPU 53 of the portable device 6 generates a random number Nb. At step S422, the portable device 6 receives the ID of the personal computer 1, category number G of the key and the random number Na, transmitted from the personal computer 1 over the interface 17. At step S423, the CPU 53 of the portable device 6 finds the key number j of the master key KMa from the key category number G.

At step S424, the CPU 53 of the port able device 6 finds the jth master key Kma[j]. At step S425, the CPU 53 of the portable device 6 applies the hash function, such as SHA, derived from the master key KMa[j] to the ID of the personal computer 1 to find the key Kab.

At step S426, the CPU 53 of the portable device 6 applies the hash function, such as SHA, derived from the key Kab, to the random number Na, random number Nb and to the ID of the personal computer 1 to find a random number R1. At step S427, the CPU 53 of the portable device 6 generates a random number Sb.

At step S428, the CPU 53 of the portable device 6 transmits the random numbers Na, Nb and Sb and the key number j to the personal computer 1.

At step S403, the personal computer 1 receives the random numbers Na, Nb and Sb and the key number j over the interface 17. At step S404, the CPU 11 of the personal computer 1 finds the key Kab contained in the individual key Kia, based on the key number j. At step S405, the CPU 11 of the personal computer 1 applies the hash function, such as SHA, to the random numbers Na, Nb and Sb and the key number j, to find the random number R2.

At step S406, the CPU 11 of the personal computer 1 checks whether or not the received random number R1 is equal to the random number R2 generated at step S405. If the random numbers R1 and R2 are found to be not equal to each other, the portable device is not an authentic device and hence the portable device 6 is not authenticated to terminate the processing. If it is found at step S406 that the random numbers R1 and R2 are equal to each other, the portable device 6 is an authentic device and hence the program moves to step S407 where the CPU 11 of the personal computer 1 generates the random number Sa.

At step S408, the CPU 11 of the personal computer 1 applies the hash function, such as SHA, derived from the key Kab, to the random numbers Na and Nb, to find a random number R3. At step S409, the CPU 11 of the personal computer 1 causes the interface 17 to transmit the random numbers Ra and Sb to the portable device 6. At step S410, the CPU 11 of the personal computer 1 applies the hash functions, such as SHA, derived from the key Kab, to the random numbers Sa and Sb, to find a transient key Ks.

At step S429, the CPU 53 of the portable device 6 receives the random numbers R3 and Sb. At step S430, the CPU 53 of the portable device 6 applies the hash functions, such as SHA, derived from the key Kab, to the random numbers Nb and Na, to find a random number R4. At step S431, the CPU 53 of the portable device 6 checks whether or not the random number R3 received is equal to the random number R4 generated at step S430. If it is found that the random number R3 is not equal to the random number R4, the personal computer is not an authentic personal computer and hence the personal computer is not authenticated to terminate the processing. If it is found at step S431 that the random number R3 is equal to the random number R4; the personal computer 1 is an authentic personal computer and hence the program moves to step S432 where the CPU 53 of the portable device 6 applies the hash function, such as SHA, derived from the key Kab, to the random numbers Sa and Sb to find the transient key Ks.

The personal computer 1 and the portable device 6 authenticate each other to obtain a common transient key Ks. Meanwhile, it has been explained above that the hash function such as SHA is applied at steps S425, S426, S405, S408, S410, S430 and at S432. Alternatively, DES, for example, may be applied.

Figure 40:
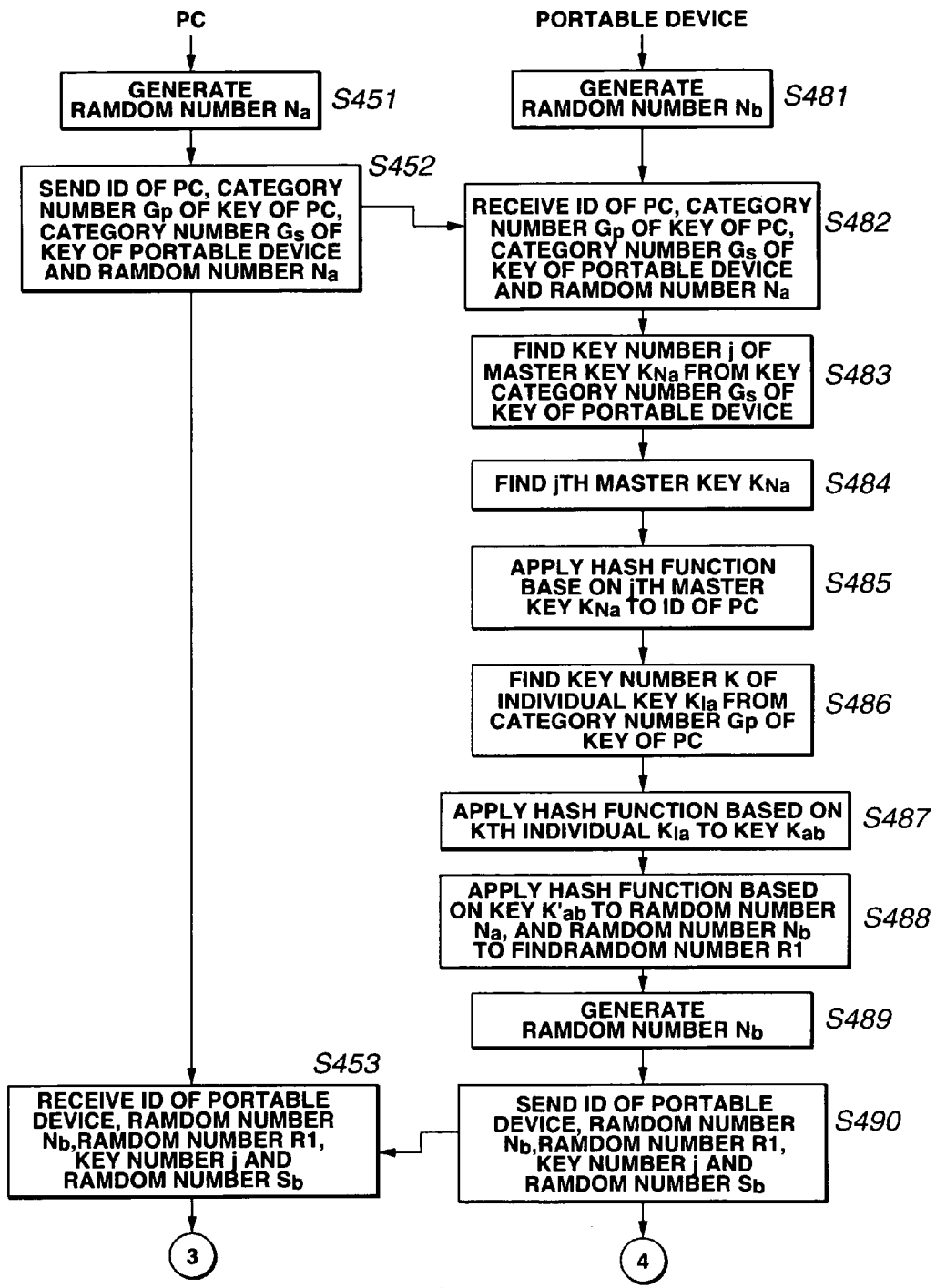
FIG. 40, continuing to FIG. 39, is a flowchart for illustrating the reciprocal authentication processing between the adapter 7 and the personal computer 1.
Figure 41:
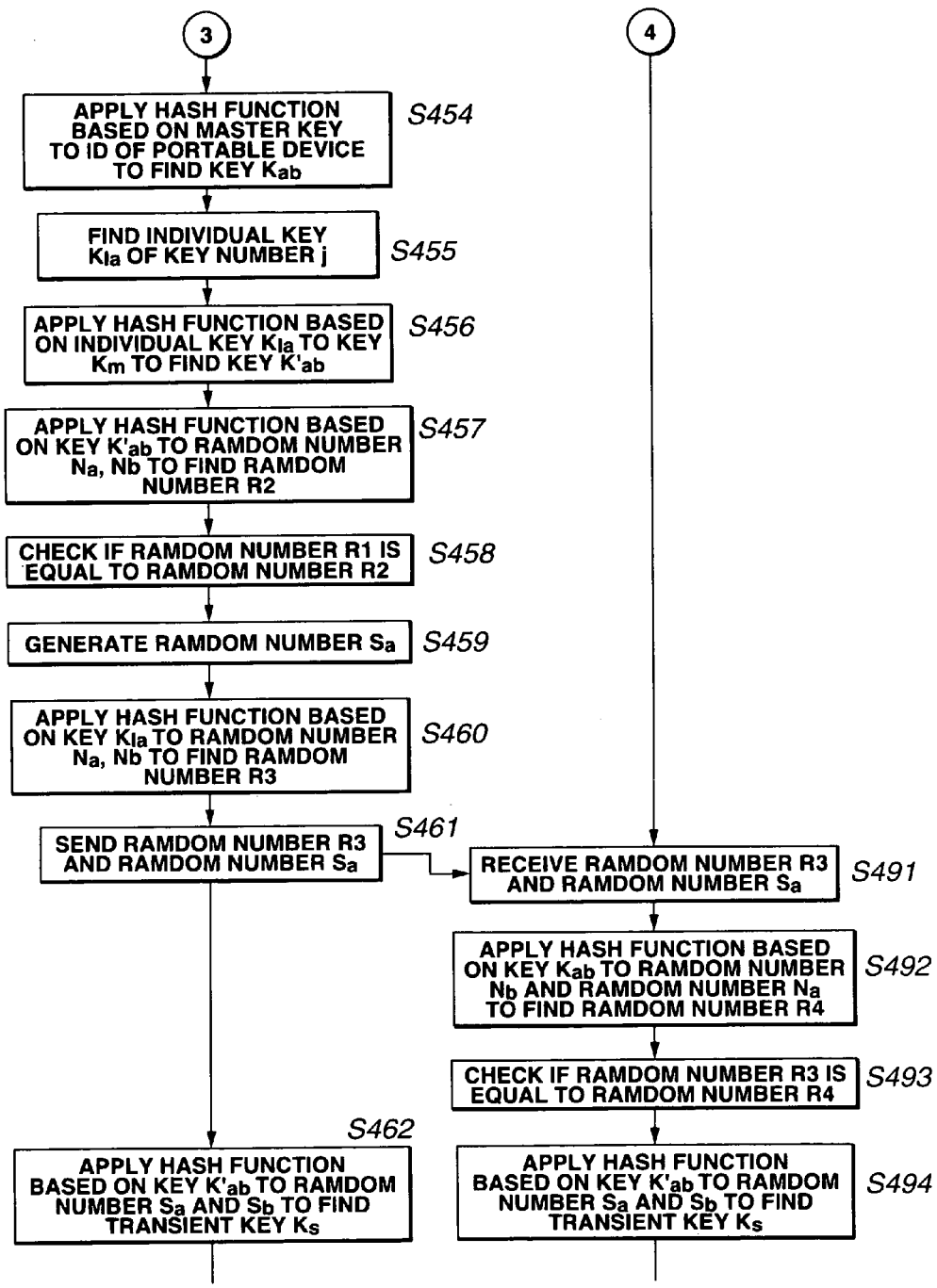
FIG. 41, continuing to FIG. 40, is a flowchart for illustrating the reciprocal authentication processing between the adapter 7 and the personal computer 1.

Referring to the flowchart of FIGS. 40 and 41, the reciprocal authentication processing in case of transmitting pre-set data from the personal computer 1 to the portable device 6 is explained. At step S451, the CPU 11 of the personal computer 1 generates a random number Na. At step S452, the personal computer 1 transmits the ID of the personal computer 1, category number Gp of the key of the personal computer 1, category number Gs of the key of the portable device 6 and the random number Na to the portable device 6.

At step S481, the CPU 53 of the portable device 6 generates a random number Nb. At step S482, the portable device 6 receives the ID of the personal computer 1, transmitted via the interface 17 from the personal computer 1, category number Gp of the personal computer 1, category number Gs of the key of the portable device 6 and the random number Na from the personal computer 1. At step S483, the CPU 53 of the portable device 6 finds the key number j of the master key Kma from the category Gs of the key of the portable device 6.

At step S484, the CPU 53 of the portable device 6 finds the jth master key KMa[j]. At step S485, the CPU 53 of the portable device 6 applies the hash function, such as SHA, derived from the master key KMa[j], to the ID of the personal computer 1, to find the key Kab. At step S486, the CPU 53 of the portable device 6 finds the key number k of the master key Kia, based on the category number Gp of the personal computer 1. At step S487, the CPU 53 of the portable device 6 applies the hash function, such as SHA, derived from the master key KMa[j], to the key Kab, to find the key K'ab.

At step S488, the CPU 53 of the portable device 6 applies the hash function, such as SHA, derived from the key K'ab, to find the random number R1. At step S489, the CPU 53 of the portable device 6 generates the random number Sb.

At step S490, the CPU 53 of the portable device 6, causes the USB controller 57 to transmit the ID of the portable device 6, random numbers Nb, RI and Sb to the personal computer 1.

At step S453, the personal computer 1 receives the ID of the portable device 6, random numbers Nb, R1 and Sb and the key number j via the interface 17. At step S454, the CPU 11 of the personal computer 1 applies the hash function, such as SHA, derived from the master key KMP, to find the ID of the portable device 6, to find the master key Kin. At step S455, the CPU 11 of the personal computer 1 finds the jth personal key KIa. At step S456, the CPU 11 of the personal computer 1 applies 1 applies the hash function, such as SHA, derived from the key KIa, to the random numbers Na and Nb, to find the key K'ab. At step S457, the CPU 11 of the personal computer 1 applies the hash function, such as SHA, derived from the key K'ab, to the random numbers Na and Nb, to find the random number R2.

At step S458, the CPU 11 of the personal computer 1 verifies whether or not the random number R1 received is equal to the random number R2 generated at step S457.

If the random number R1 is found not to be equal to the reference numerals R2, the portable device 6 is not an authentic device, and hence is not authenticated, such that the processing is terminated. If the random number R1 is found to be equal to the random number R2, the portable device 6 is an authentic device, and hence the program moves to step S459 where the CPU 11 of the personal computer 1 generates a random number Sa.

At step S460, the CPU 11 of the personal computer 1 applies the hash function, such as SHA, derived from the key KIa, to the random numbers Nb and Na, to find a random number R3. At step S461, the CPU 11 of the personal computer 1 transmits the random numbers R3 and Sb through the interface 17 to the portable device 6. At step S462, the CPU 11 of the personal computer 1 sends the random numbers R3 and Sb to the portable device 6 through the interface 17. At step S462, the CPU 11 of the personal computer 1 applies the hash function, such as SHA, derived from the key Kia, to the random numbers Sb and Sa, to find the transient key Ks.

At step S491, the CPU 53 of the portable device 6 receives the random numbers R3 and Sb. At step S492, the CPU 53 of the portable device 6 applies the hash function, such as SHA, derived from the key Kab, to the random numbers Nb and Na, to find a random number R4. At step S493, the CPU 53 of the portable device 6 verifies whether or not the random number R3 received is equal to the random number R4 generated at step S492. If the random number R3 is found not to be equal to the random number R4, the portable device 6 is not an authentic device, and hence is not authenticated, such that the processing is terminated. If the random number R3 is found to be equal to the random number R3, the portable device 6 is an authentic device, and hence the program moves to step S494 where the CPU 53 of the portable device 6 applies the hash function, such as SHA, derived from the key Kab, to the random numbers Sa and Sb, to find the transient key Ks.

In this manner, the personal computer 1 and the portable device 6 authenticate each other to acquire a common transient key Ks. The procedure shown in the flowchart of FIGS. 40 and 41 is stronger than that shown in the flowchart of FIGS. 38 and 39 in its defence against the "disguised" attack. Meanwhile, it has been explained above that the hash function such as SHA is applied at steps S485, S487, S488, S454, S456, S457, S460, S462, S492 and at S494. Alternatively, DES, for example, may be applied.

As described above, the personal computer 1 and the portable device 6 can cope with the "disguised" aggression efficiently and potently by selectively employing the reciprocal authentication processing procedures with differential detection power in keeping with the processing performed after the reciprocal authentication.

Figure 42:
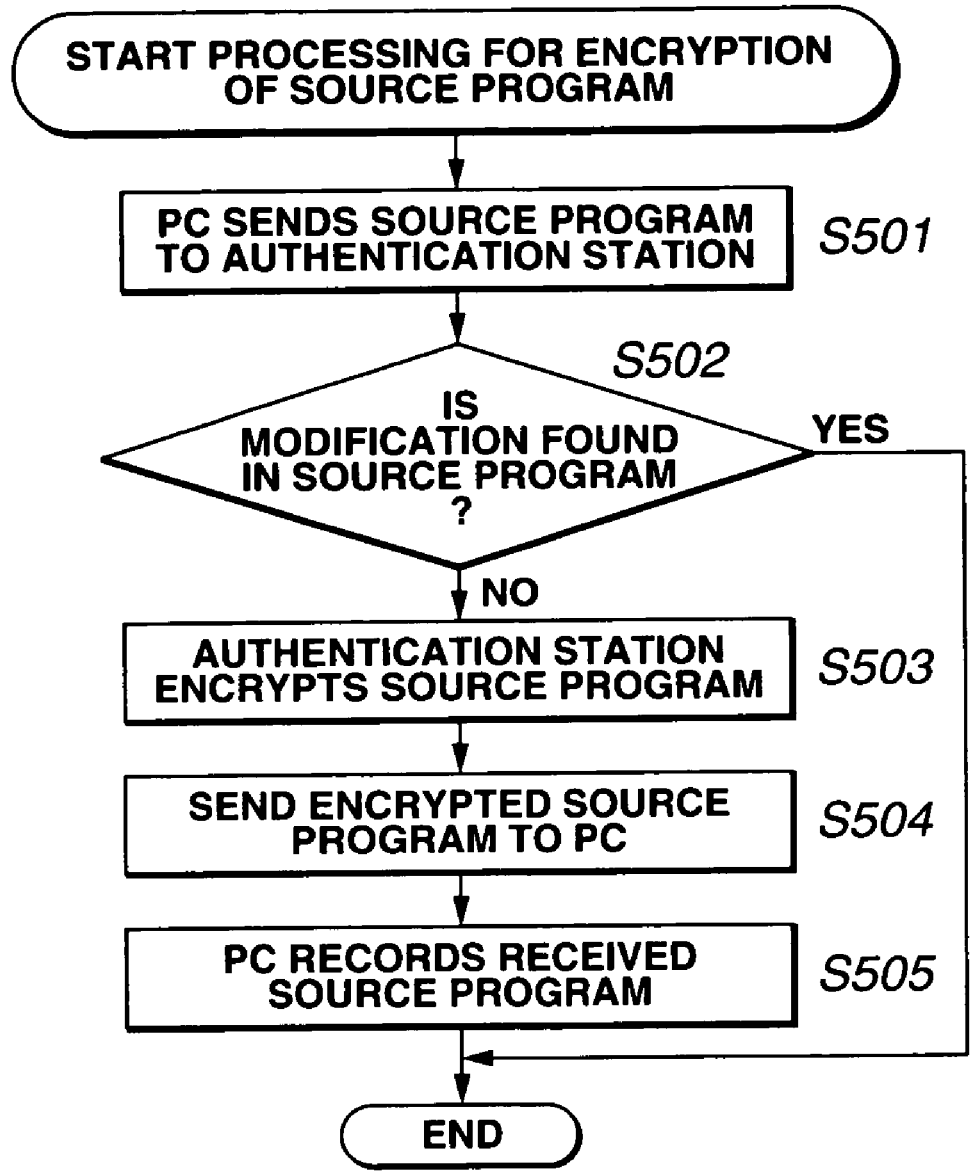
FIG. 42 is a flowchart for illustrating the processing of encrypting a source program.

The processing of encrypting the source program is explained with reference to the flowchart of FIG. 42. At step S501, the personal computer 1 transmits a signed source program to an authentication station, not shown, via the communication device 25. At step S502, the authentication station verifies, based on the signature, whether or not the source program has been modified. If the received source program is found to have been modified, the processing cannot be continued, and hence the processing is terminated.

If the received source program is found at step S502 not to have been modified, the program moves to step S503 where the authentication station encrypts the received source program with the encryption key of the authentication station. At step S504, the authentication station transmits the encrypted source program to the personal computer 1. At step S505, the personal computer 1 records the received source program on the HDD 21 to terminate the processing.

The above is the manner of encrypting the source program. Meanwhile, the EMD servers 4-1 to 4-3 or a pre-set safe server may also be used to encrypt the source program to take the place of the authentication station.

Figure 43:
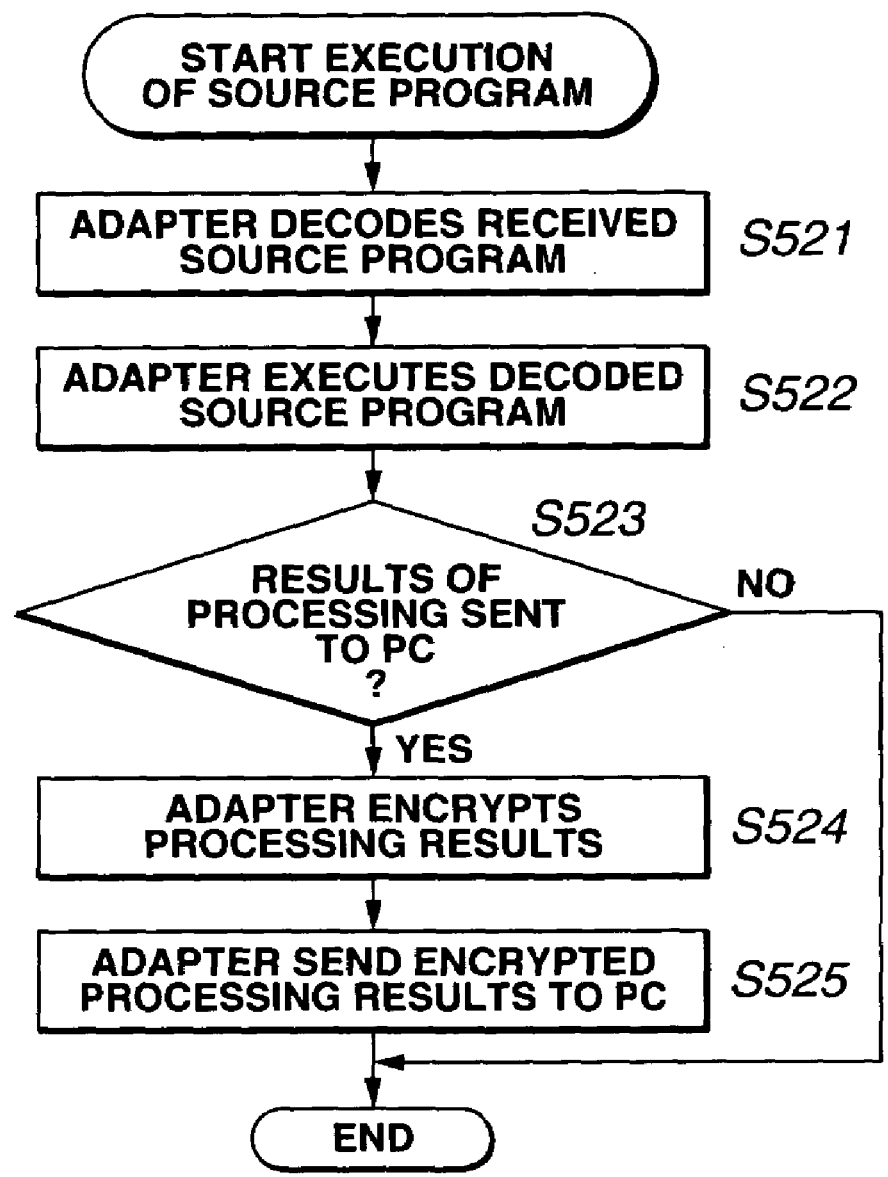
FIG. 43 is a flowchart for illustrating the processing of the adapter 7 executing the encrypted source program.

The processing of the adapter 26 executing the encrypted source program is explained with reference to the flowchart of FIG. 43. At step S521, the CPU 32 of the adapter 26 decodes the encrypted source program, received from the personal computer 1, with an open key of the authentication station pre-stored in the non-volatile memory 34. At step S522, the CPU 32 of the adapter 26 starts the interpreter to execute the decoded source program.

At step S523, the CPU 32 of the adapter 26 verifies whether or not the results obtained on executing the source program are to be transmitted to the personal computer 1. If it is found that the results be not transmitted to the personal computer 1, the processing is terminated. If it is found at step S523 that the results be transmitted to the personal computer 1, the program moves to step S524 where the CPU 32 of the adapter 26 encrypts the results of execution of the source program with a pre-set key. At step S525, the CPU 32 of the adapter 26 transmits the encrypted results to the personal computer 1 to terminate the processing.

As described above, the adapter 26 executes the encrypted source program and, in a pre-set case, encrypts the results obtained to transmit the results to the personal computer 1.

Figure 44:
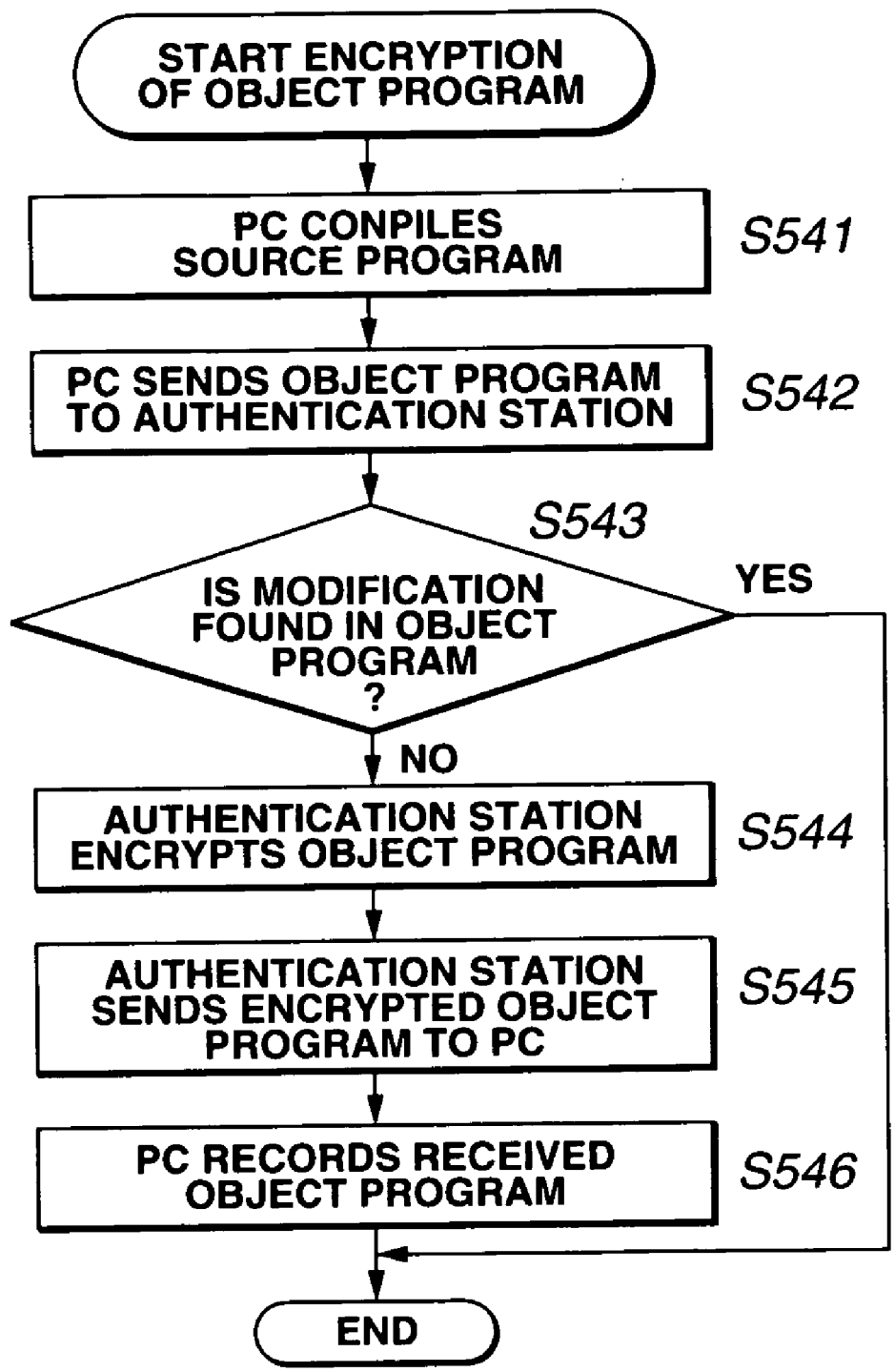
FIG. 44 is a flowchart for illustrating the processing of encrypting an object program.

It is also possible to encrypt the object program in order for the adapter 26 to execute the encrypted object program. FIG. 44 shows the flowchart for illustrating the processing of encrypting the object program. At step S541, the personal computer 1 compiles the source program to generate the pre-set object program. The processing from step S542 to step S546 is similar to that from step S501 to step S505 and hence is not explained specifically.

Figure 45:
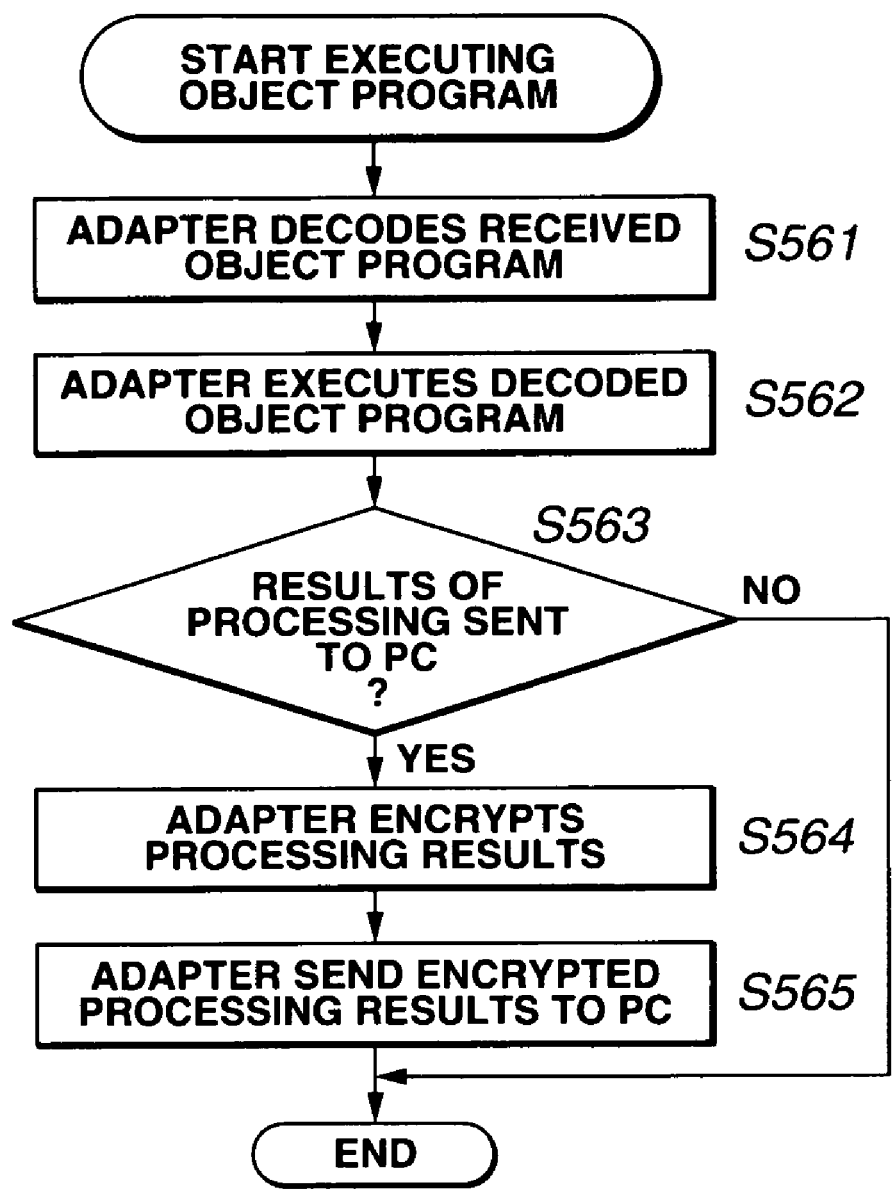
FIG. 45 is a flowchart for illustrating the processing of the adapter 7 executing the encrypted object program.

FIG. 45 is a flowchart for illustrating the processing of executing the encrypted object program by the adapter 26. At step S561, the CPU 32 of the adapter 26 decodes the encrypted object program, received from the personal computer 1, using an open key of the authentication station pre-stored in the non-volatile memory 34. At step S562, the CPU 32 of the adapter 26 develops the decoded object program on the RAM 33 to execute the program. The processing from step S563 to step S565 is similar to that from step S523 to S525 of FIG. 43 and hence is not explained specifically.

Figure 46:
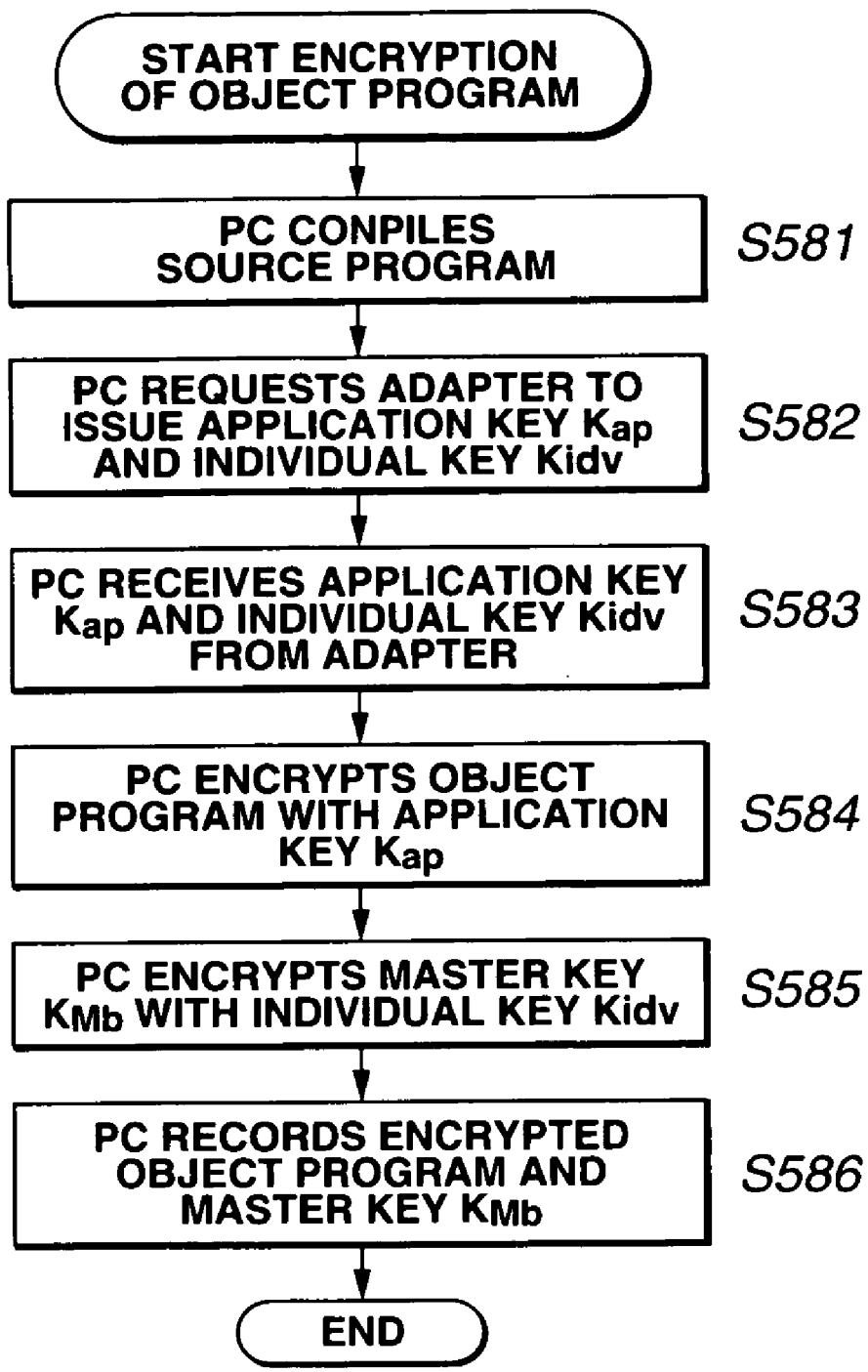
FIG. 46 is a flow chart of an object encryption procedure.

The other processing of encrypting the object program is explained by referring to the flowchart of FIG. 46. At step S581, the CPU 11 of the personal computer 1 requests the adapter 26 to issue an application key Kab and an individual key Kidv through the interface 17

At step S583, the personal computer 1 receives the application key Kab and the individual key Kidv, generated based on the key Ks proper to the adapter 26, and which is stored in the non-volatile memory 34 of the adapter 26, from the adapter 26 through the interface 17. At step S584, the CPU 11 of the personal computer 1 encrypts the object program by the application key Kap. At step S585, the CPU 11 of the personal computer 1 encrypts the master key KMb contained in the context with the individual key Kidv. At step S586, the CPU 11 of the personal computer 1 records the object program encrypted by the application key Kap and the master key KMb contained in the context encrypted with the individual key Kidv in the HDD 21 to terminate the processing.

In this manner, the personal computer 1 is able to encrypt the object program and the context with the application key Kap and the individual key Kidv supplied from the adapter 26.

The processing of the adapter 26 executing the object program encrypted in accordance with the procedure shown in the flowchart of FIG. 46 is explained with reference to the flowchart of FIG. 47. At step S601, the CPU 11 of the personal computer 1 transmits the object program encrypted by the application key Kap and the master key KMb contained in the context encrypted by the individual key Kidv.

At step S602, the CPU 32 of the adapter 26 applies the hash function to the key Ks and the application key Kap pre-stored in the non-volatile memory 34 to generate the individual key Kidv. At step S603, the CPU 32 of the adapter 26 decodes the received object program by the application key Kap. At step S604, the CPU 32 of the adapter 26 decodes the master key KMb with the individual key Kidv.

At step S605, the CPU 32 of the adapter 26 executes the object program by exploiting the context containing the decoded master key KMb. The processing from step S606 to step S608 is similar to that from step S523 to step S525 of FIG. 43 and hence is not explained specifically.

Figure 47:
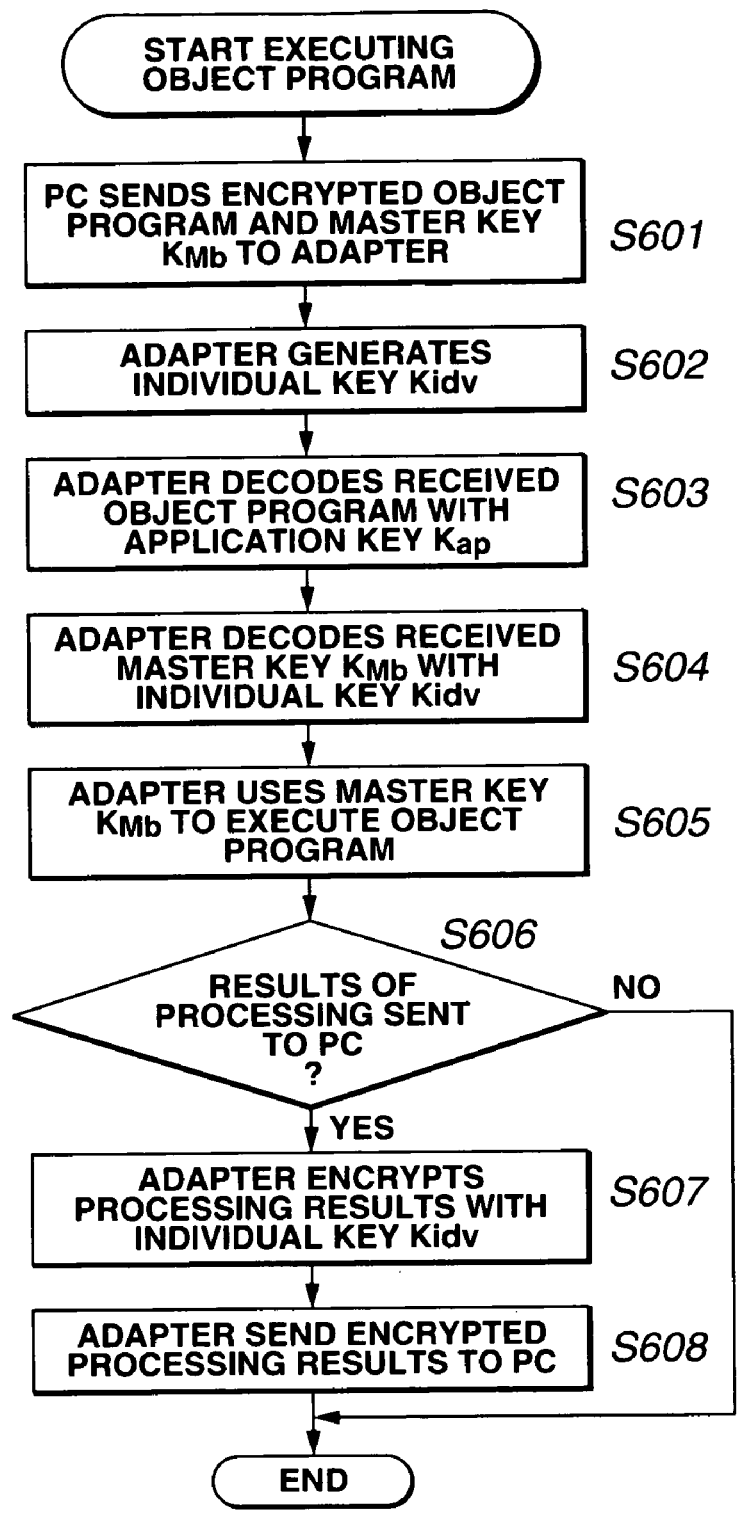
FIG. 47 is a flowchart for illustrating another example of the processing of encrypting an object program.

In the processing shown in the flowchart of FIG. 47, the adapter 26, which has transmitted the individual key Kidv of the flowchart of FIG. 46, is able to execute the encrypted object program. Thus, the adapters other than the adapter 26 which has transmitted the individual key Kidv in the flowchart of FIG. 46 is able to decode the object program, however, is unable to decode the context, such that it is unable to execute the encrypted object program.

Figure 48:
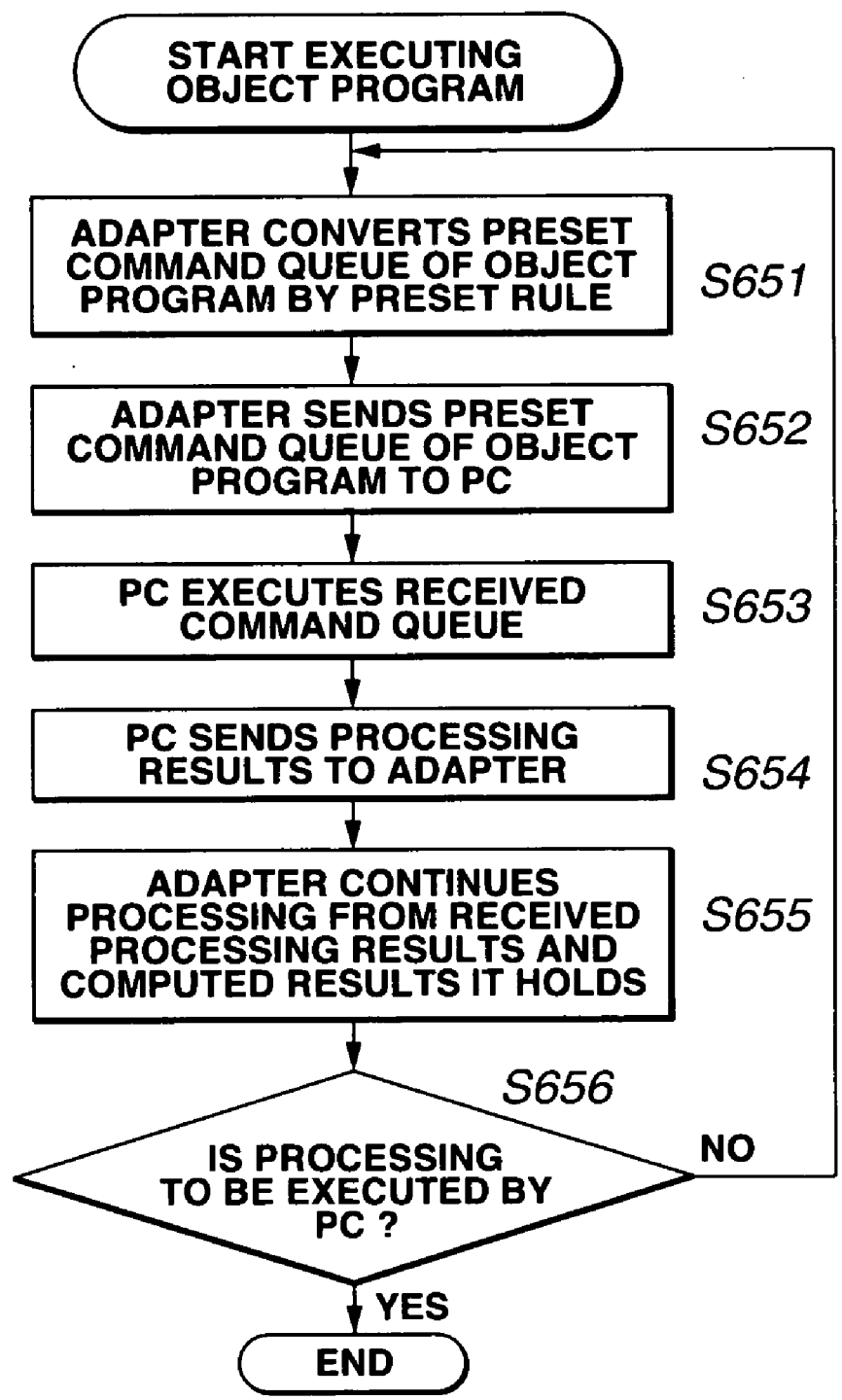
FIG. 48 is a flowchart for illustrating the processing of having a portion of object program executing processing of the adapter 7 executed by the CPU 12 of the personal computer 1.

Referring to the flowchart of FIG. 48, the processing of causing the CPU 11 of the personal computer 1 to execute part of the processing when the adapter 26 executes the object program is explained. At step S651, the CPU 32 of the adapter 26 converts a pre-set command queue of the object program in accordance with a pre-set rule.

For example, in the processing for repeating the basic structure, such as Feistel structure, as in the case of a DES encrypting or decoding program, this conversion executes Ex-OR operations a pre-set number of times on a 48-bit enlarged key and on an appropriate random number used in the so-called Feistel function, to render the decoding of the enlarged key difficult. Also, in the case of a program decoding a large amount of data in the DES CBC (cipher block chaining) mode, the processing of the iterative structure is not executed sequentially, but the processing of plural iterative structures is executed simultaneously on a large quantity of data to render the decoding of the enlarged key difficult.

Also, the code corresponding to the instructions of the source program is changed each time. This code is such a code in which the code denoting addition is "1", while the code denoting the multiplication corresponds to "2".

At step S652, the CPU 32 of the adapter 26 transmits the converted command queue to the personal computer 1 via the interface 31.

At step S653, the CPU 11 of the personal computer 1 executes the deshuffled command queue. At step S654, the CPU 11 of the personal computer 1 transmits the results of processing obtained on executing the command queue.

At step S655, the CPU 32 of the adapter 26 continues the processing based on the results of the processing received from the personal computer 1 and the computed results computed and held by the CPU 32 of the adapter 26. At step S656, the CPU 32 of the adapter 26 verifies whether or not the personal computer 1 is to execute the processing. If it is found that the personal computer 1 is not to execute the processing, the processing comes to a close. If, at step S656, the personal computer 1 is to execute the processing, the program reverts to step S651 to repeat the processing of causing the personal computer 1 to execute the processing.

By having part of the processing of the object program executed by the personal computer 1, the adapter 26 is able to execute the processing of the object program speedily and safely.

The adapter 26 converts the command queue contained in the object program to transmit the command queue to the personal computer 1 to render the decoding of the object program difficult. If the adapter 26 encrypts the command queue contained in the object program to transmit the encrypted command queue, the object program is rendered more difficult to decode.

If, in the processing of encrypting the object program which the personal computer 1 sends to the adapter 26 as explained with reference to FIG. 46, the conversion shown at step S652 is executed for the source program, the object program is rendered more difficult to decode.

Figure 49:
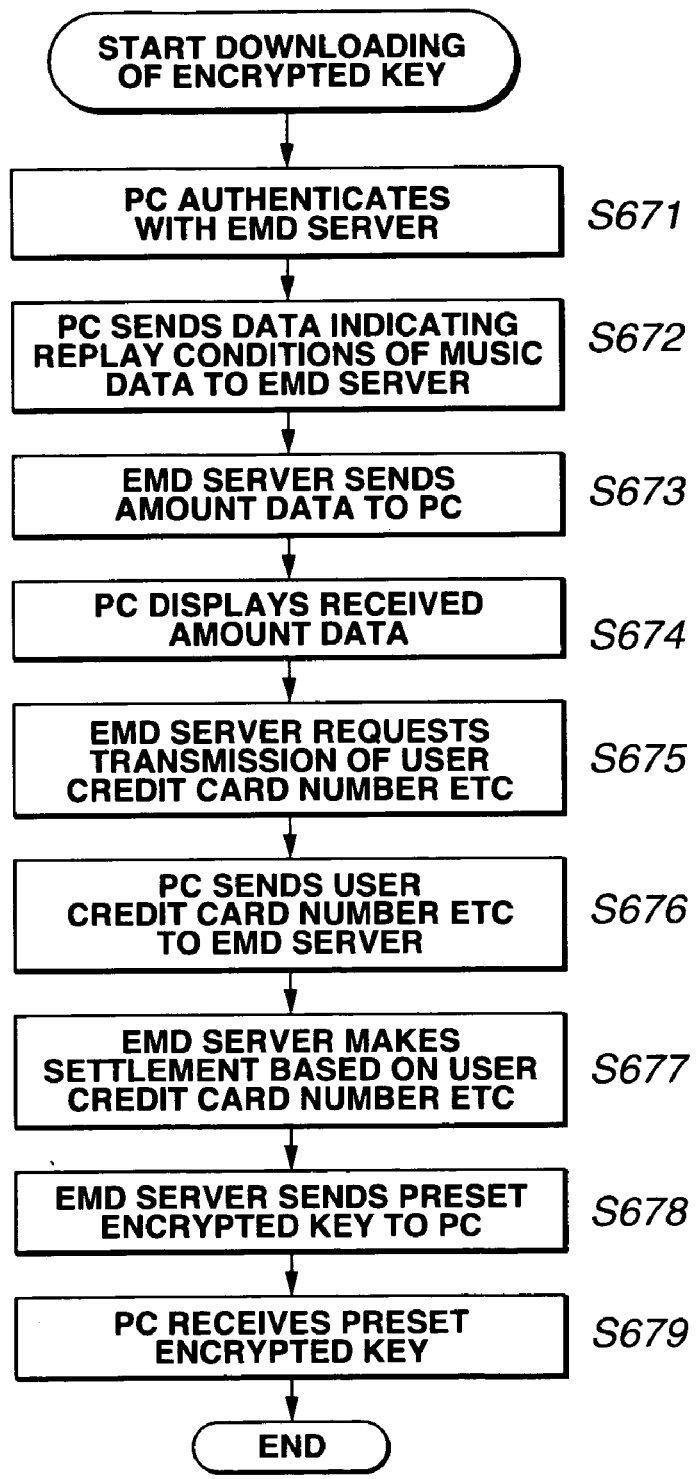
FIG. 49 is a flowchart for illustrating the processing of fee settlement when the personal computer 1 downloads an encryption key from an EMD server 5.

Finally, the processing of downloading the encryption key which encrypts the music data downloaded free of charge at the outset by the personal computer from the EMD servers 4-1 to 4-3 and of making the settlement is explained by referring to the flowchart of FIG. 49. At step S671, the personal computer 1 performs reciprocal authentication with the EMD servers 4-1 to 4-3 over the network 2. At step S672, the CPU 11 of the personal computer 1 transmits data specifying the replay conditions of the musical data to the EMD servers 4-1 to 4-3 through the communication device 25. At step S673, the EMD servers 4-1 to 4-3 transmits the data of the paired amount to the personal computer based on the received data indicating the replay conditions.

At step S674, the CPU 11 of the personal computer 1 demonstrates the data of the paid amount, received from the EMD servers 4-1 to 4-3, on the display 20. At step S675, the EMD servers 4-1 to 4-3 request the personal computer 1 to transmit e.g., the number of the user's credit card. At step S676, the user actuates the keyboard 18 or the mouse 19 to input data such as the credit card number to the personal computer 1, which then transmits the data such as the credit card number to the EMD servers 4-1 to 4-3.

At step S677, the EMD servers 4-1 to 4-3 execute the settlement processing based on data received from the personal computer 1. At step S678, the EMD servers 4-1 to 4-3 transmit the pre-set encryption key to the personal computer 1 over the network 2. At step S679, the personal computer 1 receives the pre-set encryption key, transmitted from the EMD servers 4-1 to 4-3 over the network 2, to terminate the processing.

If the personal computer 1 downloads the encryption key from the EMD servers 4-1 to 4-3, and the EMD servers 4-1 to 4-3 execute the processing for settlement, the processing of authentication, encryption or settlement is unnecessary to perform when the personal computer 1 downloads the music data from the EMD servers 4-1 to 4-3, so that music data as relatively voluminous data can be downloaded promptly.

In the foregoing, the portable device 6 is used as a recording medium. The present invention can, however, be applied to transferring or copying data to other recording mediums. Although the processing of settlement is executed based on data such as credit card numbers, the settlement may also be made by the procedure such as smash (trade mark).

It is also possible for the personal computer 1 and the EMD servers 4-1 to 4-3 to perform reciprocal authentication using the protocol on http (hypertext transport protocol) as provided by the ISO9798-3 prior to the processing shown in the flowchart of FIG. 49.

In the foregoing description, the portable device 6 stores the individual key at the outset. Alternatively, the individual key may also be downloaded from e.g., the EMD servers 4-1 to 4-3 after the user has purchased the portable device 6.

The data may also be picture data or other data, in addition to the music data.

In the foregoing description, the portable device 6 is used as a recording medium. The present invention can, however, be applied to moving or copying data to other recording mediums.

The contents may be picture data or other data, in addition to music data, such as musical air data or audio data.

The invention claimed is:

1. An information processing apparatus for reciprocal authentication with another information processing apparatus to execute pre-set processing, comprising:
   receiving means for receiving a key category which identifies a common key, a random number, and a device ID from said another information processing apparatus;
   selection means for selecting a processing for reciprocal authentication being executed from one or more reciprocal authentication procedures in keeping with said pre-set processing;
   reciprocal authentication means for executing the selected reciprocal authentication procedures by said selection means based on the key category to select a common key;
   key creation means for establishing the common key shared with said another information processing apparatus based on the key category, random number and device ID; and
   transferring content between said information processing apparatus and said another information processing apparatus in accordance with the common key.

2. A method for processing information by an information processing apparatus for reciprocal authentication with another information processing apparatus to execute pre-set processing, said method comprising:
   receiving a key category which identifies a common key, a random number, and a device ID from said another information processing apparatus;
   selecting a processing for reciprocal authentication being executed from one or more reciprocal authentication procedures in keeping with said pre-set processing;
   executing the selected reciprocal authentication procedures to select a common key;
   establishing the common key shared with said another information processing apparatus based on the key category, random number and device ID; and
   transferring content between said information processing apparatus and said another information processing apparatus in accordance with the common key.

3. A computer readable storage medium furnishing medium for furnishing a computer-readable program for executing a pre-set processing comprising:

receiving a key category which identifies a common key, a random number, and a device ID from an information processing apparatus;

selecting a processing for reciprocal authentication being executed from one or more reciprocal authentication procedures in keeping with said pre-set processing;

executing the selected reciprocal authentication procedures to select a common key;

establishing the common key shared with said information processing apparatus based on the key category, random number and device ID; and transferring content to said information processing apparatus in accordance with the common key.

* * * * *